United States Patent
Chen et al.

(10) Patent No.: US 11,863,370 B2
(45) Date of Patent: *Jan. 2, 2024

(54) HIGH AVAILABILITY USING MULTIPLE NETWORK ELEMENTS

(71) Applicant: Futurewei Technologies, Inc., Plano, TX (US)

(72) Inventors: Huaimo Chen, Bolton, MA (US); Katherine Zhao, Santa Clara, CA (US); Ming Li, Santa Clara, CA (US)

(73) Assignee: Futurewei Technologies, Inc., Addison, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/013,776

(22) Filed: Sep. 7, 2020

(65) Prior Publication Data

US 2020/0412600 A1 Dec. 31, 2020

Related U.S. Application Data

(63) Continuation of application No. 15/894,644, filed on Feb. 12, 2018, now Pat. No. 10,771,315.

(Continued)

(51) Int. Cl.
*H04L 41/0654* (2022.01)
*H04L 5/00* (2006.01)
(Continued)

(52) U.S. Cl.
CPC ............ *H04L 41/0654* (2013.01); *H04L 1/18* (2013.01); *H04L 1/1874* (2013.01); *H04L 1/22* (2013.01);
(Continued)

(58) Field of Classification Search
None
See application file for complete search history.

(56) References Cited

U.S. PATENT DOCUMENTS

| 7,254,602 B1 | 8/2007 | Boivie |
| 9,806,895 B1 | 10/2017 | Kommula et al. |

(Continued)

FOREIGN PATENT DOCUMENTS

| CN | 101132347 A | 2/2008 |
| CN | 101573940 A | 11/2009 |

(Continued)

OTHER PUBLICATIONS

"U.S. Appl. No. 15/894,644, Advisory Action dated Sep. 16, 2019", 5 pgs.

(Continued)

*Primary Examiner* — Jay L Vogel
(74) *Attorney, Agent, or Firm* — Schwegman Lundberg & Woessner, P.A.

(57) ABSTRACT

According to one aspect of the present disclosure, a system includes an active network element having circuitry for executing a primary application and a transmission control protocol (TCP) module, multiple standby network elements having circuitry for executing a secondary copy of the primary application and a secondary TCP module, and a network connection coupled to one or more of the active and standby network elements, wherein the active network element and standby network elements are coupled to transfer data and acknowledgments via their respective TCP modules, and wherein the standby network elements are reconfigurable to communicate via the network connection to a peer regardless of the failure of one or two of the network elements.

18 Claims, 57 Drawing Sheets

Related U.S. Application Data

(60) Provisional application No. 62/458,979, filed on Feb. 14, 2017, provisional application No. 62/458,974, filed on Feb. 14, 2017.

(51) Int. Cl.

| | | |
|---|---|---|
| *H04L 69/16* | (2022.01) | |
| *H04L 12/18* | (2006.01) | |
| *H04L 1/18* | (2023.01) | |
| *H04L 69/40* | (2022.01) | |
| *H04L 1/22* | (2006.01) | |
| *H04L 1/1867* | (2023.01) | |
| *H04L 7/00* | (2006.01) | |

(52) U.S. Cl.
CPC ............ *H04L 5/0055* (2013.01); *H04L 12/18* (2013.01); *H04L 12/1872* (2013.01); *H04L 69/16* (2013.01); *H04L 69/40* (2013.01); *H04L 1/188* (2013.01); *H04L 7/0008* (2013.01)

(56) References Cited

U.S. PATENT DOCUMENTS

| | | | |
|---|---|---|---|
| 10,735,248 B2* | 8/2020 | Zhao | ............... H04L 47/15 |
| 10,771,315 B2* | 9/2020 | Chen | ................ H04L 5/0055 |
| 2005/0111452 A1 | 5/2005 | Mamillapalli et al. | |
| 2005/0141499 A1 | 6/2005 | Ma et al. | |
| 2005/0198453 A1* | 9/2005 | Osaki | .................... G06F 3/0689 |
| | | | 711/162 |
| 2005/0226144 A1 | 10/2005 | Okita | |
| 2007/0258466 A1 | 11/2007 | Kakani | |
| 2008/0159325 A1* | 7/2008 | Chen | ...................... H04L 69/40 |
| | | | 370/432 |
| 2008/0163248 A1 | 7/2008 | Chen | |
| 2008/0320188 A1 | 12/2008 | Luo et al. | |
| 2009/0213854 A1 | 8/2009 | Menendez et al. | |
| 2009/0240974 A1* | 9/2009 | Baba | .................. G06F 11/2041 |
| | | | 714/4.1 |
| 2009/0292891 A1* | 11/2009 | Fujita | .................. G06F 11/2097 |
| | | | 711/E12.001 |
| 2011/0038255 A1* | 2/2011 | Zhou | ...................... H04L 45/60 |
| | | | 370/218 |
| 2011/0153834 A1* | 6/2011 | Bharrat | .................... H04L 69/22 |
| | | | 709/227 |
| 2012/0201124 A1 | 8/2012 | Marques et al. | |
| 2014/0119380 A1 | 5/2014 | Bakhshi et al. | |
| 2016/0203202 A1 | 7/2016 | Merriman et al. | |
| 2017/0060708 A1 | 3/2017 | Narang et al. | |
| 2017/0104555 A1 | 4/2017 | Darbha et al. | |
| 2017/0168756 A1 | 6/2017 | Yamada et al. | |
| 2018/0234289 A1 | 8/2018 | Chen et al. | |
| 2019/0253309 A1 | 8/2019 | Zhao et al. | |

FOREIGN PATENT DOCUMENTS

| | | | |
|---|---|---|---|
| CN | 101651706 A | 2/2010 | |
| WO | WO-2008025929 A1 * | 3/2008 | ............. H04L 69/16 |
| WO | WO-2012092774 A1 * | 7/2012 | ......... H04L 41/0663 |

OTHER PUBLICATIONS

"U.S. Appl. No. 15/894,644, Final Office Action dated Jun. 24, 2019", 16 pgs.
"U.S. Appl. No. 15/894,644, Non Final Office Action dated Mar. 8, 2019", 13 pgs.
"U.S. Appl. No. 15/894,644, Non Final Office Action dated Nov. 1, 2019", 24 pgs.
"U.S. Appl. No. 15/894,644, Notice of Allowance dated May 6, 2020", 12 pgs.
"U.S. Appl. No. 15/894,644, Response filed Mar. 2, 2020 to Non Final Office Action dated Nov. 1, 2019", 9 pgs.
"U.S. Appl. No. 15/894,644, Response filed May 30, 2019 to Non Final Office Action dated Mar. 8, 2019", 9 pgs.
"U.S. Appl. No. 15/894,644, Response filed Aug. 22, 2019 to Final Office Action dated Jun. 24, 2019", 10 pgs.
"U.S. Appl. No. 15/894,720, Examiner Interview Summary dated Feb. 28, 2020", 2 pgs.
"U.S. Appl. No. 15/894,720, Final Office Action dated Jan. 3, 2020", 16 pgs.
"U.S. Appl. No. 15/894,720, Non Final Office Action dated Jul. 26, 2019", 20 pgs.
"U.S. Appl. No. 15/894,720, Notice of Allowance dated Mar. 25, 2020", 9 pgs.
"U.S. Appl. No. 15/894,720, Response filed Mar. 3, 2020 to Final Office Action dated Jan. 3, 2020", 8 pgs.
"U.S. Appl. No. 15/894, 720, Response filed Oct. 24, 2019 to Non-Final Office Action dated Jul. 26, 2019", 10 pgs.
"Chinese Application No. 201880011760.9, First Office Action dated Jan. 21, 2020", (Jan. 21, 2020), 26 pgs.
"International Application No. PCT/CN2019/074758, International Search Report and Written Opinion dated Apr. 28, 2019", (dated Apr. 28, 2019), 9 pgs.
"International Application Serial No. PCT/CN2018/076742, International Search Report dated May 9, 2018", 4 pgs.
"International Application Serial No. PCT/CN2018/076742, Written Opinion dated May 9, 2018", 4 pgs.

\* cited by examiner

3200 ⟶

| CURRENT ORDER | PB(B1), SB(B2), TB(B3) | (ACTIONS BELOW) |
|---|---|---|
| NEW ORDER 1 | PB(B1), SB(B3), TB(B2) | REMOVE SB(B2), APPEND B2 AT END |
| NEW ORDER 2 | PB(B2), SB(B1), TB(B3) | REMOVE PB(B1), APPEND B1 AT END<br>REMOVE SB(B3), APPEND B3 AT END |
| NEW ORDER 3 | PB(B2), SB(B3), TB(B1) | REMOVE PB(B1), APPEND B1 AT END |
| NEW ORDER 4 | PB(B3), SB(B1), TB(B2) | REMOVE PB(B1), APPEND B1 AT END<br>REMOVE PB(B2), APPEND B2 AT END |
| NEW ORDER 5 | PB(B3), SB(B2), TB(B1) | REMOVE SB(B2), APPEND B2 AT END<br>REMOVE PB(B1), APPEND B1 AT END |

| CURRENT ORDER | PB(B1), SB(B2), TB(B3) | (ACTIONS BELOW) |
|---|---|---|
| NEW ORDER 1 | PB(B1), SB(B3), TB(B2) | MOVE SB(B2), TO POSITION AFTER B3 |
| NEW ORDER 2 | PB(B2), SB(B1), TB(B3) | MOVE SB(B2) TO POSITION BEFORE B1 |
| NEW ORDER 3 | PB(B2), SB(B3), TB(B1) | MOVE PB(B1), TO POSITION AFTER B3 |
| NEW ORDER 4 | PB(B3), SB(B1), TB(B2) | MOVE TB(B3), TO POSITION BEFORE B1 |
| NEW ORDER 5 | PB(B3), SB(B2), TB(B1) | MOVE SB(B2), TO POSITION AFTER B3<br>MOVE PB(B1), TO POSITION AFTER B2 |

FIG. 36

HIGH AVAILABILITY USING MULTIPLE NETWORK ELEMENTS

RELATED APPLICATIONS

This application is a continuation of U.S. patent application Ser. No. 15/894,644, which claims priority to U.S. Provisional Application Ser. No. 62/458,974 (entitled PARALLEL HIGH AVAILABLE TCP IN MULTIPLE BOARDS, filed Feb. 14, 2017) and to U.S. Provisional Application Ser. No. 62/458,979 (entitled SEQUENTIAL HIGH AVAILABLE TCP IN MULTIPLE BOARDS, filed Feb. 14, 2017) which are incorporated herein by reference in their entireties.

TECHNICAL FIELD

The present application relates generally to network communications, and more particularly to a system comprising various methods and constructs for providing transmission control protocol (TCP) high availability (HA) on multiple boards, which makes TCP work/available when two or more boards fail at the same time to ensure availability of routing functions.

BACKGROUND

Existing TCP High Availability (HA) is built on two control boards in a router. If both boards fail at the same time, a TCP module fails in the router and routing using a border gateway protocol (BGP) via the TCP module fails.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, a system includes an active network element having circuitry for executing a primary application and a transmission control protocol (TCP) module, multiple standby network elements having circuitry for executing a secondary copy of the primary application and a secondary TCP module, and a network connection coupled to one or more of the active and standby network elements, wherein the active network element and standby network elements are coupled to transfer data and acknowledgments via their respective TCP modules, and wherein the standby network elements are reconfigurable to communicate via the network connection to a peer regardless of the failure of one or two of the network elements.

Optionally, in any of the preceding aspects, a further implementation of the aspect includes each TCP module includes a receive buffer and a transmit buffer.

Optionally, in any of the preceding aspects, a further implementation of the aspect includes wherein the TCP module is configured to encapsulate the data and acknowledgments into packets that include a field identifying the packet as a data packet or an acknowledgment packet and a field providing a sequence number.

Optionally, in any of the preceding aspects, a further implementation of the aspect includes wherein the sequence number of a data packet identifies a last byte of a data transferred in a data packet or acknowledged as received in an acknowledgment packet.

Optionally, in any of the preceding aspects, a further implementation of the aspect includes wherein the active network element is configured to aggregate multiple data packets and multicast such aggregated multiple data packets to the standby network elements.

Optionally, in any of the preceding aspects, a further implementation of the aspect includes wherein the multicast of aggregated multiple data packets comprises multicasting received data packets responsive to a trigger event.

Optionally, in any of the preceding aspects, a further implementation of the aspect includes wherein the trigger event comprises one or more of a timeout, a window size being reached, and a transmit data packet being received from the active network element application.

Optionally, in any of the preceding aspects, a further implementation of the aspect includes wherein the active network element is configured to receive acknowledgments from multiple standby network elements of a first multicast of aggregated data packets and responsive to receiving a set number acknowledgments from less than all of the multiple standby network elements, transmit a next multicast of aggregated data packets.

Optionally, in any of the preceding aspects, a further implementation of the aspect includes wherein the active network element receive buffer is configured to store aggregated multiple data packets received from the peer and the active network element transmit buffer is configured to store aggregated multiple data packets generated by the primary application to be transmitted.

Optionally, in any of the preceding aspects, a further implementation of the aspect includes wherein the first and second standby network elements are configured to receive multiple data packets from the active network and provide a single aggregated acknowledgment having a sequence number corresponding to the sequence number of the last data packet received.

Optionally, in any of the preceding aspects, a further implementation of the aspect includes wherein a selected one of the standby network elements becomes a new active network element responsive to failure of the active network element, and wherein the new active network element is configured to receive a sequence number for most recent acknowledged data packets from the other standby network elements, find a minimum sequence number from the received sequence numbers, send the minimum sequence number to each of the standby network elements, receive data corresponding to sequence numbers between the minimum sequence number and the sequence number from each of the standby network elements having a sequence number greater than the minimum sequence number, and send the received data to each standby network element such that all network elements are synchronized with the data packet having the highest sequence number.

According to another aspect of the present disclosure, a standby network element includes a processor, memory, and instructions for performing a method. The method includes executing a secondary copy of a primary application executing on an active network element and a transmission control protocol (TCP), receiving data packets originating from a peer coupled via a network connection, providing acknowledgments for the received data packets, and becoming a new active network element responsive to failure of the active network element to communicate via the network connection to a peer and one or more further standby network elements regardless of the failure of an addition network element.

Optionally, in any of the preceding aspects, a further implementation of the aspect includes wherein the data packets comprise a field providing a sequence number corresponding to a last byte of a data payload of the packet.

Optionally, in any of the preceding aspects, a further implementation of the aspect includes wherein acting as a standby network element comprises receiving a multicast of aggregated data packets.

Optionally, in any of the preceding aspects, a further implementation of the aspect includes wherein the operations further comprise providing a single aggregated acknowledgment having a sequence number corresponding to the sequence number of the last data packet received.

Optionally, in any of the preceding aspects, a further implementation of the aspect includes wherein upon becoming the new active network element performs operations including receiving a sequence number for most recent acknowledged data packets from the other standby network elements, finding a minimum sequence number from the received sequence numbers. sending the minimum sequence number to each of the standby network elements, receiving data corresponding to sequence numbers between the minimum sequence number and the sequence number from each of the standby network elements having a sequence number greater than the minimum sequence number, and sending the received data to each standby network element such that all network elements are synchronized with the data packet having the highest sequence number.

According to yet a further aspect of the present disclosure, a computer implemented method includes receiving incoming data from a peer at an active network element transmission protocol (TCP) module and multiple standby network element TCP modules in a router, providing the data to an application duplicated on each of the active and standby network elements, each active and standby network element acknowledging receipt of the data via the TCP modules, and acknowledging receipt of the data to the peer via the line card responsive to all the boards acknowledging receipt of the data.

Optionally, in any of the preceding aspects, a further implementation of the aspect includes wherein each network element acknowledges receipt of the data via the TCP modules via a parallel connection in the router.

Optionally, in any of the preceding aspects, a further implementation of the aspect includes wherein each standby network element explicitly acknowledges receipt of the data via the TCP modules via a parallel connection to the active network element, and wherein the active network element acknowledges receipt to the peer.

Optionally, in any of the preceding aspects, a further implementation of the aspect includes wherein each standby network element implicitly acknowledges receipt of the data via the TCP modules via a parallel connection to the active network element by requesting missing data from the active network element, and wherein the active network element acknowledges receipt to the line card when no requests are received after a timer expires.

BRIEF DESCRIPTION OF THE DRAWINGS

FIG. 32 is a table illustrating an array showing arrangement of boards according to an example embodiment.

FIG. 36 is a block flow diagram illustrating the hot soft change, including resulting message flows according to an example embodiment.

DETAILED DESCRIPTION

Figure 1A:
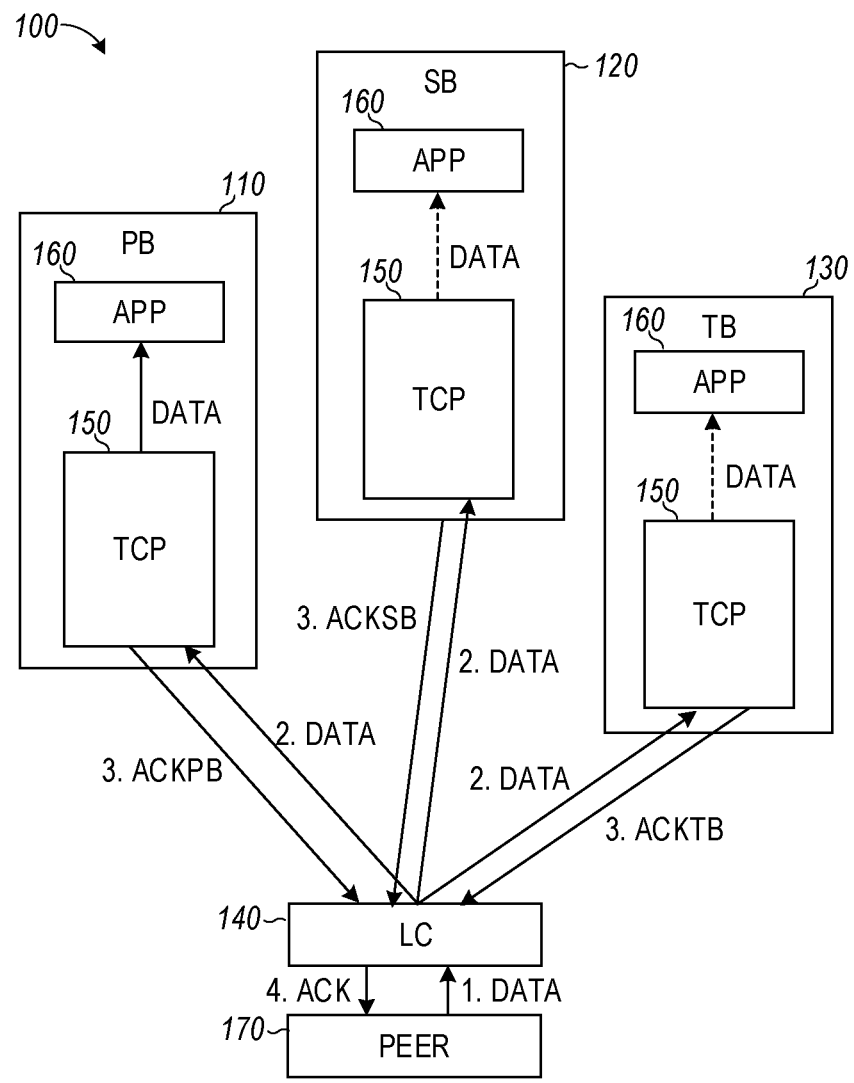
FIG. 1A is a block flow diagram of a router illustrating flow of incoming TCP data according to an example embodiment.

In the following description, reference is made to the accompanying drawings that form a part hereof, and in which is shown by way of illustration specific embodiments which may be practiced. These embodiments are described in sufficient detail to enable those skilled in the art to practice the application, and it is to be understood that other embodiments may be utilized and that structural, logical and electrical changes may be made without departing from the scope of the present application. The following description of example embodiments is, therefore, not to be taken in a limited sense, and the scope of the present application is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Existing TCP High Availability (HA) is built on two control boards in a router. If two boards fail at the same time, the TCP fails in the router. There is a new requirement for TCP HA from service providers to protect against two failures such as two board failures at the same time, ensuring availability of routing functions. In various embodiments of the subject matter of the present application, at least three control boards (called Primary Board (PB), Secondary Board (SB), Third Board (TB), and/or Auxiliary Board (AB) in one set of examples, Primary Node (PN), Secondary Node (SN), Third Node (TN), and/or Auxiliary Node (AN) in a further set of examples, and Active and Standby network elements (NEs) in still further examples. The multiple network elements in a router or device may be used with modified data handling to provide high availability. A network element may be implemented on a board, a virtual machine on a server, or via a multiprocessor unit (MPU) of a router or switch in various embodiments.

In embodiments using more than three nodes or boards, numbers 1-n in one or more figures may be used to identify the nodes or boards, with "1" being the primary node or board. Reliability of a three-board system over prior two board solutions may be improved from 99.999% (referred to as 5 nines) by an order of magnitude to 99.9999% (referred to as 6 nines) in some embodiments.

TCP is a communications protocol that provides reliable, ordered, and error-checked delivery of a stream of bytes between Apps running on hosts. The bytes are also referred to as octets, containing 8 bits per byte. TCP is commonly used as a protocol for Internet communications, and may be complemented with Internet Protocol (IP) and referred to as TCP/IP. In further embodiments, the number of bits per byte may be higher, such as 16, 32, 64, etc.

Border Gateway Protocol (BGP) is a standardized exterior gateway protocol designed to exchange routing and reachability information among autonomous systems (AS) on the Internet. The protocol is often classified as a path vector protocol but is sometimes also classed as a distance-vector routing protocol.

Embodiments are described with multiple, at least three, boards operating in synchrony, sending and receiving data among themselves and line cards in an efficient manner. Boards may be added as desired such that more than three boards are used providing even higher availability. If one or more boards are detected as having failed, the remaining board or boards may continue to operate in a reconfigured manner to provide high availability.

Further embodiments may utilize a sequence number corresponding to the number of bytes in a data transfer, with 1 being the first byte and m being the last byte. The sequence number may correspond to a different selected amount of data other than a byte in further embodiments, such as number of bytes or bits, segments, pages, or other logical representation of an amount of data.

The sequence number may be used in acknowledgments of data transfers between nodes to indicate an amount of the data transfer that was received. If less than all the data has been received, the sequence number in the acknowledgment will be lower than expected, notifying a node that not all the transferred data was received. The sequence number may also be used to synchronize a new primary node following failure of a previous primary node.

Parallel High Availability Embodiments

A system includes a primary board having circuitry for executing a primary App and a TCP module. A secondary board has circuitry for executing a secondary copy of the primary App and a secondary TCP module. A third board has circuitry for executing a third copy of the primary App and a third TCP module. A line card is coupled to all the boards, wherein the primary board, secondary board and third board are coupled in parallel to transfer data and acknowledgments, via their respective TCP modules, between each of the boards and the line card and/or between boards, and wherein the boards are reconfigurable to communicate with the line card regardless of the failure of one or two of the boards.

A first method includes receiving incoming data from a peer device via a line card in a router, sending the received incoming data to TCP modules in at least three router boards, providing the data to an App duplicated on the at least three router boards, each router board acknowledging receipt of the data via the TCP modules, and acknowledging receipt of the data to the peer device via the line card responsive to all the boards acknowledging receipt of the data.

A second method includes receiving data from an App running on a primary board in a router, the data being received by a TCP module on the primary board, the TCP module on the primary board providing the received data in parallel to at least two other boards each having a TCP module and a copy of the App, the TCP module on the primary board providing the received data to a line card coupled in parallel to all the boards, and providing an acknowledgment to each board in parallel from a peer device responsive to successful delivery of the data to the peer device.

Figure 1B:
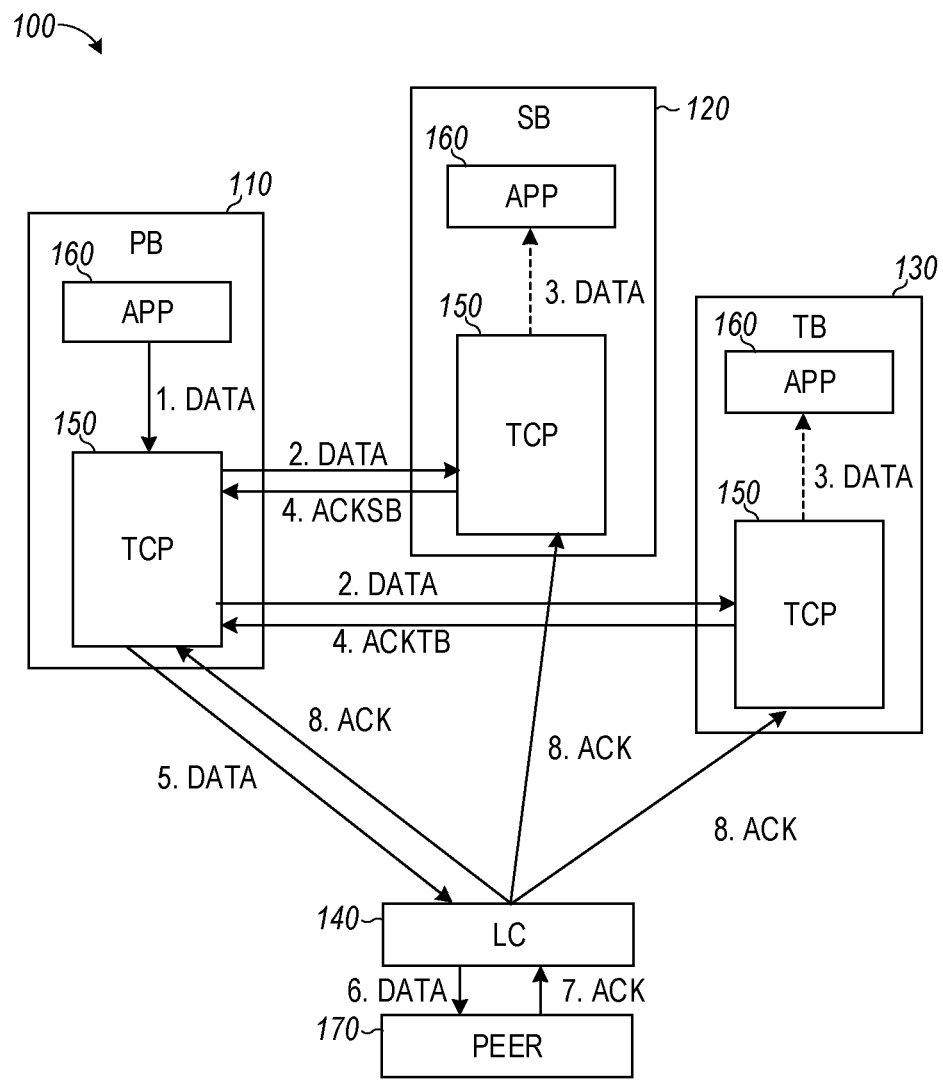
FIG. 1B is a block flow diagram of a router illustrating flow of outgoing TCP data according to an example embodiment.

FIGS. 1A and 1B are block flow diagrams illustrating an example architecture 100 for TCP high availability in multiple boards, showing message data flow among a line card (LC) 140 and three router boards, PB 110, SB 120, and TB 130. Incoming TCP data (1. Data) from a line card (LC) 140 is indicated in FIG. 1A, with outgoing TCP data (data generated by an App 160 running on the PB 110) illustrated in FIG. 1B.

In one embodiment, a TCP module 150 runs on each of the three or more router boards. The router boards may include circuitry to perform operations, such as a processor and memory. The memory may include one or more buffers or windows for buffering data being transferred until a transfer is complete. An App 160 (or a number of Apps) uses the TCP module 150 on each of the boards. Apps may include any software that sends and/or receives data, such as browsers, word processing programs, and a multitude of other Apps.

Every board is connected to a network connection such as Line Card (LC) 140 or a number of LCs in further embodiments. Every line card 140 is connected to a peer 170 or neighbor router 170 or device to send and receive data. Peer 170 may be a device referred to as a remote peer that may be remotely located and coupled via a network for transferring data, such as via data packets using TCP. The peer 170 may be a device of any size or type executing a similar application or a different application exchanging data with App 160.

As shown FIG. 1A, incoming TCP data (1. Data) from a peer 170 is sent (2. Data) to the TCP module 150 on every board by the line card 140 configured to receive the data from the peer 170. Each TCP module 150 stores the data in its buffer/window, delivers the data (3. Data), using TCP, to its App(s) (or, the App 160 reads the data) as needed and sends an acknowledgment (Ack) (3. AckPB, 3. AckSB, 3. AckTB) to the line card 140 indicating the data has been received. The line card sends the peer 170 an acknowledgment (4. Ack) for the data after receiving the Ack for the data from every TCP module 150. The line card 140 is thus aware of every board and ensures that an Ack from every board is received for each byte of data received before acknowledging receipt of the data.

As shown in FIG. 1B, where number of components is the same as that in FIG. 1A, outgoing TCP data (1. Data) originating from an App 160 (such as Border Gateway Protocol (BGP)) using TCP on PB 110 is concurrently sent (2. Data) to the TCP module 150 on each of the other boards such as SB 120 and TB 130. The TCP module 150 delivers the TCP data (3. Data) to its corresponding Apps 160 in order as needed, and sends an acknowledgment (Ack) (4. AckSB, 4. AckTB) to the TCP module 150 on PB 110, which sends the TCP data to the line card 140 (5. Data). The line card 140 sends the TCP data (6. Data) to peer 170, and receives an acknowledgment (7. Ack). The line card 140, responsive to the 7. Ack, sends an acknowledgment (8. Ack) to each board: PB 110, SB 120, and TB 130.

In various embodiments, the boards 110, 120 and 130 and the line card 140 may communicate with each other using one or more of several different transport protocols, including TCP. Other protocols include but are not limited to Transparent Inter Process Communication Protocol (TIPC) or User Datagram Protocol (UDP).

The use of three boards provides protection against two failures such as two board failures at the same time in an efficient way. The parallel connection of the boards combined with tracking of successful delivery and receipt of data prior to acknowledging or sending data results in a high availability system, with each App 160 and TCP module 150 having a synchronized state. A synchronized state includes each board 110, 120 and 130 having the same data so that either the SB 120 or TB 130 is capable of becoming a primary board without loss of data, or with loss of minimal data.

While three boards are shown, the system may be expanded to accommodate further boards in a parallel connected manner to ensure all boards are synchronized. For incoming data, the data is then sent from the line card to each of the boards, which update their Apps and acknowledge receipt directly to the line card. For outgoing data, the PB 110 may simply send the data to more than two boards and coordinate reception of acknowledgments from each board prior to sending the data to the line card. The line card would then send an acknowledgment to each board following acknowledgment of receipt by a peer 170.

In some embodiments, boards may be added and synchronized such that their TCP modules are in a same state as the TCP modules on the other boards. In one embodiment, the TCP state of the PB 110 is smoothly synchronized or backed up to the newly inserted board such as the SB 120 or TB 130 or a fourth or further board. A configuration file may be used to determine the role each board takes, resulting in rerouting of data traffic among the boards. The configuration file may be modified by a human operator or control logic in a device that manages the board configuration. Modification of the configuration file may take into account measured board reliability, assigning the highest reliable board as the PB 110. Succeeding boards are assigned as the SB 120 and TB 130 if there are a sufficient number of boards still operating.

In further embodiments, the architecture operates to quickly and smoothly switch over the control on TCP modules and others to a live board such as TB 130 when PB 110 and SB 120 fail at the same time.

Figure 2:
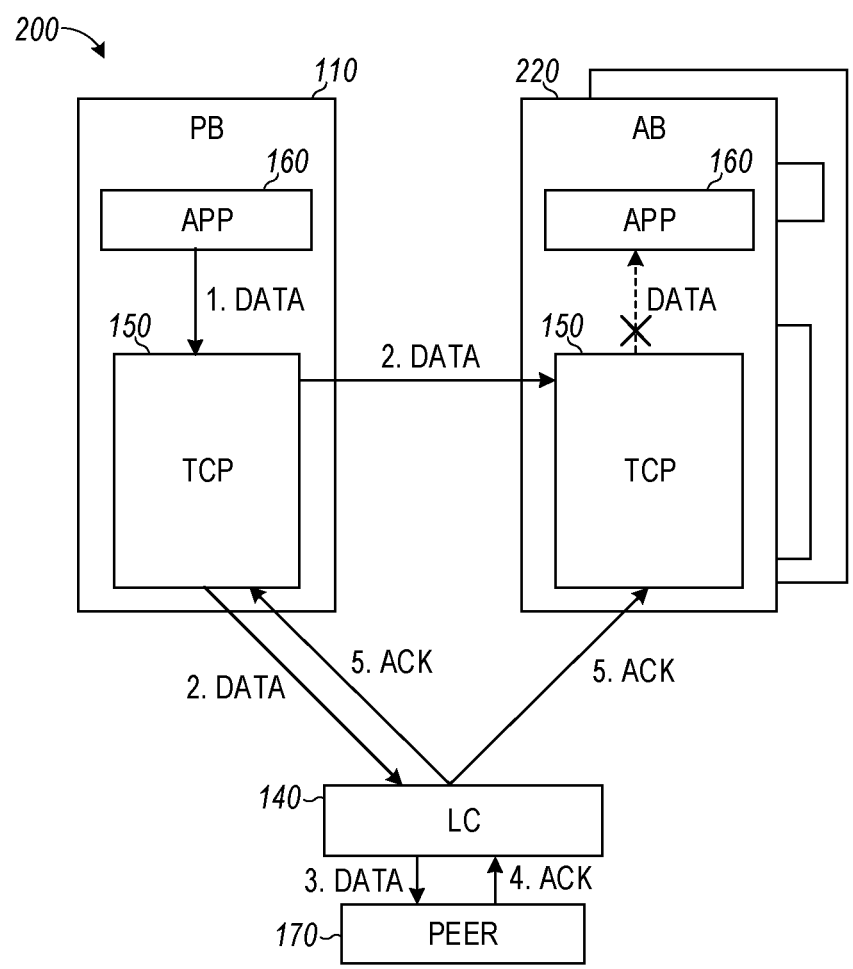
FIG. 2 is a block flow diagram illustrating TCP data synchronization for outdoing data according to an example embodiment.

FIG. 2 is a block flow diagram illustrating example TCP data synchronization generally at 200 for outgoing data. Note that like components are numbered consistently in the figures. In one example, it is assumed that the PB 110 is running and one or more new boards, auxiliary boards (AB) 220, are inserted. The PB 110 backs up its TCP socket (a data structure describing end to end communication connections via port numbers and IP addresses) to its corresponding App 160 on AB 220. Note that AB 220 is a representation of SB 120 with one or more additional auxiliary boards represented behind it. After a TCP socket is created on AB 220, the state and data structures of the socket (basically a copy of the state of the TCP module 150) is/are replicated to the TCP module 150 on AB(s) 220. For incoming TCP data, the incoming data synchronization during the backup period is that the LC 140 sends the incoming TCP data to the TCP module 150 on AB 220, but the TCP module 150 on AB 220 does not deliver any incoming data to the App 160 on AB 220 as illustrated in FIG. 2. Alternative methods of synchronization are described below. For outgoing TCP data, such as data (1. Data in FIG. 2) received from the App 160, the outgoing data synchronization may be done in multiple different ways as illustrated in FIGS. 2, 3, and 4.

In FIG. 2, outgoing TCP data synchronization may be performed without acknowledgments. App 160 on PB 110 sends data (1. Data) to the TCP module 150 on PB 110. Outgoing TCP data originated from App 160, such as BGP on PB 110 is concurrently sent to peers 170, such as routers via LC 140 (3. Data), the TCP module 150 on AB 220 (2. Data), and TCP modules 150 on each of the other boards. The TCP module 150 on AB 220 does not deliver the TCP data originated from the App 160 on PB 110 to the corresponding App 160 on AB 220 as represented by the "X" in FIG. 2.

LC 140 receives the data (2. Data) from the TCP module 150 on PB 110 and sends the data to a peer 170 (3. Data). LC 140 receives an Ack (4. Ack) for the data from the peer 170 and sends the Ack (5. Ack) to the TCP module 150 on every board. The TCP module 150 on AB 220 receives the Ack for the data from the peer 170 via LC 140 and removes the data from its window/buffer. The TCP module 150 on PB 110 receives the Ack for the data from the peer 170 via LC 140 and removes the data from its window/buffer, completing the data communication. Performing the TCP data synchronization without Acks provides high performance by sending TCP data originating from the App 160 on PB 110 to the peer 170 and other boards concurrently without additional work being done for synchronization between PB 110 and AB 220 for the outgoing TCP data.

Figure 3:
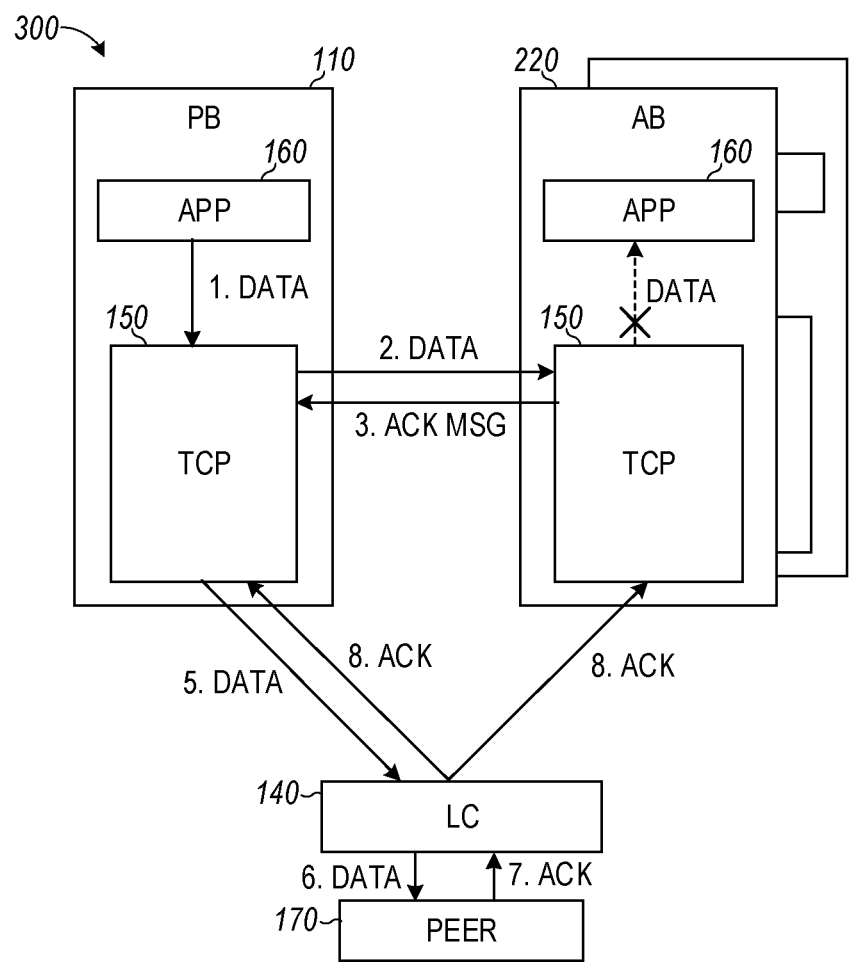
FIG. 3 is a block flow diagram illustrating TCP data synchronization for outdoing data according to an example embodiment.
Figure 4:
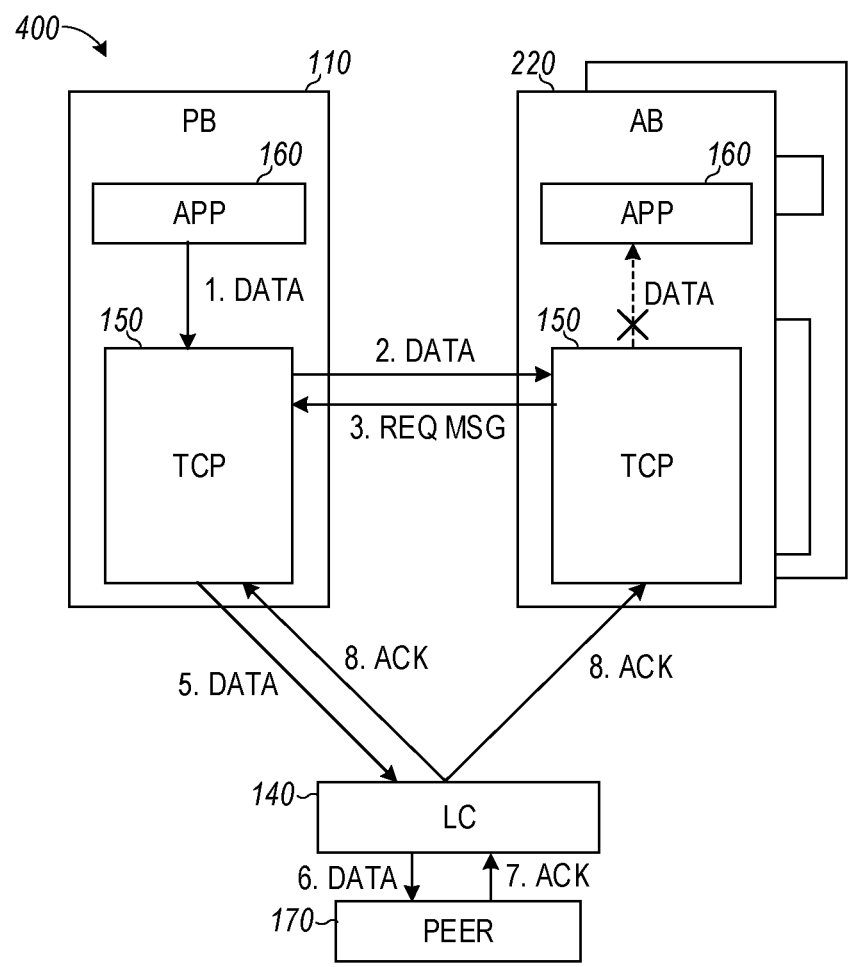
FIG. 4 is a block flow diagram illustrating TCP data synchronization for outdoing data according to another example embodiment.

FIG. 3 is a block flow diagram 300 illustrating example connections and message flow for outgoing TCP data synchronization utilizing acknowledgments. App 160 on PB 110 sends TCP data (1. Data) to the TCP module 150 on PB 110. Outgoing TCP data originated from the App 160 such as BGP on PB 110 is concurrently sent to the TCP module 150 on AB 220 (2. Data), and the TCP module 150 on each of the other boards. The TCP module 150 on AB 220 does not deliver the TCP data originated from the App 160 on PB 110 to the corresponding App 160 on AB 220. The TCP module 150 on AB 220 sends an Ack message (3. Ack) to the TCP module 150 on PB 110 for the data received. If the TCP module 150 on PB 110 does not receive an Ack message from the TCP module 150 on AB 220, the TCP module 150 on PB 110 retransmits the data to the TCP module 150 on AB 220 until receiving the Ack for the data from AB 220. The TCP module 150 on PB 110 sends data (5. Data) to LC 140 after receiving Ack messages (3. Ack) from AB 220 and all the other boards.

LC 140 receives the data from the TCP module 150 on PB 110 and sends the data (6. Data) to a peer 170. LC 140 receives an Ack (7. Ack) for the data from the peer 170 and sends the Ack (8. Ack) to the TCP module 150 on every board. The TCP module 150 on AB 220 receives the Ack for the data from the peer 170 via LC 140 and removes the data from its window/buffer. The TCP module 150 on PB 110 receives the Ack for the data from the peer 170 via LC 140 and removes the data from its window/buffer. The TCP module 150 on each of the other boards receives the Ack for the data from the peer 170 via LC 140 and removes the data from its window/buffer, completing the data transfer successfully in accordance with TCP, with additional reliability provided by the Acks between TCP modules.

FIG. 4 is a block flow diagram 400 illustrating example connections and message flow for outgoing TCP data synchronization utilizing implied acknowledgments. An App 160 on PB 110 sends data (1. Data) to the TCP module 150 on PB 110, which stores the data into its output buffer in order. Data (2. Data) is sent by the TCP module 150 on PB 110 to the TCP module 150 on AB 220, and to the TCP module 150 on each of the other boards in parallel. The TCP module 150 on AB 220 stores data in its output buffer in order, but does not send data to the corresponding App 160 on AB 220 as represented by the X in FIG. 4.

The TCP module 150 on AB 220 sends a request for data (Req msg) to the TCP module 150 on PB 110 when the TCP module 150 on AB 220 finds some data missing or sends an empty request when the amount of data sent (supposed) to the App 160 from last request is greater than a given size such as ½ of its buffer size (the TCP module 150 on AB 220 sends the TCP module 150 on PB 110 an empty request with the sequence number corresponding to the last byte sent to the App 160 if it does not have any request over a given interval). The TCP module 150 on PB 110 sends the data (2. Data) to the TCP module 150 on AB 220 after receiving the request.

The TCP module 150 on PB 110 sends a peer 170, via LC 140, the data (5. Data) that is older than that requested (i.e. Ack'ed from the TCP module 150 on AB 220 and each of the other boards). LC 140 receives the data (5. Data) from the TCP module 150 on PB 110 and sends the data (6. Data) to the peer 170. LC 140 receives an Ack (7. Ack) for the data from the peer 170 and sends the Ack (8. Ack) to the TCP module 150 on every board. The TCP module 150 on AB 220 receives the Ack for the data from the peer 170 via LC 140 and removes the data from its buffer. The TCP module 150 on PB 110 receives the Ack for the data from the peer 170 via LC 140 and removes the data from its buffer The TCP module 150 on each of the other boards receives the Ack for the data from the peer 170 via LC 140 and removes the data from its buffer, completing the data transfer successfully in accordance with TCP, with additional reliability provided by the implied Acks between TCP modules. No extra timers are run for the TCP module 150 on PB 110. Most of the load for TCP HA is moved to the TCP module 150 on AB 220. In the case the TCP module 150 on AB 220 misses data from PB 110, the TCP module 150 on PB 110 will send the data to the TCP module 150 on AB 220 after receiving the request for the data from the TCP module 150 on AB 220. The use of such requests may be faster than simply retransmitting data after a retransmission timer expires.

Figure 5:
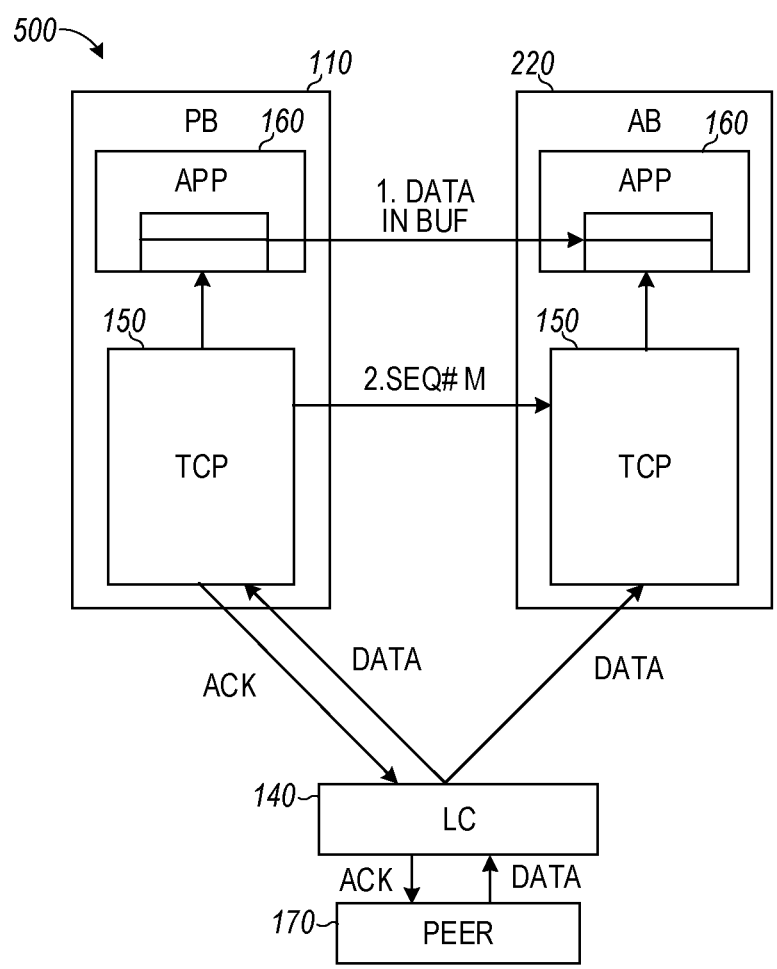
FIG. 5 is a block flow diagram illustrating message flow for synchronizing an incoming data stream according to an example embodiment.
Figure 6:
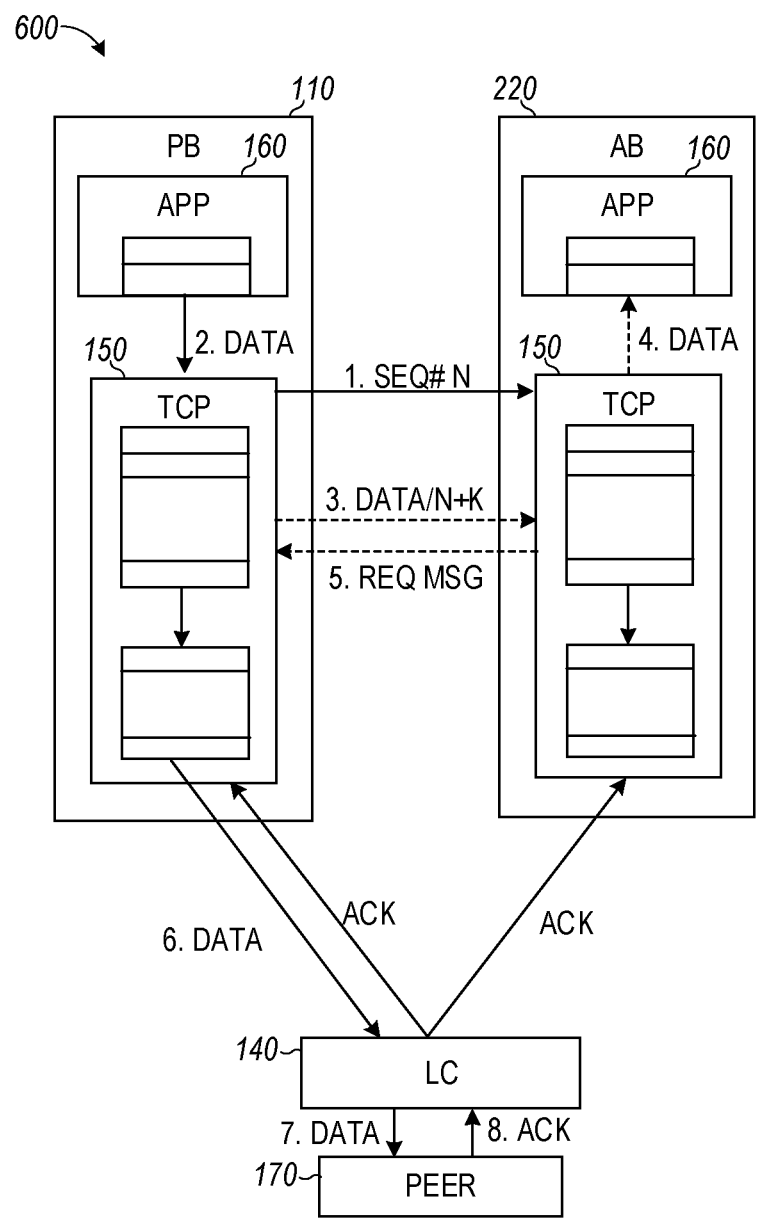
FIG. 6 is a block flow diagram illustrating message flow for synchronizing an outgoing data stream according to an example embodiment.

After batch backup and before real time backup, TCP data streams may be synchronized by the use of byte sequence numbers corresponding to the data streams as illustrated in FIGS. 5 and 6. For an incoming TCP data stream, the TCP module 150 on PB 110 holds off the data delivery to the App 160 on PB 110. The TCP module 150 on PB 110 sends, to the TCP module 150 on AB 220, the sequence number m, corresponding to the last byte of the data delivered to the App 160 just before the holding off. The App 160 on PB 110 copies the data from TCP module 150 in its input buffer to the corresponding App 160 on AB 220. The beginning of the data in the buffer should be the boundary of a packet. The data in the input buffer of the App 160 and the data in the input buffer of the TCP module 150 on AB 220 and the incoming data from the peer 170 forms a continuous incoming TCP data stream on AB 220 for the socket backed up from PB 110.

FIG. 5 is a block flow diagram 500 illustrating example message flow for synchronizing an incoming TCP data stream boundary, and illustrates the use of buffers in the Apps and TCP modules. After batch backup and before real time backup, the TCP module 150 on PB 110 holds off the data delivery to the App 160 on PB 110. The App 160 on PB 110 copies the data from its input buffer to the input buffer of the corresponding App 160 on AB 220. The beginning of the data in the buffer should be the boundary of a data stream. The TCP module 150 on PB 110 sends the TCP module 150 on AB 220 the sequence number m corresponding to the last byte of the data delivered to the App 160 just before the holding off.

The data in the input buffer of the App 160 and the data in the input buffer of the TCP module 150 on AB 220 and the incoming data from the peer 170 coupled to the LC 140 forms the continuous incoming TCP data stream on AB 220 for the socket backed up from PB 110. After Batch Backup Completes and Real Time Backup Starts, the TCP module 150 on AB 220 sends the incoming TCP data from the peer 170 starting at sequence number m+1 to the corresponding App 160 on AB 220. After Switchover to AB 220, TCP on AB 220 continues sending data from the peer 170 to App 160. The TCP module 150 on AB 220 sends an Ack to the peer 170 for the received data.

FIG. 6 is a block flow diagram 600 illustrating example message flow for synchronizing an outgoing TCP data stream boundary. For an outgoing TCP data stream, the App 160 on PB 110 holds off the data delivery to the TCP module 150. The TCP module 150 on PB 110 sends the TCP module 150 on AB 220 the sequence number n corresponding to the last byte of the data delivered to the TCP module 150 by the App 160 on PB 110 just before the holding off. The last byte should be the boundary of the data packet.

As illustrated in FIG. 6, after batch backup and before real time backup, the App 160 on PB 110 holds off the data delivery to the TCP module 150. The TCP module 150 on PB 110 sends, to the TCP module 150 on AB 220, the sequence number n (1. Seq #n) corresponding to the last byte of the data delivered to the TCP module 150 by the App 160 just before the holding off. The last byte should be the boundary of a packet.

After batch backup completes and real time backup starts, an App 160 sends data (2. Data) to the TCP module 150 on PB 110, which stores it into its output buffer in order. Data (3. Data/n+k) is sent to the TCP module 150 on AB 220 and each of the other boards in parallel. The TCP module 150 on AB 220 stores data in its output buffer in order and sends data (4. Data) to the corresponding App 160 on AB 220 as needed.

In the example embodiment, the TCP module 150 on AB 220 sends the TCP module 150 on PB 110 a request (5. Req msg) for data as an implied Ack and the TCP module 150 on PB 110 sends the data to AB 220 after receiving the request.

The TCP module 150 on PB 110 sends the data (6. Data) to LC 140, which sends the data (7. Data) to a peer 170. The peer 170 acknowledges (8. Ack) and the LC 140 sends an Ack (i.e. older than that requested) to AB 220 and each of the other boards. In the case that PB 110 does not receive any implied Ack (i.e. request) for a given time, it also sends the TCP module 150 on AB 220 the data and generates an alarm indicating that AB 220 may not work. After Switchover to AB 220, the TCP module 150 on AB 220 sends all the data in its output buffer to the peer 170.

After batch backup completes and real time backup starts, for an incoming TCP data stream, the TCP module 150 on AB 220 sends the incoming TCP data from the peer 170 from sequence number m+1 to the corresponding App 160 on AB 220. The App 160 on AB 220 starts to read its incoming TCP data from the peer 170.

For an outgoing TCP data stream, the TCP module 150 on AB 220 sends the outgoing TCP data originated from the App 160 on PB 110 from sequence number n+1 to the corresponding App 160 on AB 220. The App 160 on AB 220 starts to read the outgoing TCP data originated from the App 160 on PB 110.

In some embodiments, extended TCP socket options may be used. For outgoing data delivery to an App 160, an option can be set by an App 160 on AB 220. When the option is set or enabled, the TCP module 150 on AB 220 sends, to the App 160, the outgoing TCP data originated from the corresponding App 160 on PB 110. For incoming data delivery to an App 160, an option can be set by an App 160 on AB 220. When set or enabled, the TCP module 150 on AB 220 sends, to the App 160. the incoming TCP data received from the peer 170.

Outgoing data synchronization method options may be used by an App 160 by selecting one of the outgoing TCP data synchronization methods (such as no-Acks, explicit Acks, and implied Acks).

Figure 7:
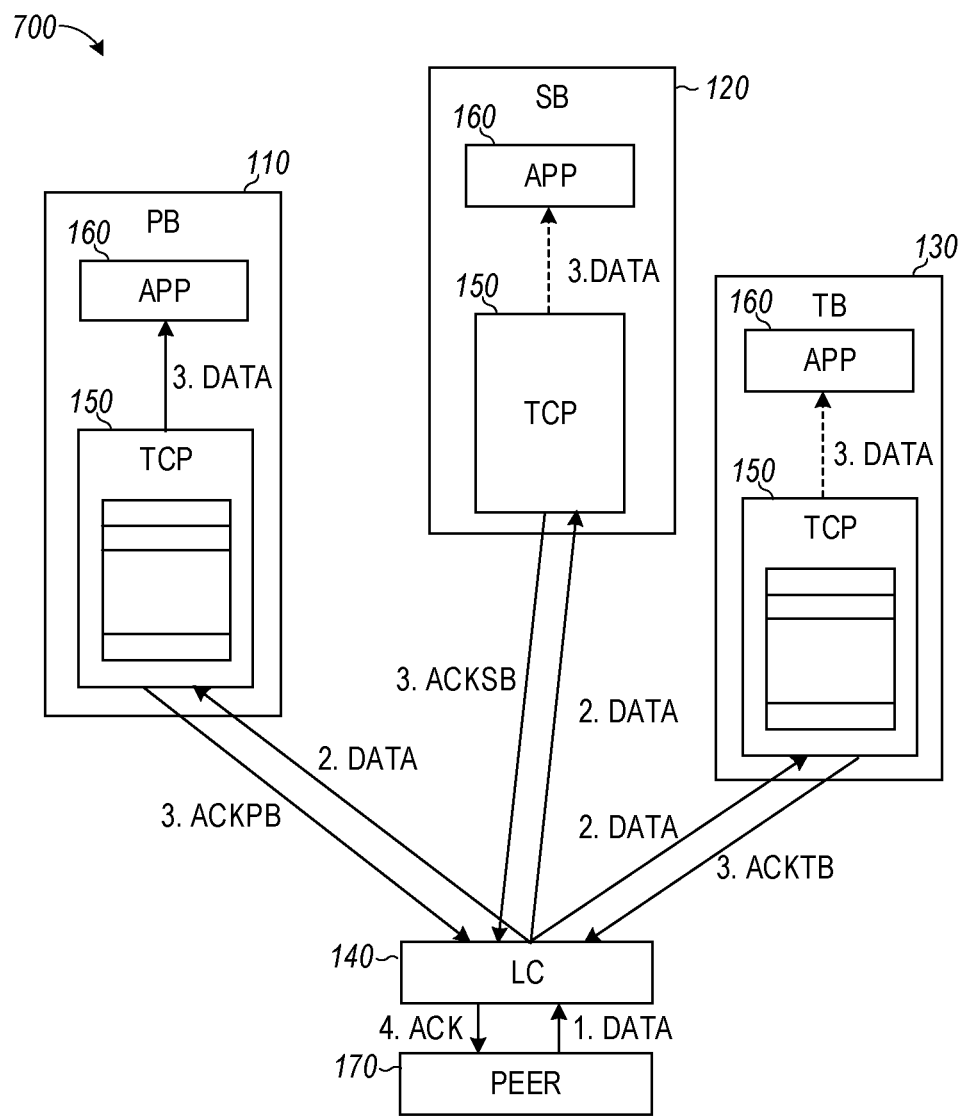
FIG. 7 is a block flow diagram illustrating example connections and message flows for incoming data according to an example embodiment.

FIG. 7 is a block flow diagram 700, similar to FIG. 1A, illustrating example connections and message flows for incoming data (1. Data) to the TCP module 150 on all boards from a peer 170. The description of FIG. 7 provides additional details regarding incoming data. LC 140 receives TCP data (1. Data) from a peer 170 and sends the data (2. Data) to the TCP module 150 on every board in parallel. The TCP module 150 on every board (e.g., PB 110, SB 120 and TB 130) receives the data from the peer 170 via LC 140 and sends the data to its App 160 in parallel. Each board sends its acknowledgment (3. AckPB, AckSB, AckTB) to the LC 140, which sends an acknowledgment (4. Ack) to the peer 170 via LC 140.

LC 140 receives the acknowledgments from the TCP module 150 on every board and sends the peer 170 Ack, where Ack is min {AckPB, AckSB, AckTB}, indicating the minimum data (sequence #) received/ack'ed by all boards. LC 140 may resend data to the TCP module 150 on a board that does not send an acknowledgment or whose acknowledgment is behind others using an input data buffer holding data previously received from the peer 170. With the buffer, LC 140 may send an Ack to the peer 170 after the data in its buffer is acknowledged by the TCP module 150 on every board.

Figure 8:
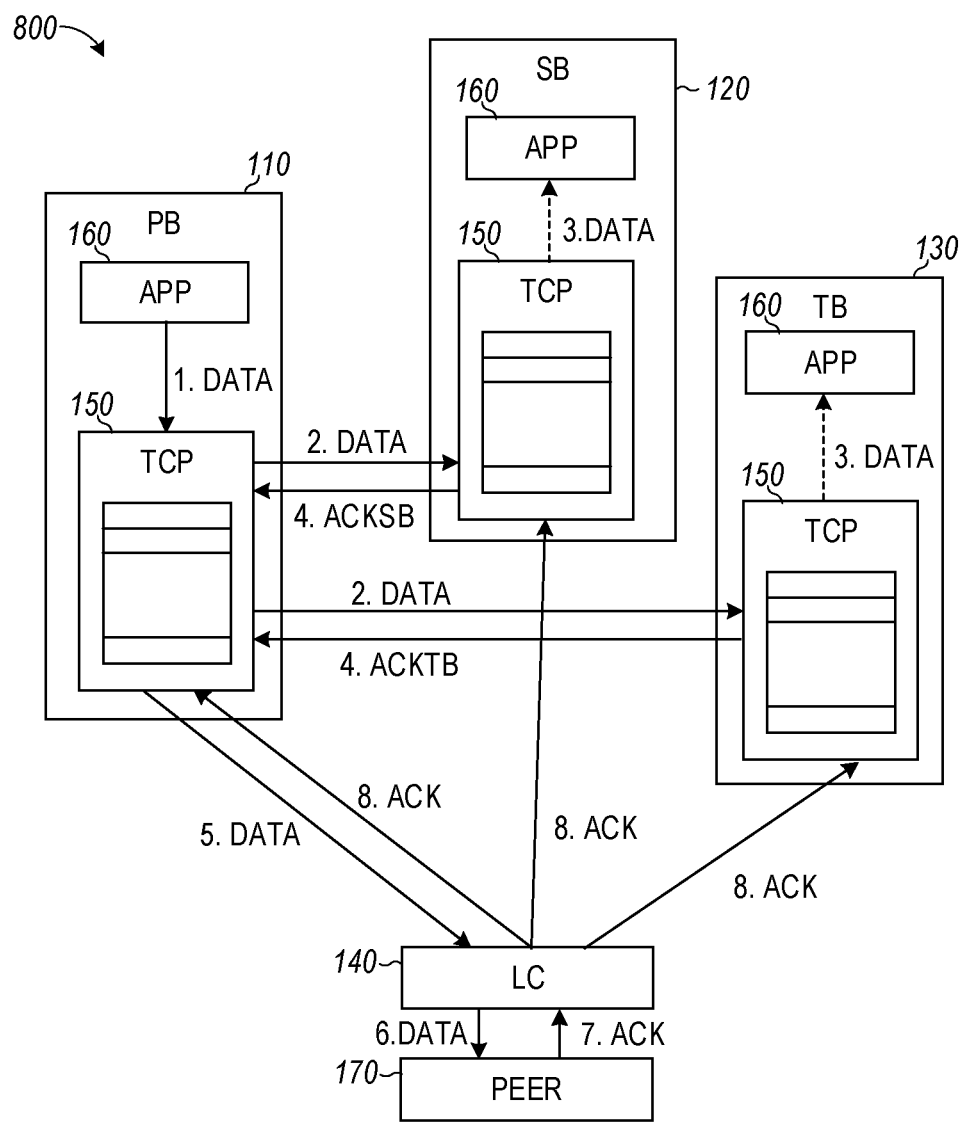
FIG. 8 is a block flow diagram illustrating example connections and message flows for outgoing data according to an example embodiment.

FIG. 8 is a block flow diagram 800, similar to FIG. 1B, illustrating example connections and message flows for outgoing data (1. Data) to the TCP module 150 on all boards from the App 160 on PB 110. The description of FIG. 8 provides additional details regarding outgoing data.

The TCP module 150 on PB 110 receives outgoing TCP data originated from an App 160 such as BGP. The TCP module 150 on PB 110 concurrently sends the data (2. Data) to the TCP module 150 on each of the other boards such as SB 120 (Secondary Board) and TB 130 (Third Board). The TCP modules 150 on SB 120 and TB 130 deliver the TCP data (3. Data) originated from the App 160 on PB 110 to the corresponding Apps 160 on SB 120 and TB 130 in order as needed, and sends respective Acks (4. AckSB, AckTB) to the TCP module 150 on PB 110.

The TCP module 150 on PB 110 receives Acks from the TCP modules 150 on each of the other boards and sends the data (5. Data) to the peer 170 via LC 140 (after receiving Acks from the TCP module 150 on each of the other boards). LC 140 receives the data from the TCP module 150 on PB 110 and sends the data (6. Data) to the peer 170. LC 140 receives an Ack (7. Ack) for the data from the peer 170 and sends the Ack (8. Ack) to the TCP modules 150 on all of the boards.

The TCP module 150 on PB 110 removes the data from its output buffer after receiving the Ack for the data from the peer 170 via LC 140. The TCP module 150 on each of SB 120 and TB 130 removes the data from its output buffer after receiving the Ack for the data from the peer 170 via LC 140, completing the data transfer.

Figure 9:
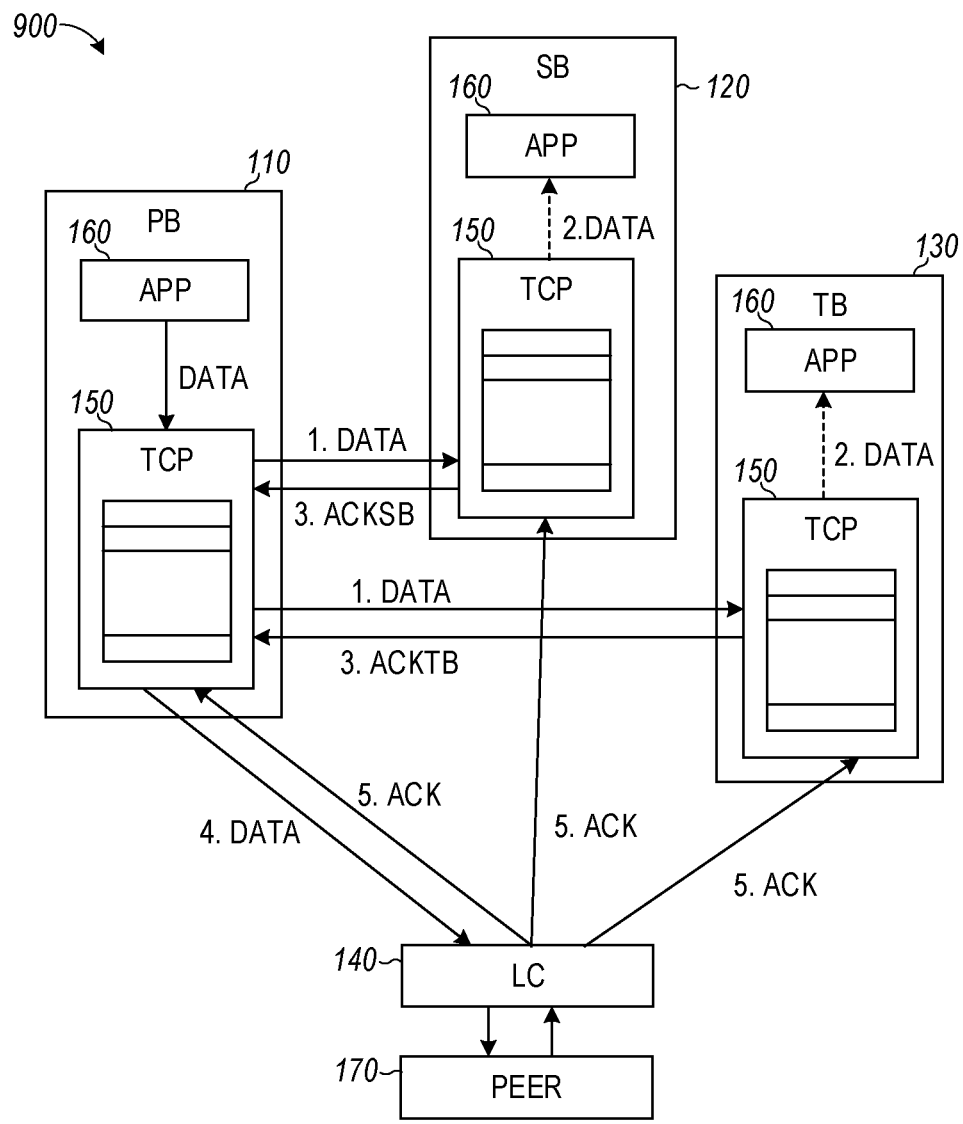
FIG. 9 is a block flow diagram illustrating example connections and message flows for outgoing data according to an example embodiment.

FIG. 9 is a block flow diagram 900 illustrating example connections and message flows for outgoing data from the TCP module 150 on all boards in a further embodiment. Outgoing TCP data originated from an App 160 such as BGP in PB 110 are concurrently sent (1. Data) to the TCP module 150 on each of the other boards such as SB 120 (Secondary Board) and TB 130 (Third Board). The TCP module 150 on SB 120 and TB 130 delivers the TCP data (2. Data) originating from the App 160 in PB 110 to the corresponding Apps 160 in SB 120 and TB 130 in order as needed, and the SB 120 and TB 130 send respective Acks (3. AckSB, AckTB) to the TCP module 150 on PB 110.

The TCP module 150 on PB 110 sends the data (4. Data) to the peer 170 via LC 140 (after receiving Acks from the TCP module 150 on each of the other boards). Ack (5. Ack) from the peer 170 is sent, by the LC 140, to the TCP module 150 on every board. The TCP module 150 on PB 110 removes the data from its window/buffer after receiving Ack for the data from the peer 170 router. The TCP modules 150 on SB 120 and TB 130 remove the data from their window/buffers after receiving Acks for the data from the peer 170 router, completing the data transfer.

Switchover and recovery is performed when a board is detected has having failed. Many different methods of failure detection may be used, such as the use of a heartbeat transmitted by each board that is monitored by other boards, the LC 140, or some other controller coupled serially or in parallel. Absence of the heartbeat may indicate failure of a board, or a communication path to the board.

Responsive to detection of failure of a board, an old AB 220 may become a new PB 110 when the old PB 110 dies or by a configuration change, which as described Above, may be made to make the highest performing board the PB 110. Apps using the TCP module 150 on new PB 110 send data to peers through the TCP module 150. Apps on new PB 110 update their consumers such as RM (Routing table manager). Apps on the new PB 110 receive and process interface events. For any peer 170 session, the session is re-created if the session is not in a final state (e.g., established for a BGP peer 170). The TCP module 150 on the new PB 110 starts to send Acks to peers through LC 140. The TCP module 150 on new PB 110 accepts data from its Apps, sends data to the TCP modules 150 on each of the other boards and then sends data to one or more peers through LC 140 after receiving Acks for the data from the TCP module 150 on every other board.

Figure 10:
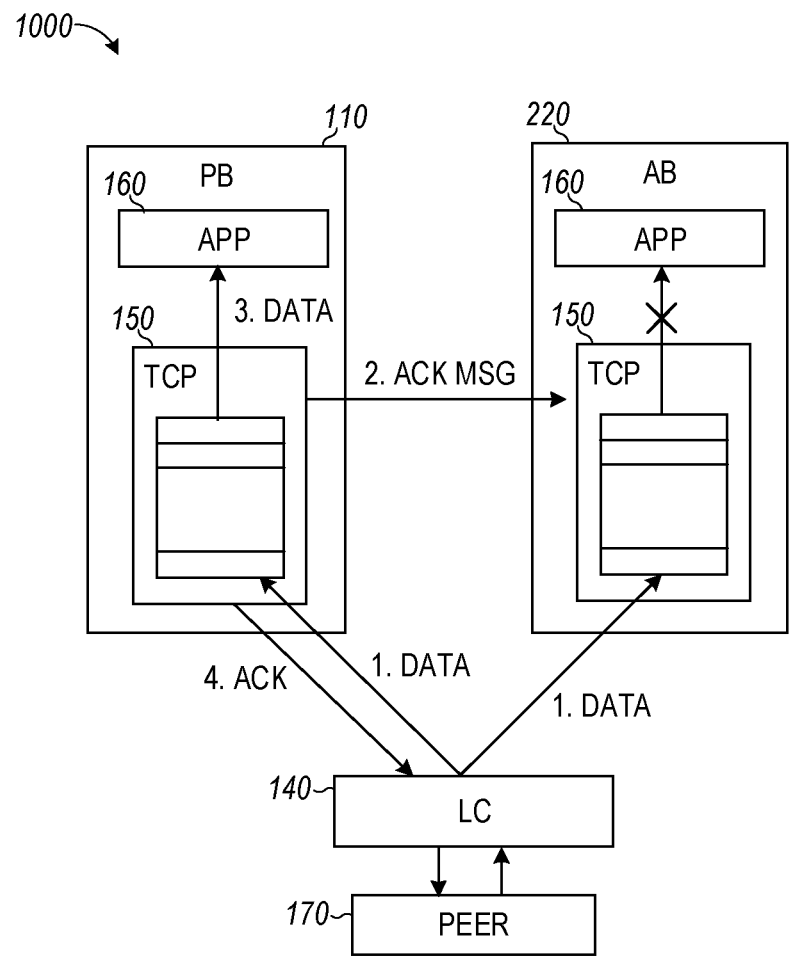
FIG. 10 is a block flow diagram illustrating options for incoming data synchronization according to an example embodiment.

Multiple options for incoming data synchronization are now described with respect to FIGS. 10, 11, 12, and 13. A first option, utilizing explicit Acks, is shown in FIG. 10 at 1000 where incoming TCP data packets are concurrently sent to the TCP module 150 on PB 110, the TCP module 150 on AB 220, and the TCP module 150 on each of the other boards. The TCP module 150 on AB 220 discards the data as indicated by the "X" on FIG. 10. The TCP module 150 on each of the other boards is assumed to deliver the data to the corresponding Apps. The TCP module 150 on AB 220 sends an Ack message to the TCP module 150 on PB 110 after receiving the data from the peer 170 device.

The TCP module 150 on PB 110 delivers data (3. Data) to the App 160 in order after receiving data from the peer 170 and after receiving Ack message (2. Ack msg) for the data from the TCP module 150 on AB 220 and from the TCP module 150 on each of the other boards. The TCP module 150 on PB 110 sends the peer 170 an Ack message for the data it receives from the peer 170 after receiving Ack messages (4. Ack) for the data from the TCP module 150 on AB 220 and the TCP module 150 on each of the other boards.

The first option is very efficient. The incoming data are concurrently sent to and processed by PB 110, AB 220 and all the other boards. The synchronization between PB 110 and AB 220 is done through short acknowledgment messages.

The first option is also very reliable. The impact of the problems on AB 220 on PB 110 is minimized. The TCP module 150 on PB 110 can continue receiving TCP data from the peer 170 and delivering them to the App 160 when there are problems on AB 220, which can be quickly and easily detected by PB 110 through a number of methods. For example, when the TCP module 150 on PB 110 receives a certain amount of data from peers but does not receives any Acks for the data from AB 220, the TCP module 150 on PB 110 can send the data to the App 160 by ignoring Acks and generate an alarm indicating that there may be problems on AB 220.

Figure 11:
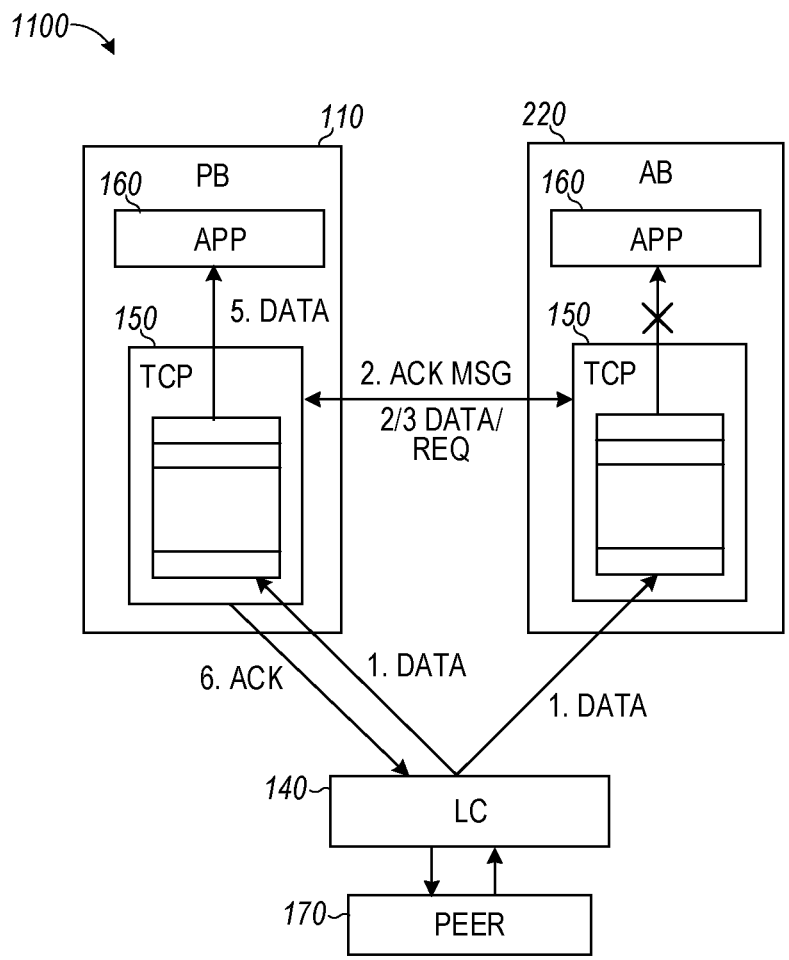
FIG. 11 is a block flow diagram illustrating options for incoming data synchronization according to an example embodiment.

FIG. 11 is a block flow diagram 1100 illustrating a second option that includes operations of the first option and also utilizes a request for data to speed up data transfer. In addition, the TCP module 150 on PB 110 sends data to AB 220 after receiving data for a given time without receiving an Ack message from the TCP module 150 on AB 220. The TCP module 150 on PB 110 sends a request message to the TCP module 150 on AB 220 after not receiving an Ack message from the TCP module 150 on AB 220 for a given interval and without receiving the data from the peer 170 for the given interval. The TCP module 150 on AB 220 sends the data to the TCP module 150 on PB 110 after receiving Request message from the TCP module 150 on PB 110.

In addition to the advantages of option 1, the second option should have higher performance than option 1 in general. In the case that the TCP module 150 on AB 220 misses data from a peer 170 and the TCP module 150 on PB 110 receives the data, the TCP module 150 on PB 110 should send the data to the TCP module 150 on AB 220 faster than the peer 170. In the case that the TCP module 150 on PB 110 misses data from a peer 170 and the TCP module 150 on AB 220 receives the data, the TCP module 150 on AB 220 should send the data to the TCP module 150 on PB 110 faster than the peer 170 through receiving the request from the TCP module 150 on PB 110.

To avoid the impact of unnecessary requests and data on the performance in some special situations, timers for sending data/request messages may be adjusted accordingly. The timers should have a time that is less than the TCP retransmission timer. Timers may be turned off when it is detected that most of the data/requests sent are not necessary (i.e. when sending data/request messages does not significantly speed up the incoming packet synchronization. This can be done by recording the percentage of time saved for the data/requests sent between PB 110 and AB 220).

Figure 12:
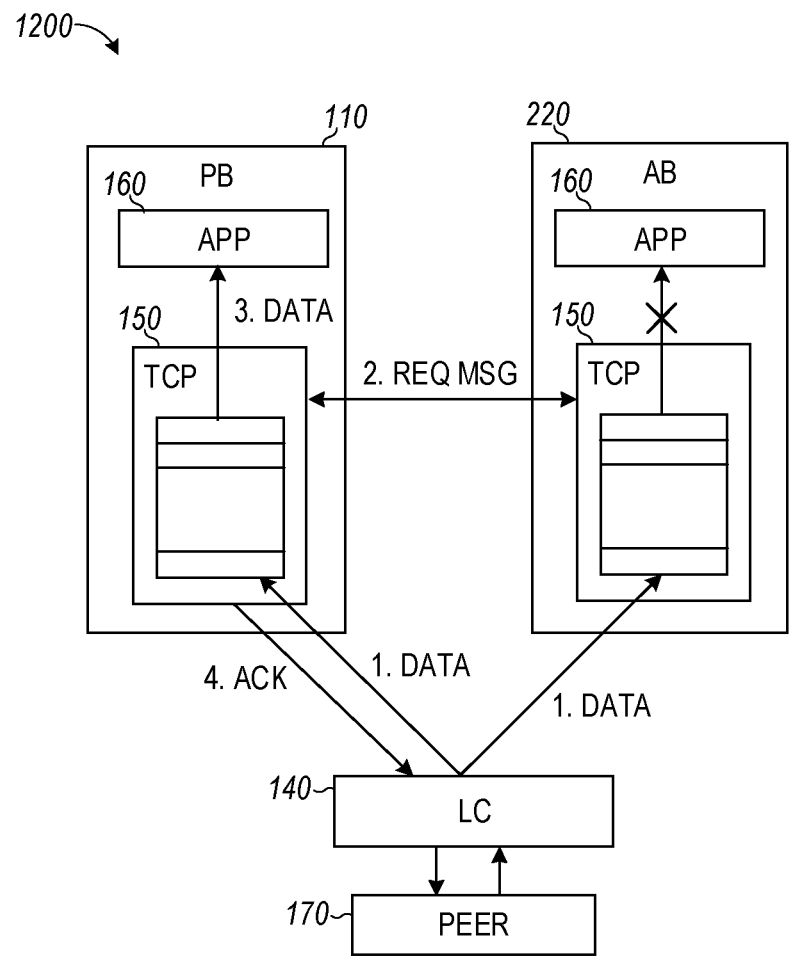
FIG. 12 is a block flow diagram illustrating options for incoming data synchronization according to an example embodiment.

FIG. 12 is a block flow diagram 1200 illustrating a third option that utilizes implied Acks. AB 220 sends PB 110 request messages for missing incoming data. Incoming data packets (1. Data) from peers are concurrently sent to the TCP module 150 on PB 110, the TCP module 150 on AB 220, and the TCP module 150 on each of the other boards. The TCP module 150 on AB 220 does not deliver the data to the corresponding App 160 in order. Instead, TCP module 150 discards the data as indicated by the "x" in FIG. 12. The TCP module 150 on AB 220 sends the TCP module 150 on PB 110 a request (2 Req msg) for the data when it finds some data missing or an empty request when the amount of data sent (assumed) to an App 160 from last request is greater than a given size such as one-half of its window/buffer size or it does not send the TCP module 150 on PB 110 any request for a given time. An empty request contains the sequence number corresponding to the last byte sent to the App 160 on AB 220.

The TCP module 150 on PB 110 sends the App 160 all the data (3. Data) that is older than requested in its buffer in order (i.e. is acknowledged by the TCP module 150 on AB 220 and the TCP module 150 on each of the other boards). The TCP module 150 on PB 110 sends acknowledgments (4. Ack) to the peer 170 via LC 140 for all the data in its window/buffer that is older than that requested (i.e. is acknowledged by the TCP module 150 on AB 220 and the TCP module 150 on each of the other boards).

The use of implied Acks in the third option may provide additional advantages to the first option. The third option should have higher performance than the first option in general. A request for the data missing on AB 220 acts as a negative acknowledgment. An empty request from AB 220 to PB 110 implies that the TCP module 150 on AB 220 received all the data before the sequence number in the request. From these requests, the TCP module 150 on PB 110 can determine what data is missing on AB 220 and what data is missing on PB 110.

If the TCP module 150 on AB 220 sends the TCP module 150 on PB 110 an implied acknowledgment (i.e. an empty request) after receiving a data packet, this option is almost equivalent to the first option. The frequency of sending implied acknowledgments can be adjusted by the number of packets/bytes received or by using a timer. For large incoming traffic flows, a lower implied acknowledgment frequency will further reduce the IPC bandwidth consumption between PB 110 and AB 220.

Figure 13:
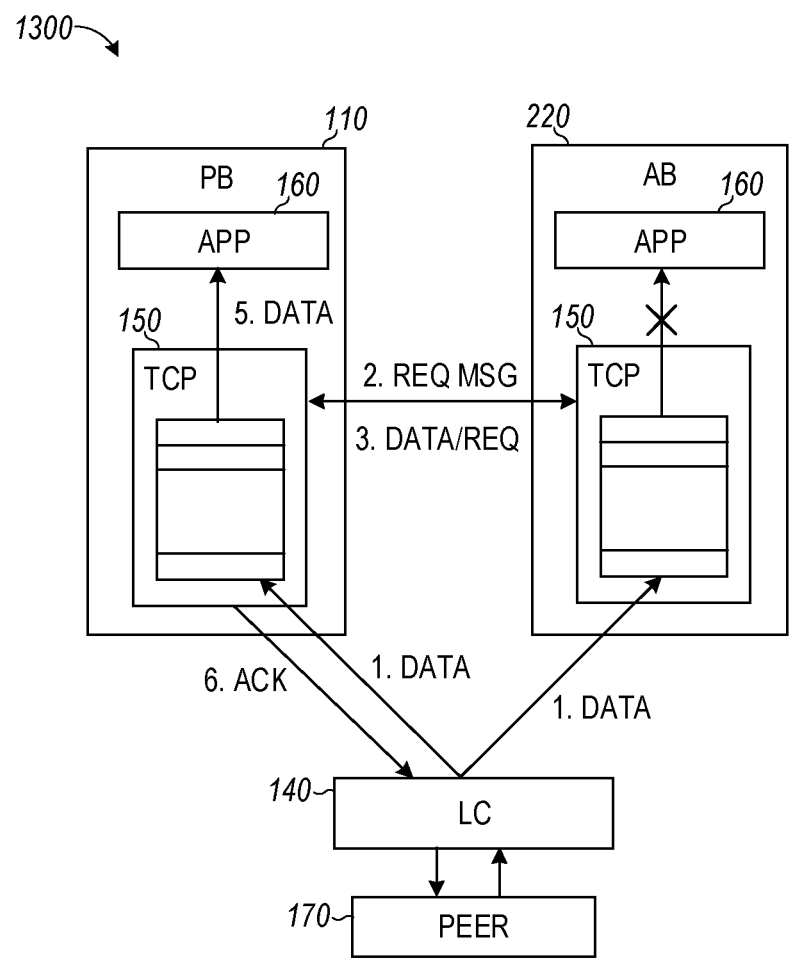
FIG. 13 is a block flow diagram illustrating options for incoming data synchronization according to an example embodiment.

FIG. 13 is a block flow diagram 1300 illustrating a fourth option utilizing implied Acks and requests and data to further speed up data transfer. The fourth option builds on the third option. The TCP module 150 on PB 110 sends the data to the TCP module 150 on AB 220 after receiving a non-empty request message from the TCP module 150 on AB 220. The TCP module 150 on PB 110 sends a request message for the data to the TCP module 150 on AB 220 after determining that the data is missing from the TCP module 150 on PB 110 and that the TCP module 150 on AB 220 received the data. TCP on AB 220 sends the data to the TCP module 150 on PB 110 after receiving the request message from PB 110.

The fourth option, in addition to the advantages of the first option may have higher performance than first and third options in general. In the case that the TCP module 150 on AB 220 misses data from a peer 170 and the TCP module 150 on PB 110 receives the data, TCP on PB 110 sends the data to the TCP module 150 on AB 220 faster than the peer 170. In the case that the TCP module 150 on PB 110 misses data from a peer 170 and TCP on AB 220 receives the data, the TCP module 150 on AB 220 sends the data to the TCP module 150 on PB 110 faster than the peer 170 through receiving the request from the TCP module 150 on PB 110.

To avoid the impact of unnecessary requests and data on the performance in some special situations, timers for sending data/request messages may be adjusted accordingly. The time should be less than the TCP retransmission timer. The timers may be turned off when it is detected that most of the data/requests sent are not necessary (i.e. sending data/request messages does not speed up the incoming packet synchronization a lot. This can be done by recording the percentage of time saved for the data/requests sent between PB 110 and AB 220).

Figure 14:
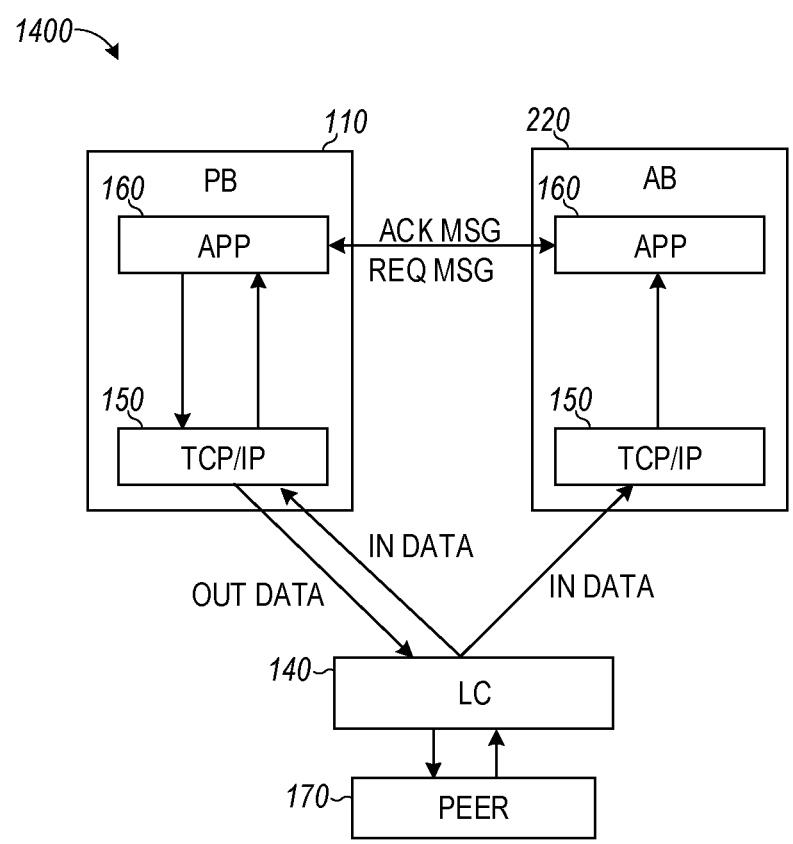
FIG. 14 is a block flow diagram illustrating an example multiple board high availability system for communications utilizing TCP/IP modules according to an example embodiment.

FIG. 14 is a block flow diagram 1400 illustrating an example multiple board high availability system 1400 for communications utilizing TCP/IP modules that include a TCP stack and an IP stack. The system may not need extra supports from the IP stack. Incoming data from neighbor routers are concurrently sent to Apps on PB 110 and each of the other boards. Apps on PB 110 and each of the other boards receive and process the incoming data concurrently. The App 160 on PB 110 sends outgoing data directly to neighbor routers through LC 140.

The App 160 on each of the other boards sends an Ack message to the PB 110 for the data it receives and processes. App 160 on PB 110 sends an Ack message to neighbor router after it receives the data and the Ack messages for the packet from all the other boards.

The TCP/IP based boards operate by an App 160 on PB 110 sending a Request message to AB 220 after not receiving Ack message for the data for a given interval and without receiving the data from the TCP/IP for the interval. The App 160 on PB 110 sends the data to AB 220 after receiving the data from the TCP/IP without receiving an Ack message from AB 220 for a given time. App 160 on AB 220 sends the data to the PB 110 after receiving the Request message from PB 110.

Sequential/Serial High Availability Embodiments

A system includes a primary board having circuitry for executing a primary App and a TCP module. A secondary board has circuitry for executing a secondary copy of the primary App and a secondary TCP module. A third board has circuitry for executing a third copy of the primary App and a third TCP module. A line card is coupled to the third board, wherein the primary board, secondary board and third board are coupled sequentially to transfer data and acknowledgments between each sequential pair of boards via their respective TCP modules, and wherein the boards are reconfigurable via a switching fabric such as a crossbar switch or an Ethernet switch such that each board can communicate with the line card regardless of the failure of one or two of the boards.

The system may use various methods to provide sequential high availability. A first method includes receiving incoming data from a peer device via a line card in a router, sending the received incoming data from the line card via a serial connection to the third board, from the third board to the secondary board, and from the secondary board to the primary board in sequence, wherein TCP modules in the boards receive the incoming data, providing the data to an App duplicated on the at least three boards via the TCP modules on each board, each board acknowledging receipt of the data via the TCP modules and serial connection in sequence from the primary board, through the secondary board and the third board to the line card, and acknowledging receipt of the data to the peer device via the line card responsive to all the boards acknowledging receipt of the data.

A further method includes receiving data from an App running on a primary board in a router, the data being received by a TCP module on the primary board, the TCP module on the primary board providing the received data via a serial connection through at least two other boards each having a TCP module and a copy of the App, wherein one of the other boards is a last board, the TCP module on the last board providing the received data to a line card coupled via the serial connection to the last board, and providing an acknowledgment to each board in succession via the serial connection responsive to successful provision of the data by the line card to a peer device.

Yet a further method includes coupling a primary board having circuitry for executing a primary App and a TCP module, a secondary board having circuitry for executing a secondary copy of the primary App and a secondary TCP module, a third board having circuitry for executing a third copy of the primary App and a third TCP module, and a line card in series to transfer data and acknowledgments between each sequential pair of devices via their respective TCP modules, and wherein the boards are reconfigurable to communicate with the line card regardless of the failure of one or two of the boards, and changing a sequence of the boards such that roles of the board change corresponding to a new sequence, wherein the serial connection is reconfigured to match the new sequence.

Figure 15A:
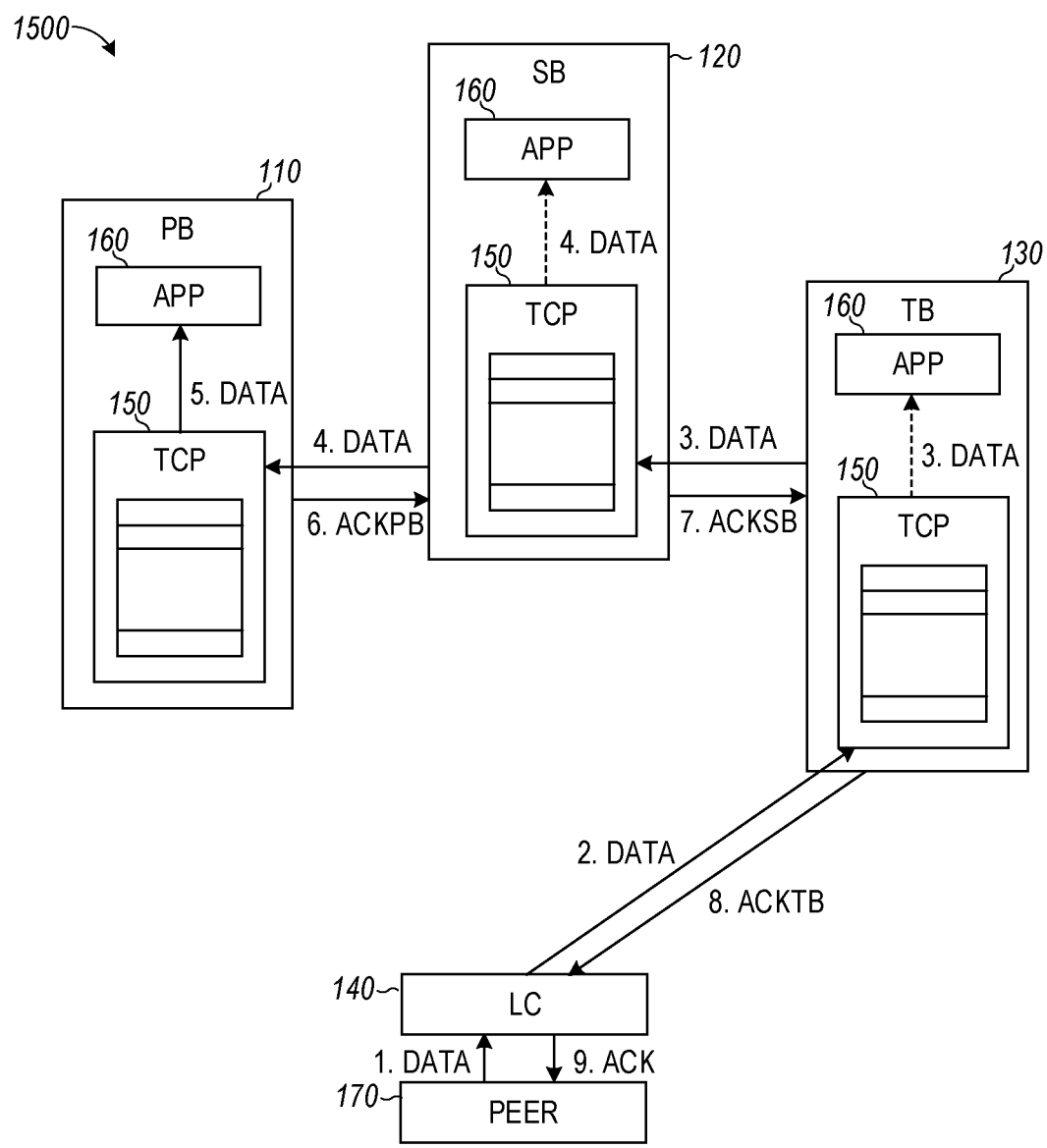
FIG. 15A is a block flow diagram of a router illustrating flow of incoming TCP data according to an example embodiment.
Figure 15B:
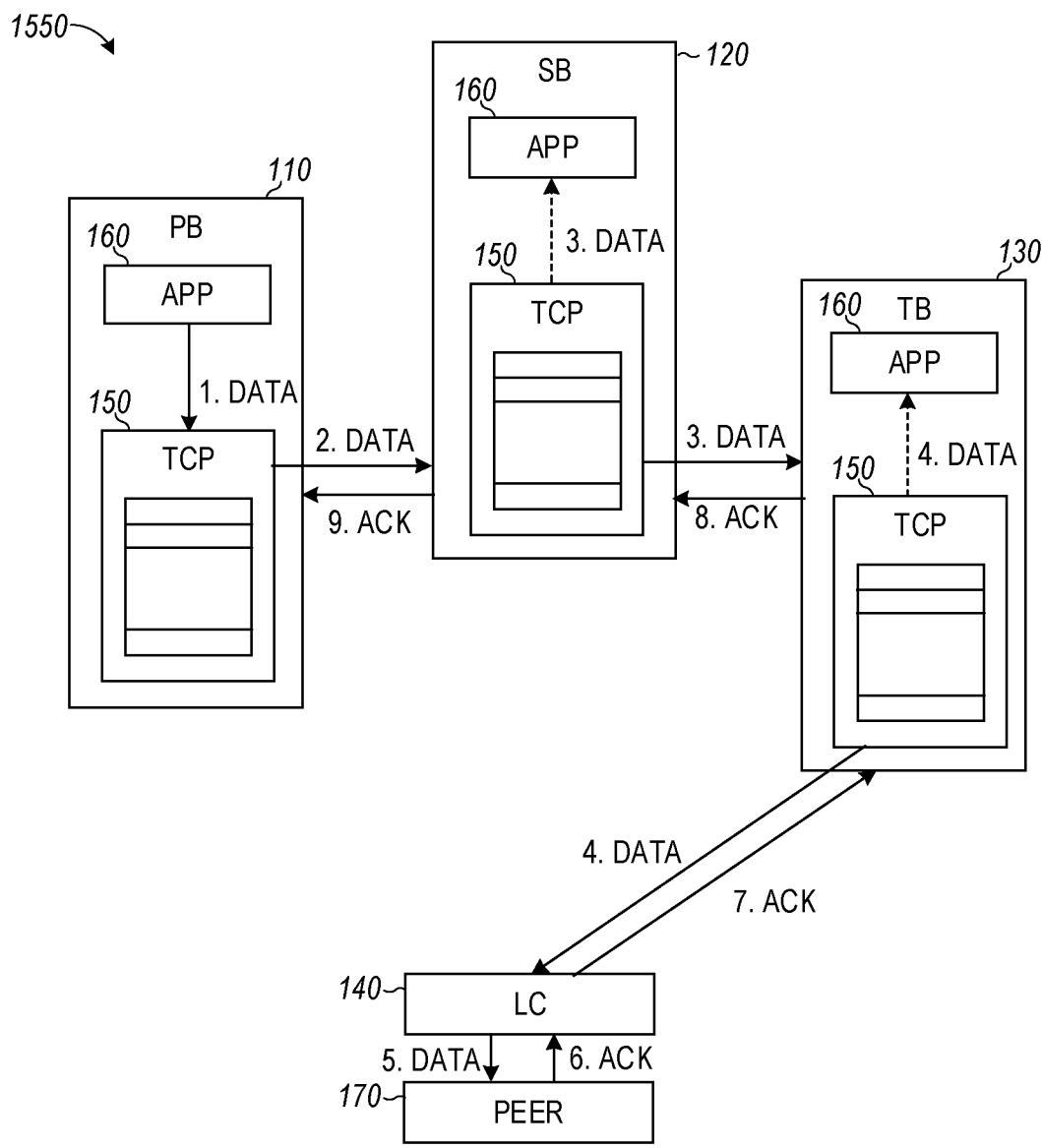
FIG. 15B is a block flow diagram of a router illustrating flow of outgoing TCP data according to an example embodiment.

FIGS. 15A and 15B are block flow diagrams illustrating example an architecture for sequential TCP HA utilizing multiple control boards. Message flow is indicated for incoming data in FIG. 15A at 1500. Message flow for outgoing data shown in FIG. 15B at 1550. The three control boards may be referred to as a Primary Board (PB 110), Secondary Board (SB 120) and Third Board (TB 130) in a router or device. These boards are connected sequentially/serially for transfer of data between the boards. PB 110 connects to SB 120 which connects to TB 130. The last board, TB 130, connects to the Line Card (LC 140) or a number of LCs. Every LC 140 is connected to a peer 170 or neighbor router or device. A TCP module 150 runs on each of the boards. An App 160 (or a number of Apps) uses the TCP module 150 on each of the boards.

In one embodiment, a TCP module 150 runs on each of the three or more router boards. The router boards may include circuitry to perform operations, such as a processor and memory. The memory may include one or more buffers or windows for buffering data being transferred until a transfer is complete. An App 160 or App 160 (or a number of Apps) uses TCP on each of the boards. Apps may include any software that sends and/or receives data, such as browsers, word processing programs, and a multitude of other Apps.

As shown in FIG. 15B at 1500, outgoing TCP data (1. Data) originated from an App 160, such as Border Gateway Protocol (BGP) using the TCP module 150 on PB 110 (2. Data) is sent to the TCP module 150 on the next board such as SB 120, which sends the data (3. Data) to the TCP module 150 on the next sequential board or to the LC 140 (4. Data) if the board is the last board. LC 140 sends the data (5. Data) to a peer 170 device and an Ack (6. Ack) to the TCP module 150 on the last board after receiving the Ack from the peer 170. Each TCP module 150 except for the TCP module 150 on PB 110 sends the TCP data (3. data, 4 Data) to its corresponding Apps in order as needed, and sends an Ack (8. Ack and 9. Ack) to the TCP module 150 on the previous sequential board after receiving an Ack from the next sequential board or from the LC 140 (7. Ack).

As shown in FIG. 15A at 1550, incoming TCP data (1. Data) from a peer 170 is sent to the TCP module 150 on the last board (2. Data) such as TB 130 by a LC 140 connecting to the peer 170, which stores the data in its buffer, sends the data to its App 160(s) (3. Data) and to SB 120 (3. Data) using the TCP module 150 as needed. SB 120 sends the data (4. Data) to its App 160 and to PB 110, which sends the data (5. Data) to its App 160. The TCP modules, starting with PB 110 send acknowledgments in sequence (6. Ack, 7. Ack, and 8. Ack) to the previous boards and to the LC 140. The LC 140 sends the peer 170 an ack (9. Ack) for the data after receiving the Ack (8. Ack) for the data from the TCP module 150 on the last board.

Figure 16:
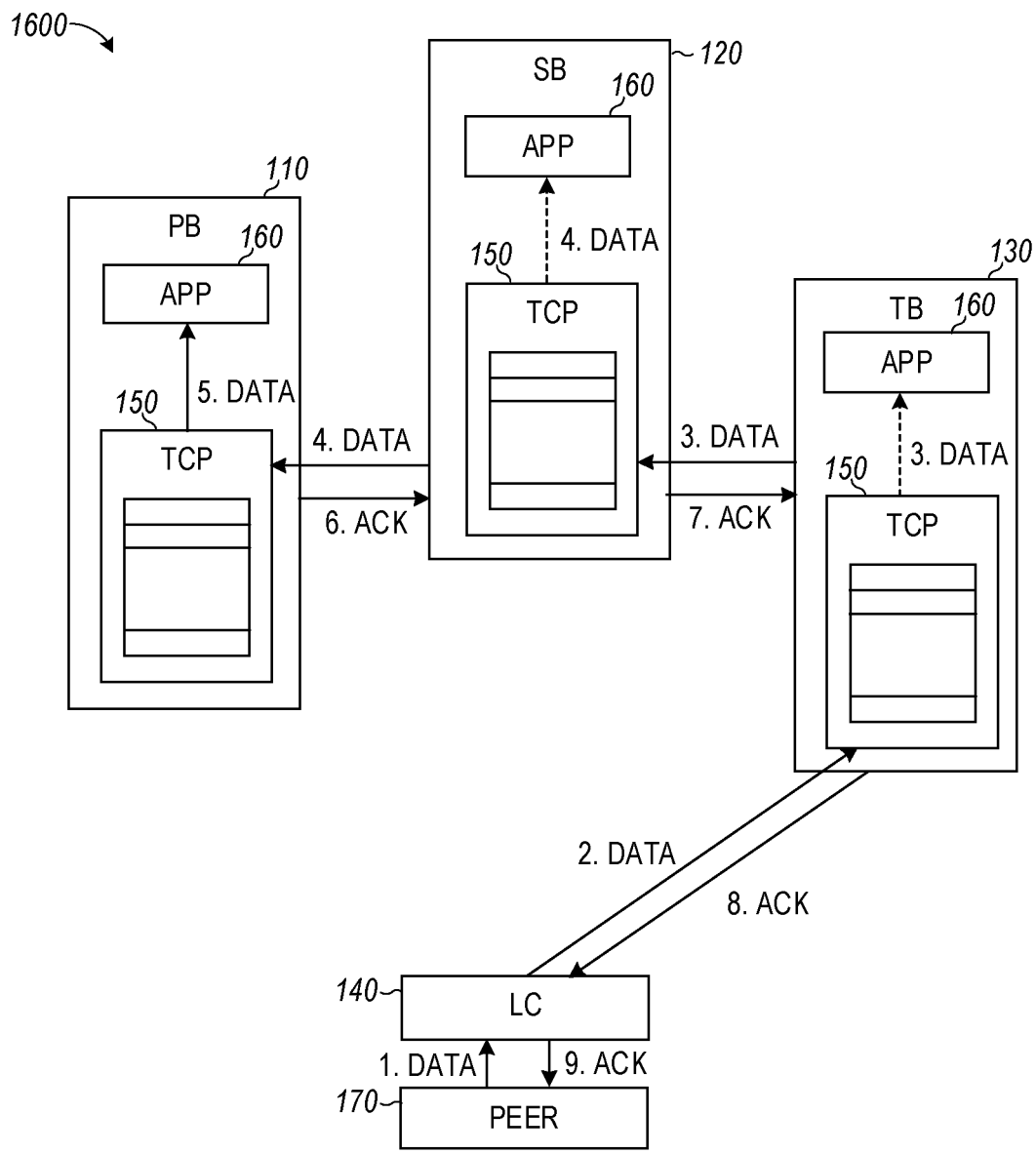
FIG. 16 is a block flow diagram of a router illustrating handling of incoming TCP data according to an example embodiment.

FIG. 16 is a block flow diagram 1600 illustrating further detail regarding the handling of incoming data (1. Data) received by the LC 140 from a peer device 170. TCP data from the peer 170 is sent to the TCP module 150 on the last board such as TB 130 via the LC 140. Incoming TCP data from a peer 170 is sent to an App 160 such as BGP as needed and sent to the TCP module 150 on previous board (e.g., SB 120). Incoming TCP data is sent to an App 160 such as BGP as needed and sent to the TCP module 150 on previous board (e.g., PB 110). An Ack for the incoming TCP data sent to an App 160 on PB 110 such as BGP is sent to the TCP module 150 on next board (e.g., SB 120). On SB 120, an Ack is sent to TCP on next board (e.g., TB 130) after receiving the Ack from previous board (e.g., PB 110). On TB 130, an Ack is sent to LC 140 after receiving the Ack from previous board (e.g., SB 120). On LC 140, the Ack is sent to the peer 170 after receiving the Ack from the last board (e.g., TB 130).

Figure 17:
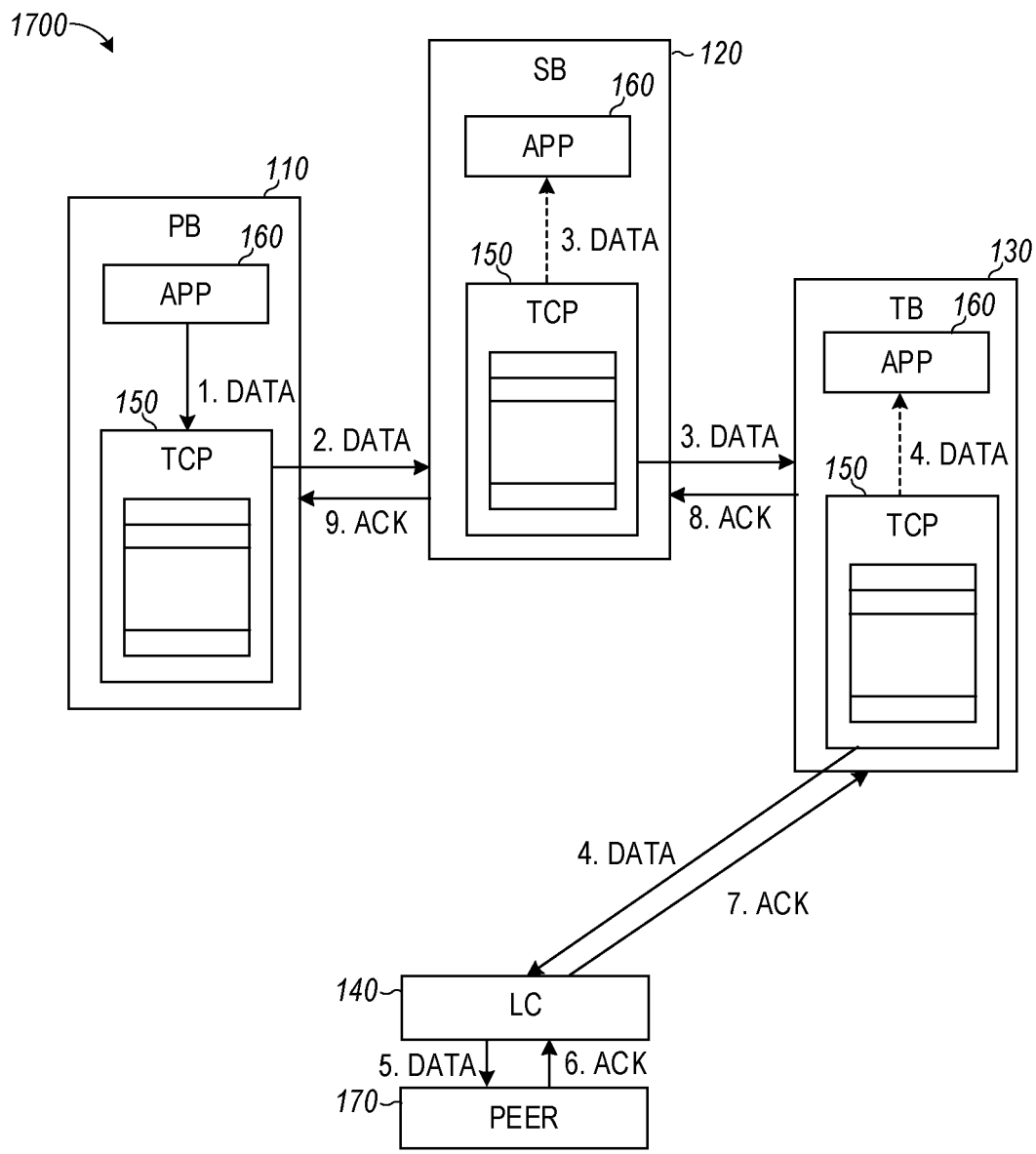
FIG. 17 is a block flow diagram of a router illustrating handling of outgoing TCP data according to an example embodiment.

FIG. 17 is a block flow diagram 1700 illustrating further detail regarding the handling of outgoing data generated from an App 160 on the PB 110. Outgoing TCP data from App 160 such as BGP is sent to the TCP module 150 on PB 110. Outgoing TCP data is then sent to the TCP module 150 on next board (SB 120). On SB 120, outgoing TCP data is sent to an App 160 such as BGP as needed and is sent to the TCP module 150 on the next board (e.g., TB 130). On TB 130, outgoing TCP data is sent to an App 160 such as BGP as needed and is sent to the LC 140. On LC 140, the outgoing TCP data is sent to the peer 170. LC 140 receives the Ack from the peer 170 and sends an Ack to the TCP module 150 on the last board (e.g., TB 130). TB 130, after receiving Ack from LC 140, removes the acknowledged data from its buffer and sends an Ack to the TCP module 150 on its previous board (e.g., SB 120). SB 120, after receiving Ack from TB 130, removes the acknowledged data from its buffer and sends an Ack to the TCP module 150 on its previous board (e.g., PB 110). PB 110, after receiving Ack from SB 120, removes the acknowledged data from its buffer.

While three boards are shown, the system may be expanded to accommodate further boards in a serial connected manner to ensure all boards are synchronized. Incoming data is sent serially from the line card to the last board and board by board to the first or primary board once an added board or boards are synchronized. The boards each update their apps and acknowledge receipt serially from the primary board back to the line card. For outgoing data, the PB 110 may simply send the data to more than two boards and coordinate reception of acknowledgments from each board prior to sending the data to the line card. The line card would then send an acknowledgment to each board following acknowledgment of receipt by a peer 170.

In some embodiments, boards may be added and synchronized to such that their TCP modules are in a same state as the TCP modules on the other boards. In one embodiment, the TCP state of the PB 110 is smoothly synchronized or backed up to the newly inserted board such as the SB 120 or TB 130 or a fourth or further board. A configuration file may be used to determine the role each board takes, resulting in rerouting of data traffic between the boards. The configuration file may be modified by a human operator or control logic that may take into account measured board reliability, assigning the highest reliable board as the PB 110, with succeeding boards assigned as the SB 120 and TB 130 if there are a sufficient number of boards still operating.

In further embodiments, the architecture operates to quickly and smoothly switch over the control on TCP and others to a live board such as TB 130 when PB 110 and SB 120 fail at the same time.

Figure 18:
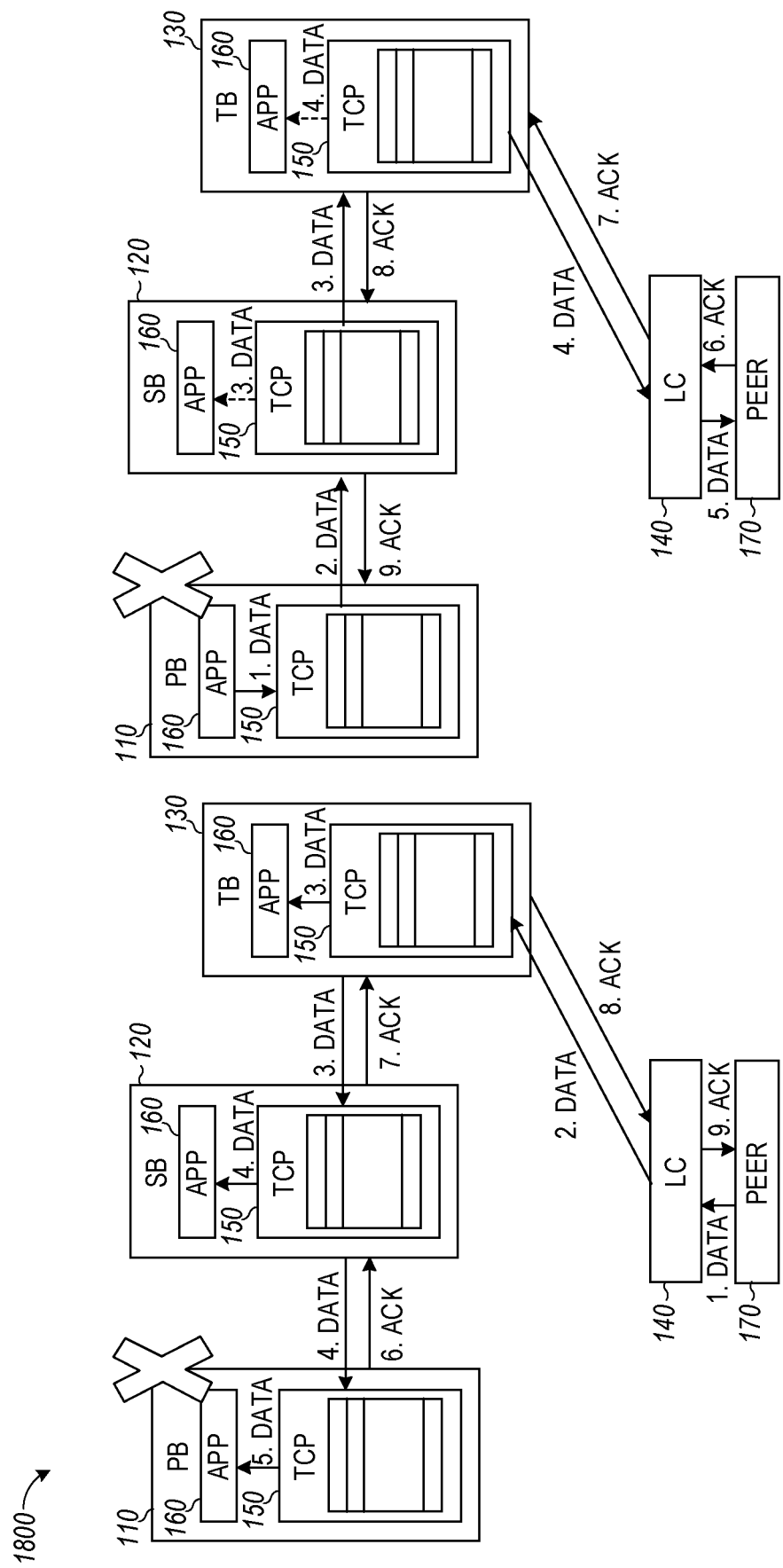
FIG. 18 is a block flow diagram illustrating example operation when the primary board fails or is removed according to an example embodiment.
Figure 19:
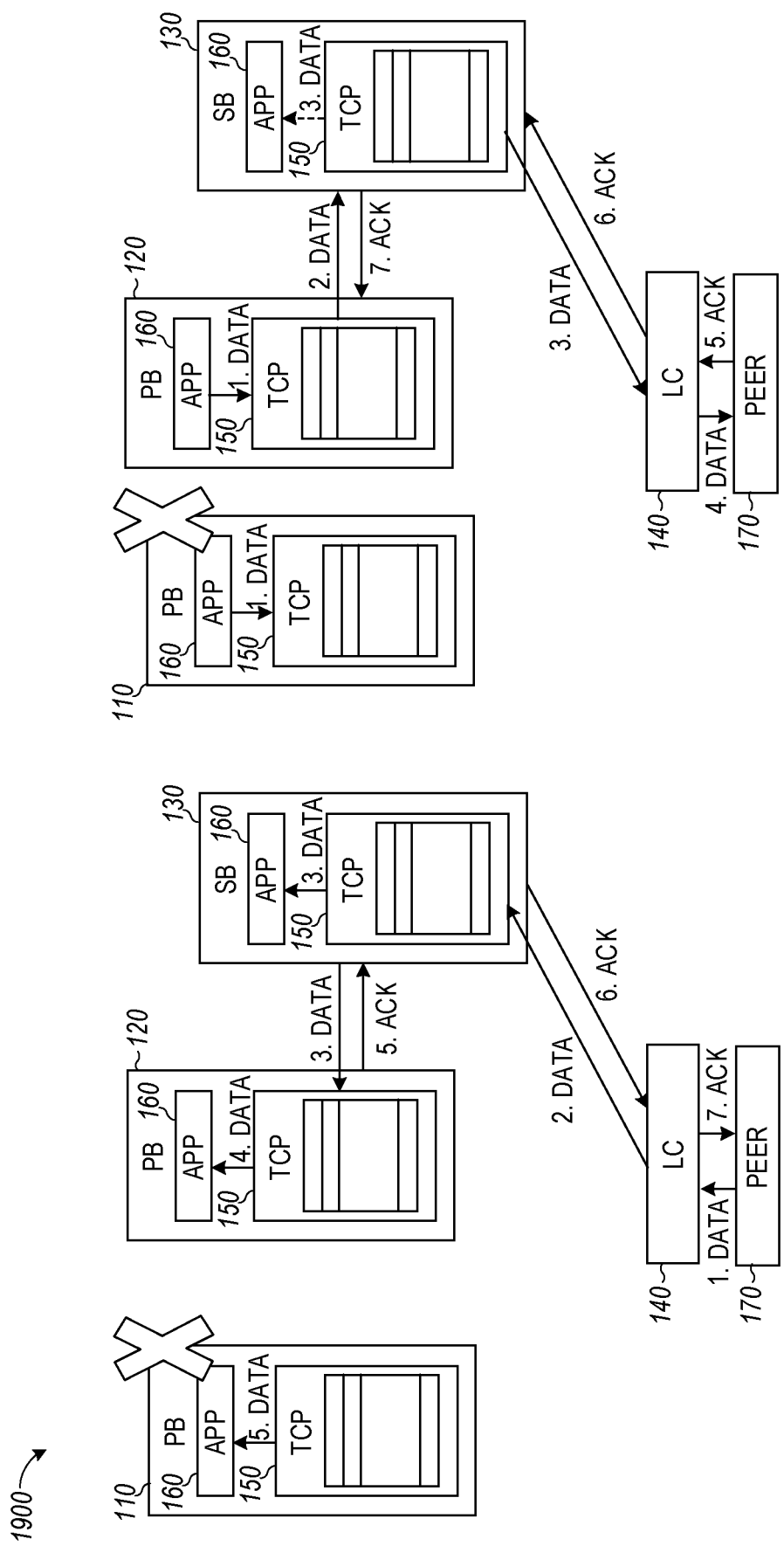
FIG. 19 is a block flow diagram illustrating example operation when the primary board fails or is removed according to an example embodiment.

FIGS. 18 and 19 are block flow diagrams 1800 and 1900 illustrating example operation when the primary board fails or is removed. The PB 110 is shown with an "X" indicating such failure or removal. FIG. 18 at 1800 shows the message flow prior to the failure, with the PB 110, SB 120, and TB 130 passing data and acknowledgments in a sequential manner, as described above with reference to FIGS. 15A, 15B, 16 and 17. Incoming data is indicated on the left side of FIGS. 18 and 19, and outgoing data is indicated on the right side of FIGS. 18 and 19. When the primary board no longer operates, the former SB 120 becomes a new PB 110 and the former TB 130 becomes the new SB 120 as shown in FIG. 19 at 1900. Message flow is identical to that in FIG. 18, except that communications no longer make their way to the former PB 110.

Figure 20:
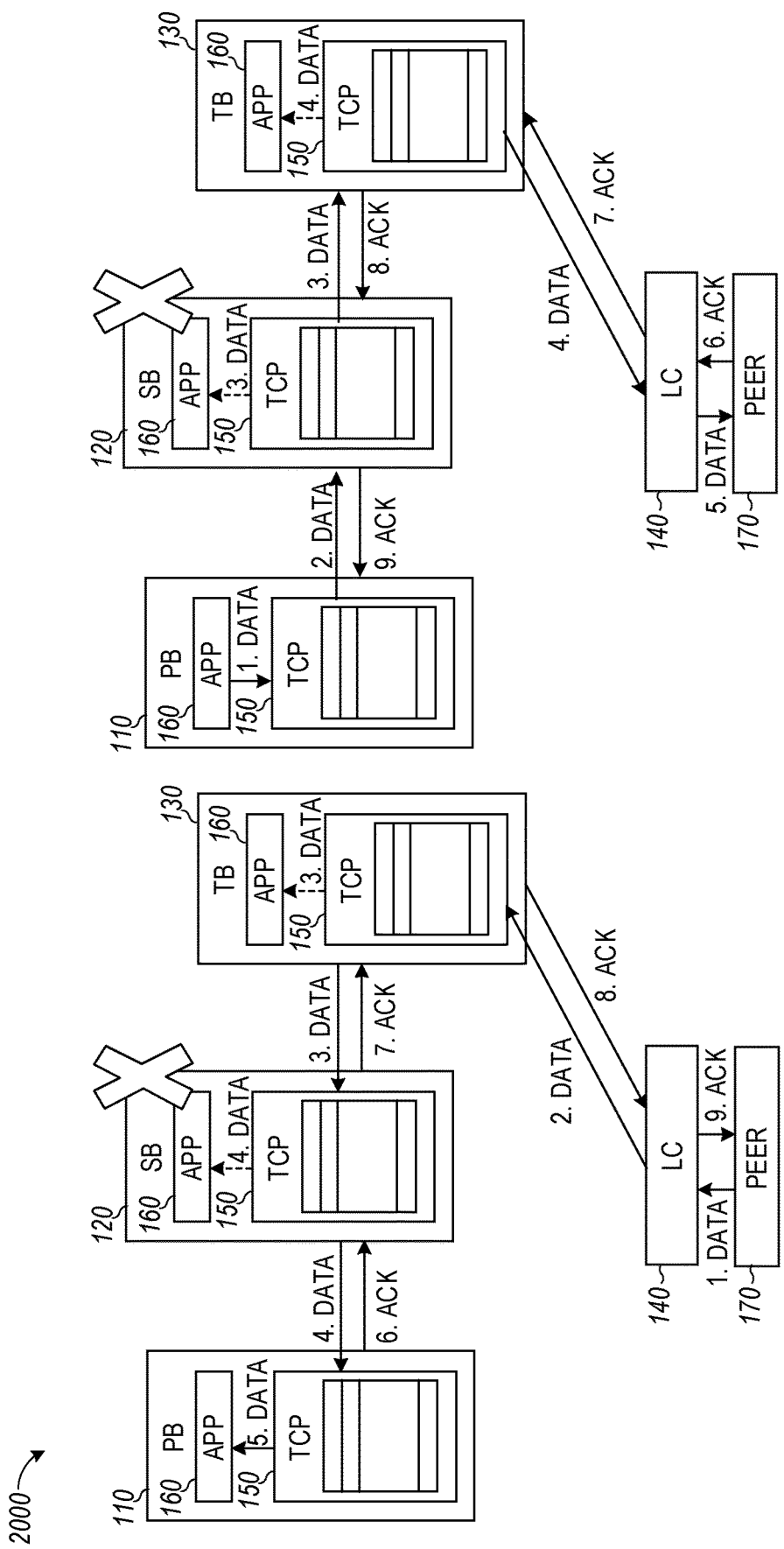
FIG. 20 is a block flow diagram illustrating example operation when the secondary board fails or is removed according to an example embodiment.
Figure 21:
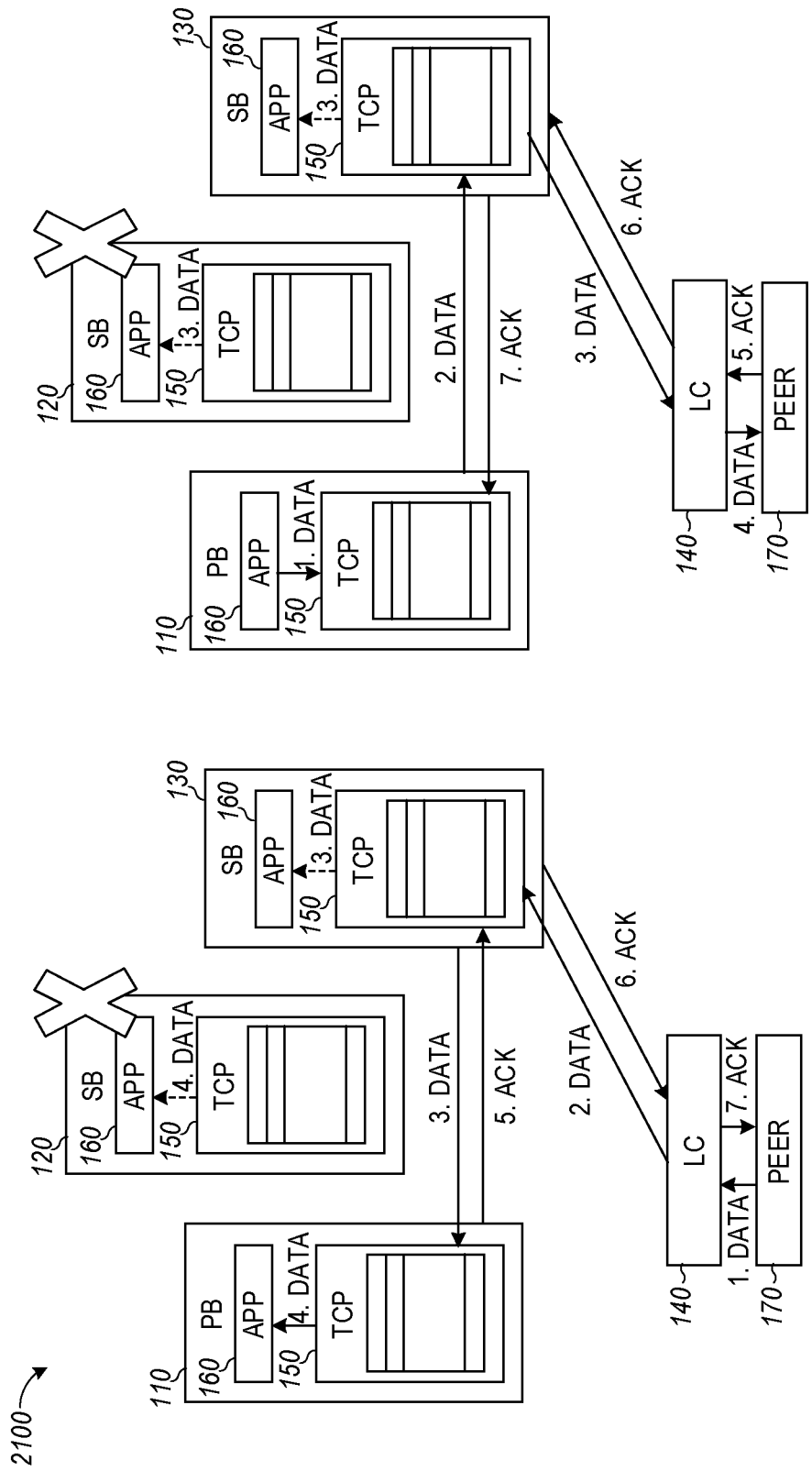
FIG. 21 is a block flow diagram illustrating example operation when the secondary board fails or is removed according to an example embodiment.

FIGS. 20 and 21 are block flow diagrams 2000 and 2100 illustrating example operation when the secondary board fails or is removed. The SB 120 is shown with an "X" indicating such failure or removal. FIG. 20 at 2000 shows the message flow prior to the failure, with the PB 110, SB 120, and TB 130 passing data and acknowledgments in a sequential manner, as described above with reference to FIGS. 15A, 15B, 16 and 17. Incoming data is indicated on the left side of FIGS. 20 and 21, and outgoing data is indicated on the right side of FIGS. 20 and 21. When the SB 120 no longer operates, the former TB 130 becomes a new SB 120 as shown in FIG. 21 at 2100. Message flow is changed such that communications occur between the new SB 120 and the PB 110, bypassing the former SB 120.

Figure 22:
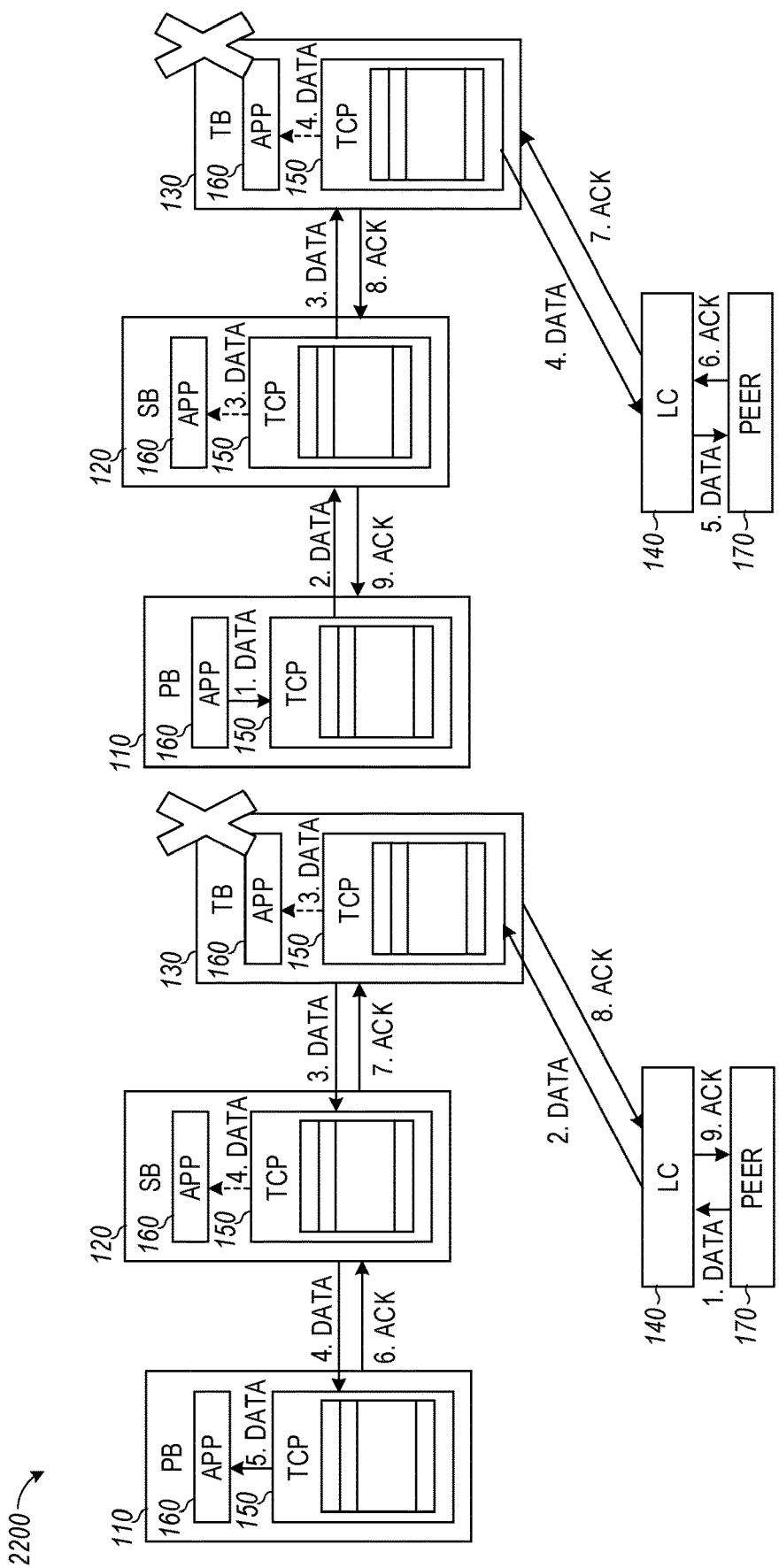
FIG. 22 is a block flow diagram illustrating example operation when the third board fails or is removed according to an example embodiment.
Figure 23:
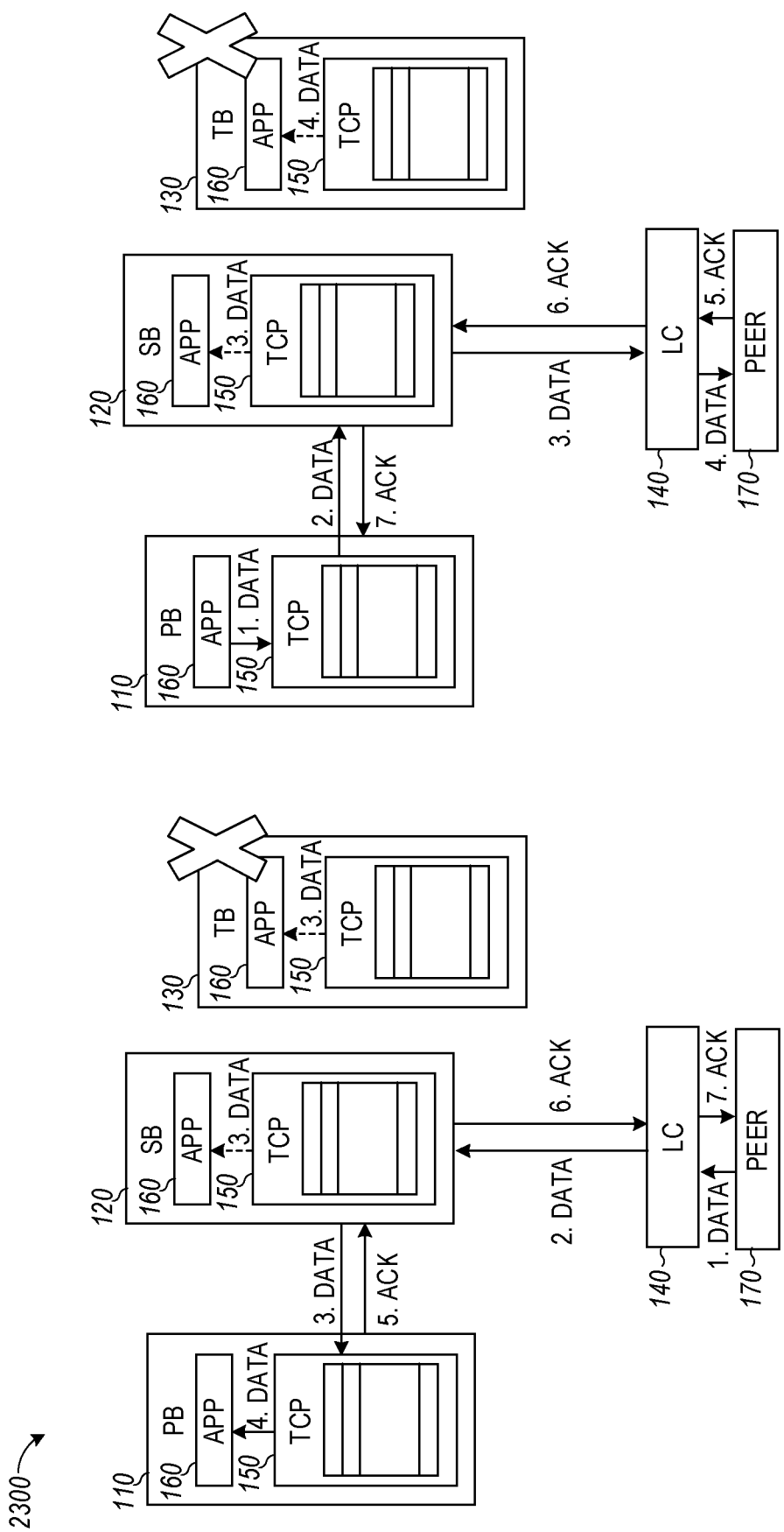
FIG. 23 is a block flow diagram illustrating example operation when the third board fails or is removed according to an example embodiment.

FIGS. 22 and 23 are block flow diagrams 2200 and 2300 illustrating example operation when the third board fails or is removed. The TB 130 is shown with an "X" indicating such failure or removal. FIG. 22 at 2200 shows the message flow prior to the failure, with the PB 110, SB 120, and TB 130 passing data and acknowledgments in a sequential manner, as described above with reference to FIGS. 15A, 15B, 16 and 17. Incoming data is indicated on the left side of FIGS. 22 and 23, and outgoing data is indicated on the right side of FIGS. 22 and 23. When the TB 130 no longer operates as represented in FIG. 23 at 2300, message flow is changed such that communications with the LC 140 occur between the LC 140 and SB 120, and then sequentially to the PB 110, bypassing the TB 130.

Figure 24:
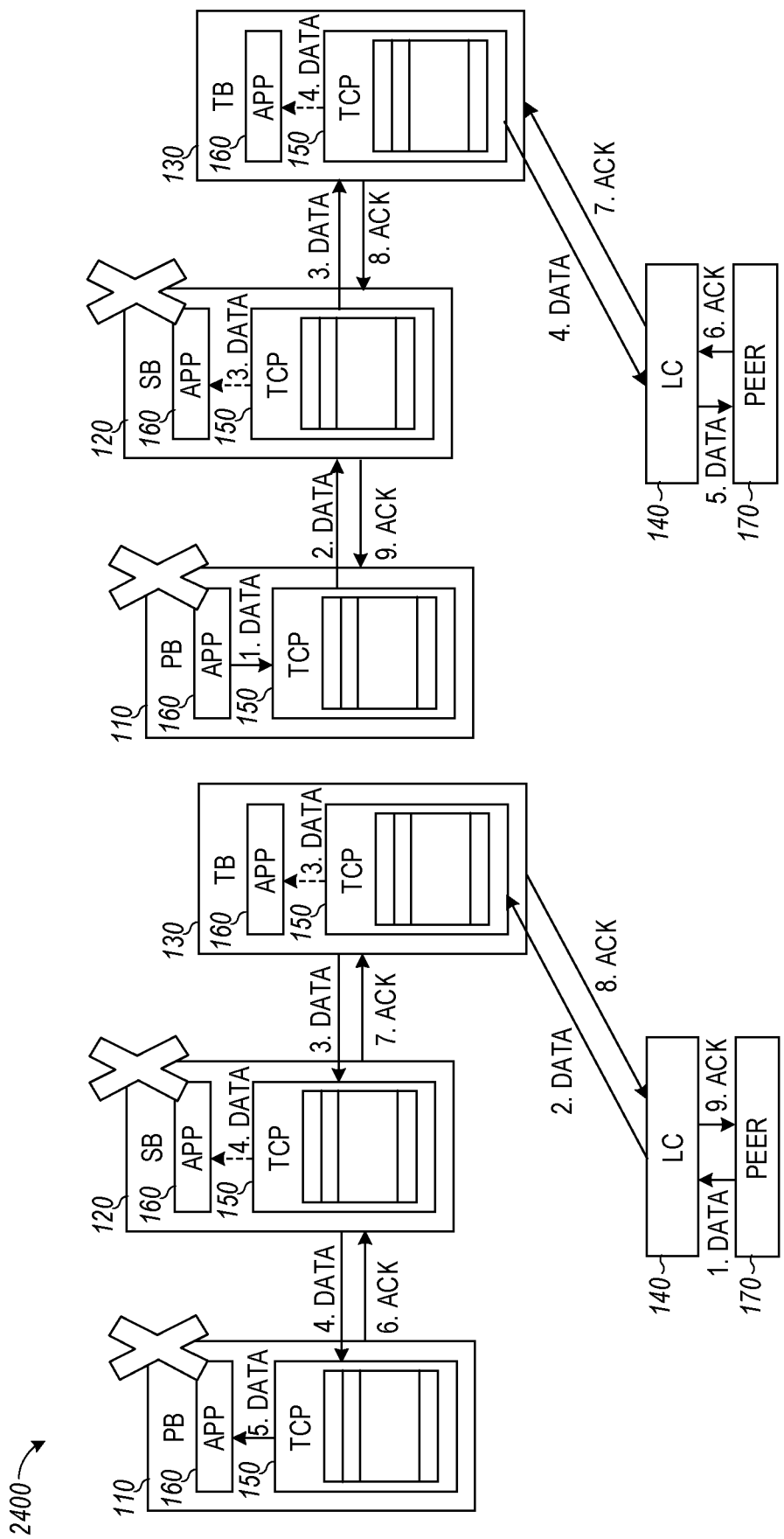
FIG. 24 is a block flow diagram of an example illustrating the failure of two boards according to an example embodiment.
Figure 25:
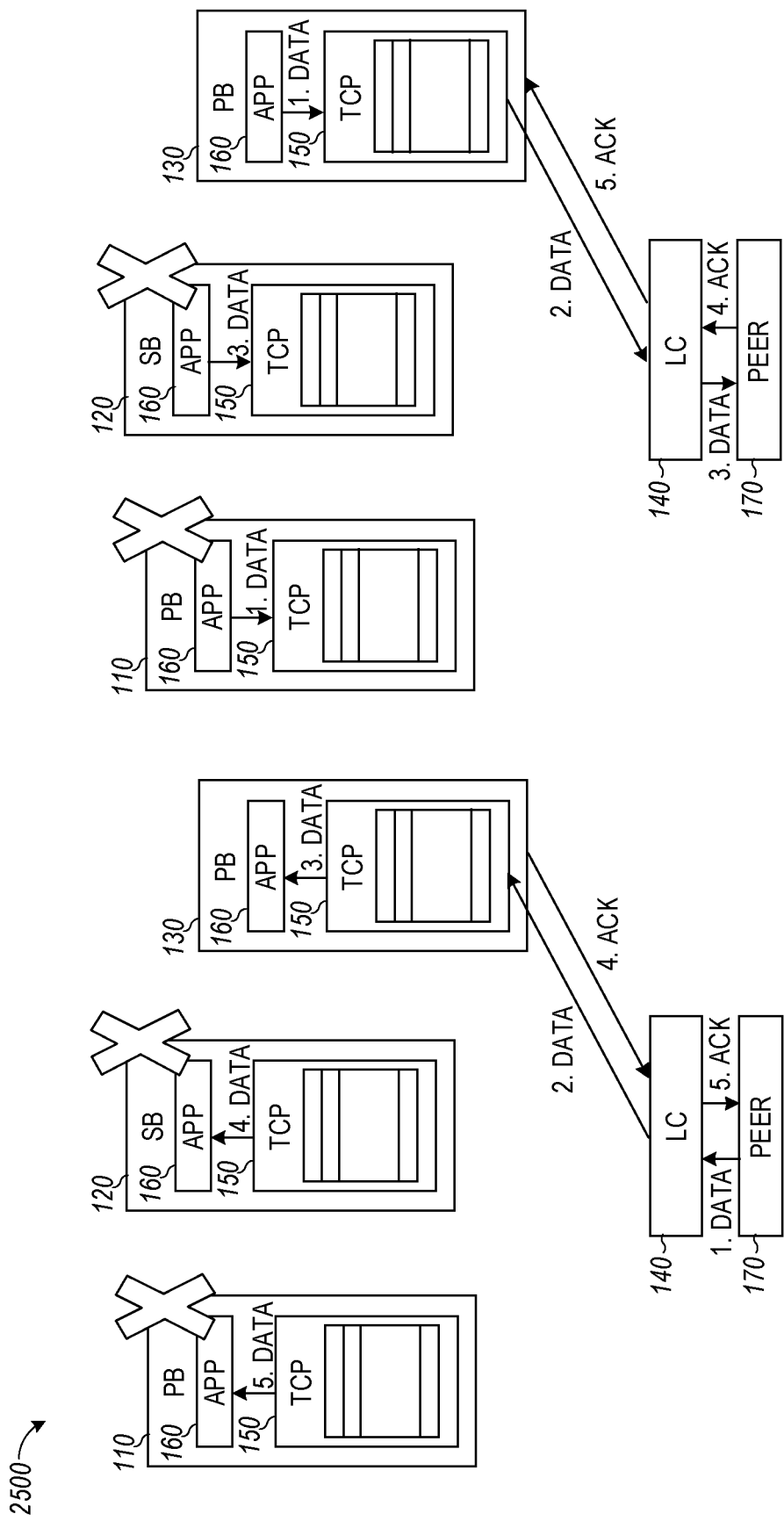
FIG. 25 is a block flow diagram of an example illustrating the failure of two boards according to an example embodiment.

FIGS. 24 and 25 are block flow diagrams 2400 and 2500 of an example illustrating the failure of two boards, the PB 110 and SB 120, as indicated by the "X"s. FIG. 24 at 2400 illustrate prior sequential message flow, while FIG. 25 at 2500 indicates the new message flow following failure. In this example, the former TB 130 in FIG. 24 becomes the new PB 110 in FIG. 25.

Figure 26:
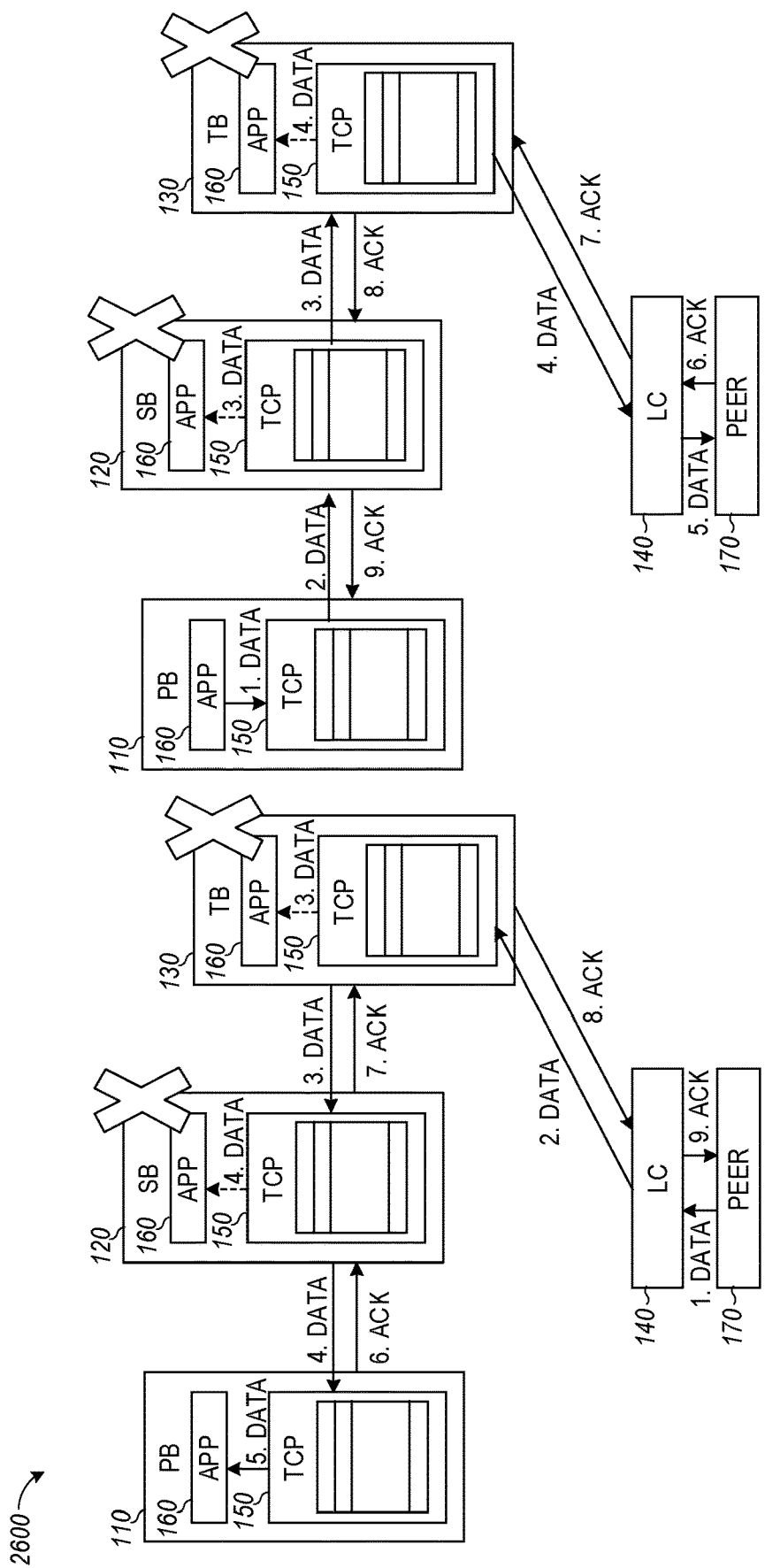
FIG. 26 is a block flow diagram of an example illustrating the failure of two boards according to an example embodiment.
Figure 27:
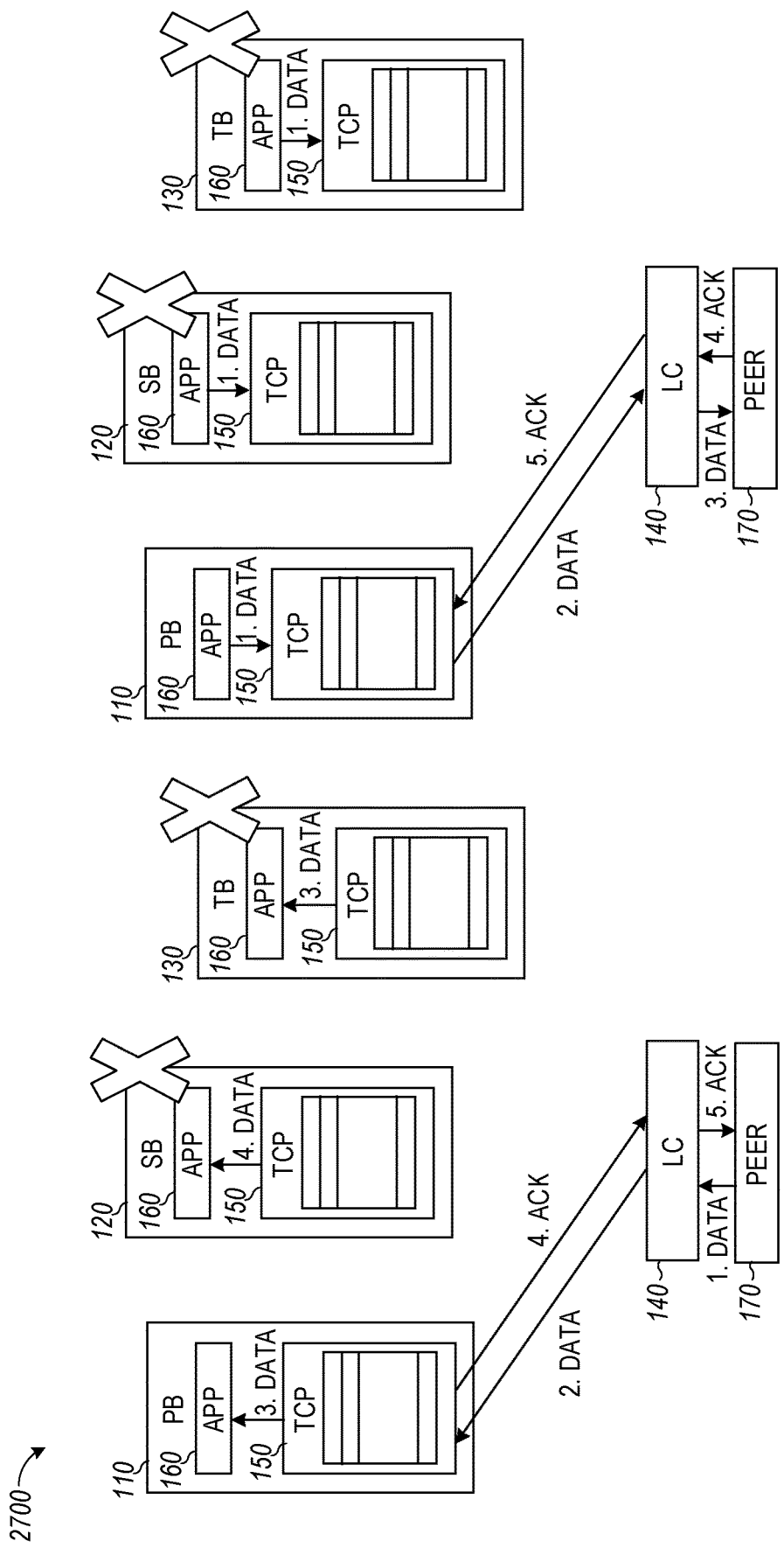
FIG. 27 is a block flow diagram of an example illustrating the failure of two boards according to an example embodiment.

FIGS. 26 and 27 are block flow diagrams 2600 and 2700 of an example illustrating the failure of two boards, the SB 120 and TB 130, as indicated by the "X"s. FIG. 26 at 2600 illustrates prior sequential message flow, while FIG. 27 at 2700 indicates the new message flow following failure. The former PB 110 remains the PB 110 and communicates directly with LC 140, bypassing the failed boards 120 and 130.

Figure 28:
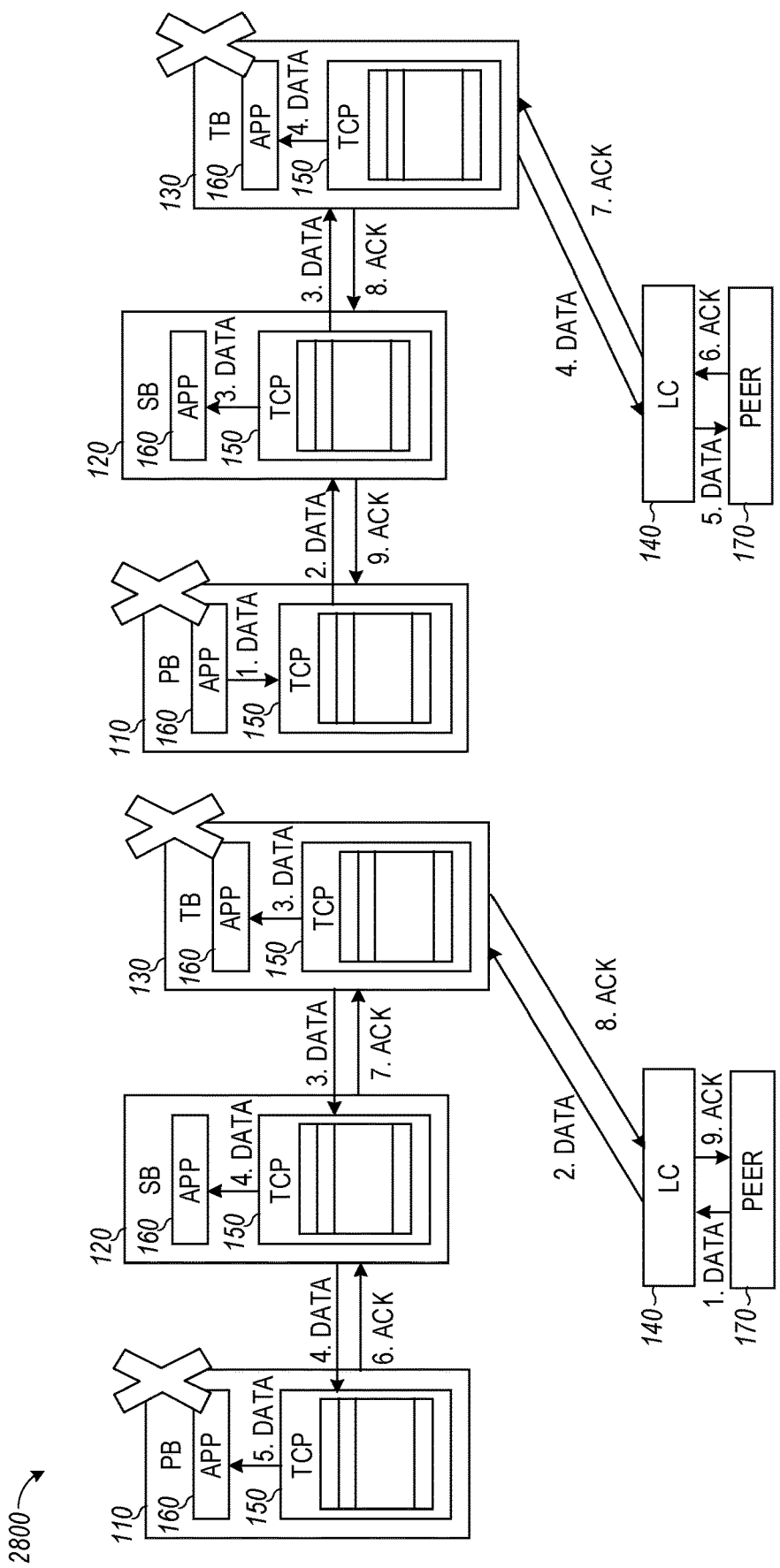
FIG. 28 is a block flow diagram of an example illustrating the failure of two boards according to an example embodiment.
Figure 29:
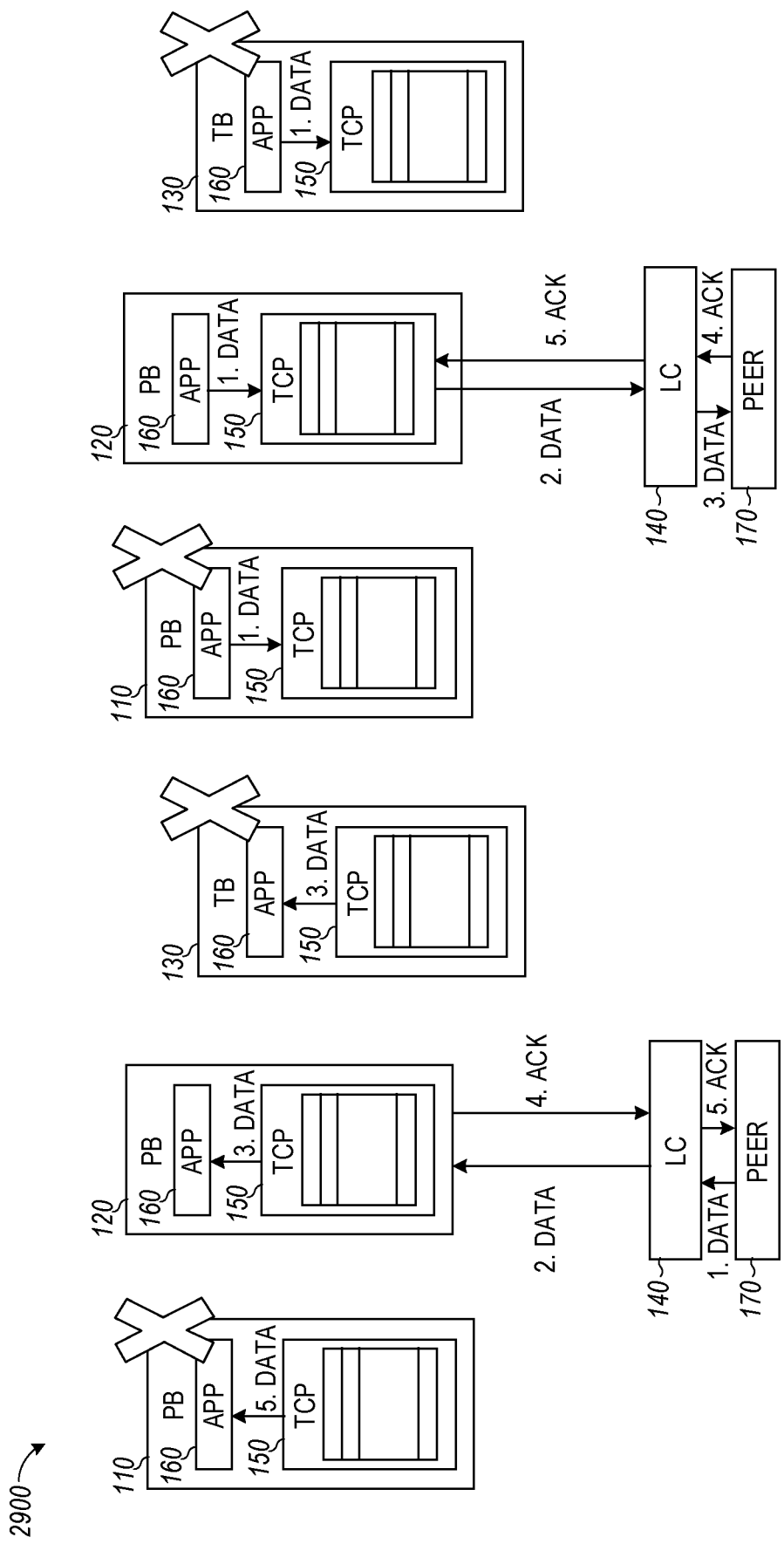
FIG. 29 is a block flow diagram of an example illustrating the failure of two boards according to an example embodiment.

FIGS. 28 and 29 are block flow diagrams 2800 and 2900 of an example illustrating the failure of two boards, the PB 110 and TB 130, as indicated by the "X"s. FIG. 28 at 2800 illustrates prior sequential message flow, while FIG. 29 at 2900 indicates the new message flow following failure. The former SB 120 becomes the new PB 110 in FIG. 29. Messages flow directly between the new PB 110 and the LC 140, bypassing the former PB 110 and TB 130.

When a new board is inserted into the system, it is integrated in three stages: batch backup of an App 160 using TCP, after batch backup and before real time backup, and after batch backup completes and real time backup starts. Given a sequence of boards in slots of a router, the PB 110 (Primary Board) may be the first board, and LB (Last Board) is the last board. In the examples shown, TB 130 is the LB. All boards work normally, passing data as previously described.

When the new board is inserted, the batch backup of an App 160 using TCP starts. LC 140 holds off sending TCP data to the LB and receiving TCP data from the LB, and the LB holds off sending TCP data to LC 140 and receiving TCP data from LC 140. The new board (AB 220) is appended to the sequence after the LB. A connection between the LB and AB 220, and one between AB 220 and LC 140 are created. The connection between the LB and LC 140 is removed. App 160 on the LB backs up its TCP sockets, other states and data structures to its corresponding App 160 on AB 220. After a TCP socket is created on AB 220, the state and data structures of the socket are synchronized in the TCP layer between LB and AB 220.

In stage: "after batch backup and before real time backup", the incoming and outgoing data streams may be handled differently. For the incoming TCP data stream, the TCP module 150 on the LB holds off the data delivery to the App 160 on LB. The TCP module 150 on the LB sends the TCP module 150 on AB 220 the sequence number m corresponding to the last byte of the data delivered to the App 160 just before the holding off.

The App 160 on the LB copies the data from the TCP module 150 in its input buffer to the corresponding App 160 on AB 220. The beginning of the data in the buffer should be the boundary of a data stream. The data in the input buffer of the App 160 and the data in the input buffer of the TCP module 150 on AB 220 and the incoming data from a peer 170 form the continuous incoming TCP data stream in AB 220 for the socket backed up from the LB.

For an outgoing TCP data stream, the App 160 on PB 110/LB holds off the data delivery to the TCP module 150. The TCP module 150 on the LB sends the TCP module 150 on AB 220 the sequence number n corresponding to the last byte of the data delivered to the TCP module 150 on the LB by the App 160 just before the holding off. The last byte should be the boundary of the data stream. The PB 110 backs up its TCP socket to its corresponding App 160 on AB 220. After the TCP socket is created on AB 220, the state and data structures of the socket (basically a copy of the state of the TCP module 150) are replicated to the TCP module 150 on AB 220. For incoming TCP data, the incoming data is synchronized during the backup period by the LC 140 sending the incoming TCP data to the TCP module 150 on AB 220. The TCP module 150 on AB 220, however, does not deliver any incoming data to the App 160 on AB 220. This is illustrated in FIG. 30.

Figure 30:
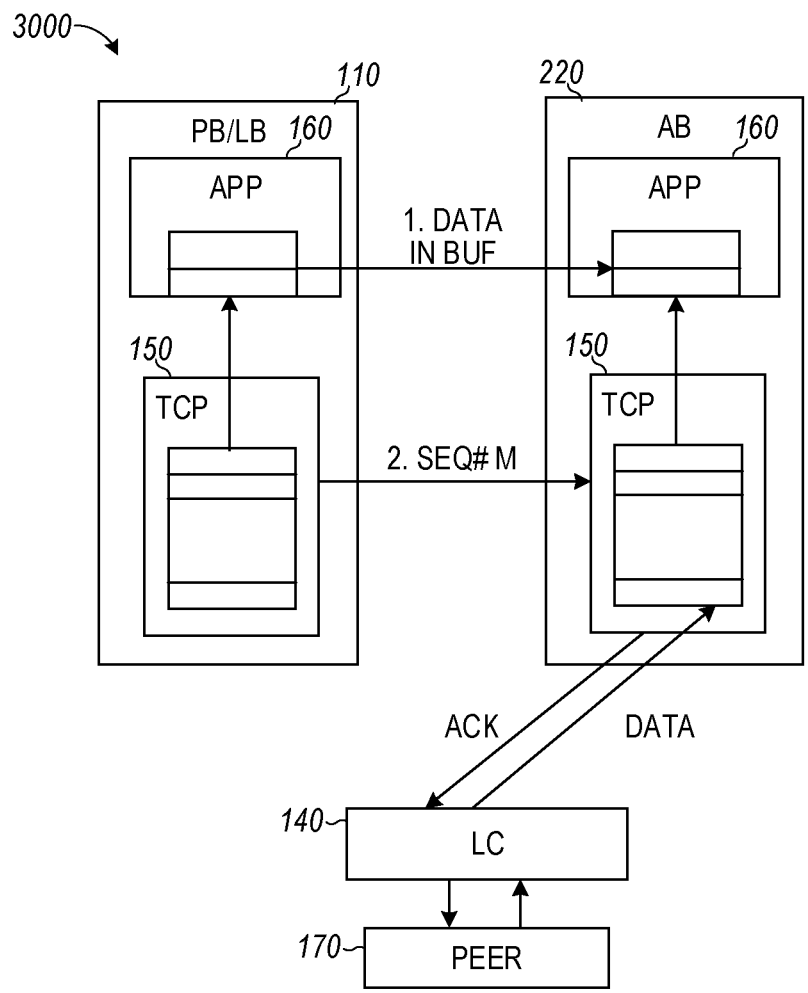
FIG. 30 is a block flow diagram illustrating further detail regarding the handling of the incoming TCP data stream boundary according to an example embodiment.

FIG. 30 is a block flow diagram 3000 illustrating further detail regarding the handling of the incoming TCP data stream boundary when the inserted board (AB) reaches stage: "after batch backup and before real time backup". The TCP module 150 on PB 110/LB holds off the data delivery to the App 160 on PB 110. The App 160 on PB 110/LB copies the data from its input buffer to the corresponding App 160 on AB 220. The beginning of the data in the buffer should be the boundary of a data stream. The TCP module 150 on PB 110/LB sends the TCP module 150 on AB 220 the sequence number m corresponding to the last byte of the data delivered to the App 160 just before the holding off. The data in the input buffer of the App 160 and the data in the input buffer of the TCP module 150 on AB 220 and the incoming data from a peer 170 form the continuous incoming TCP data stream in AB 220 for the socket backed up from PB 110/LB. After Batch Backup Completes and Real Time Backup Starts. The TCP module 150 on AB 220 sends the incoming TCP data from the peer 170 starting at sequence number m+1 to the corresponding App 160 on AB 220. The TCP module 150 on AB 220 sends the incoming TCP data from the peer 170 to TCP on LB/PB 110.

After Switchover to AB 220, TCP on AB 220 continues sending data from the peer 170 to App 160. The TCP module 150 on AB 220 sends Acks to the peer 170 for the data received via LC 140. Alternative methods of synchronization are described below.

Figure 31:
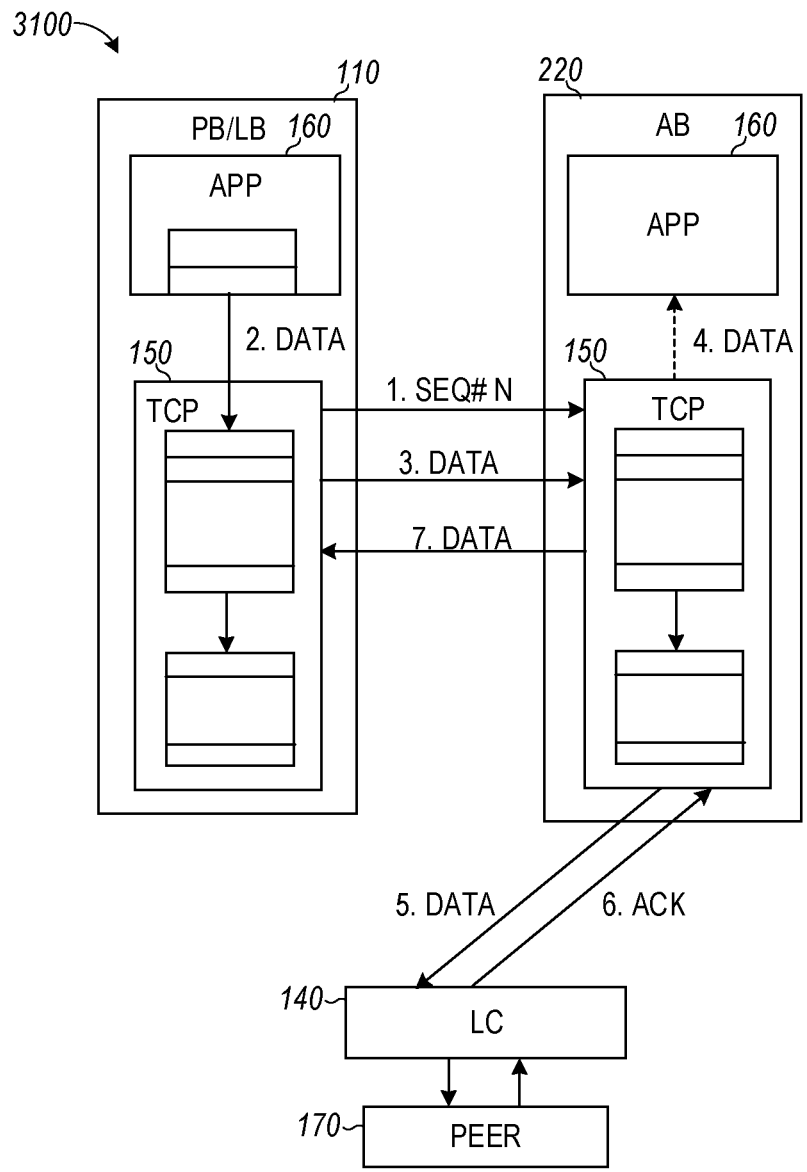
FIG. 31 is a block flow diagram illustrating further detail regarding the handling of the outgoing TCP data stream boundary according to an example embodiment.

FIG. 31 is a block flow diagram 3100 illustrating further detail regarding the handing of the outgoing TCP data stream boundary when the inserted board (AB) reaches stage "after batch backup and before real time backup". The App 160 on PB 110/LB holds off the data delivery to the TCP module 150 on PB 110/LB. The TCP module 150 on PB 110/LB sends the TCP module 150 on AB 220 the sequence number n corresponding to the last byte of the data delivered to the TCP module 150 by the App 160 just before the holding off. The last byte should be the boundary of the data stream.

After batch backup completes and real time backup starts. An App 160 sends data to the TCP module 150 on PB 110/LB and the TCP module 150 on PB 110/LB stores it into its buffer in order. Data is sent to the TCP module 150 on AB 220. The TCP module 150 on AB 220 stores data in its buffer in order and sends data to the corresponding App 160 on AB 220 as needed. The TCP module 150 on AB 220 also sends the data to the peer 170. The TCP module 150 on AB 220 receives an Ack from the peer 170 via LC 140 and removes the acknowledged data from its buffer. The TCP module 150 on AB 220 sends an Ack message to PB 110/LB.

When the inserted board reaches stage: "after batch backup completes and real time backup starts", the old LB sends TCP data to AB 220 (new LB) and receives TCP data from AB 220. AB 220 (new LB) sends TCP data to old LB, receives TCP data from old LB, sends TCP data to LC 140 and receives TCP data from LC 140. LC 140 sends TCP data to AB 220 and receives TCP data from AB 220 as a new LB.

For the incoming TCP data stream, the TCP module 150 on AB 220 sends the incoming TCP data from the peer 170 starting at sequence number m+1 to the corresponding App 160 on AB 220. The App 160 on AB 220 starts to receive its incoming TCP data from the peer 170.

For the outgoing TCP data stream, the TCP module 150 on AB 220 sends the outgoing TCP data originated from the App 160 on PB 110 starting at sequence number n+1 to the corresponding App 160 on AB 220. The App 160 on AB 220 starts to monitor the outgoing TCP data originated from the App 160 on PB 110.

Some extended TCP socket options include outgoing data delivery to the App 160. This option can be set by an App 160 on AB 220. When enabled, the TCP module 150 on AB 220 sends the App 160 the outgoing TCP data originated form the corresponding App 160 on PB 110. A further option includes incoming data deliver to the App 160. The option can be set by an App 160 on AB 220 and when enabled, the TCP module 150 on AB 220 sends the App 160 the incoming TCP data from the peer 170.

In one embodiment, the sequence of the boards may be changed, resulting in the boards switching roles. A sequence of boards may be ordered as PB 110 (i.e. B1), SB 120 (i.e. B2), TB 130 (i.e. B3), B4, . . . where B1 is board 1, B2 is board 2, etc. Changes in the order of boards mean that roles of some boards in the sequence are changed, thus their positions in the sequence are changed.

There are at least two ways to change positions of boards (or called change order of boards). Cold hard changes refers to changing the order of boards through removing (or bringing down) boards and inserting/appending (or bringing up) boards. E.g., for PB 110(B1), SB 120(B2) and TB 130(B3) running in a router, if old TB 130(B3) is promoted to new PB 110, old PB 110(B1) is changed to new TB 130, then this can be achieved by removing SB 120(B2) and appending it (resulting in: PB 110(B1), SB 120(B3), TB 130(B2); and removing PB 110(B1) and appending it (resulting in: PB 110(B3), SB 120(B2), TB 130(B1)).

In one embodiment, an array is created for possible changes in the order of boards, and actions to make changes. For example, FIG. 32 illustrates an array 3200 for three boards PB 110(B1), SB 120(B2) and TB 130(B3). The array includes a current order, followed by actions taken to change the order.

Figure 33:
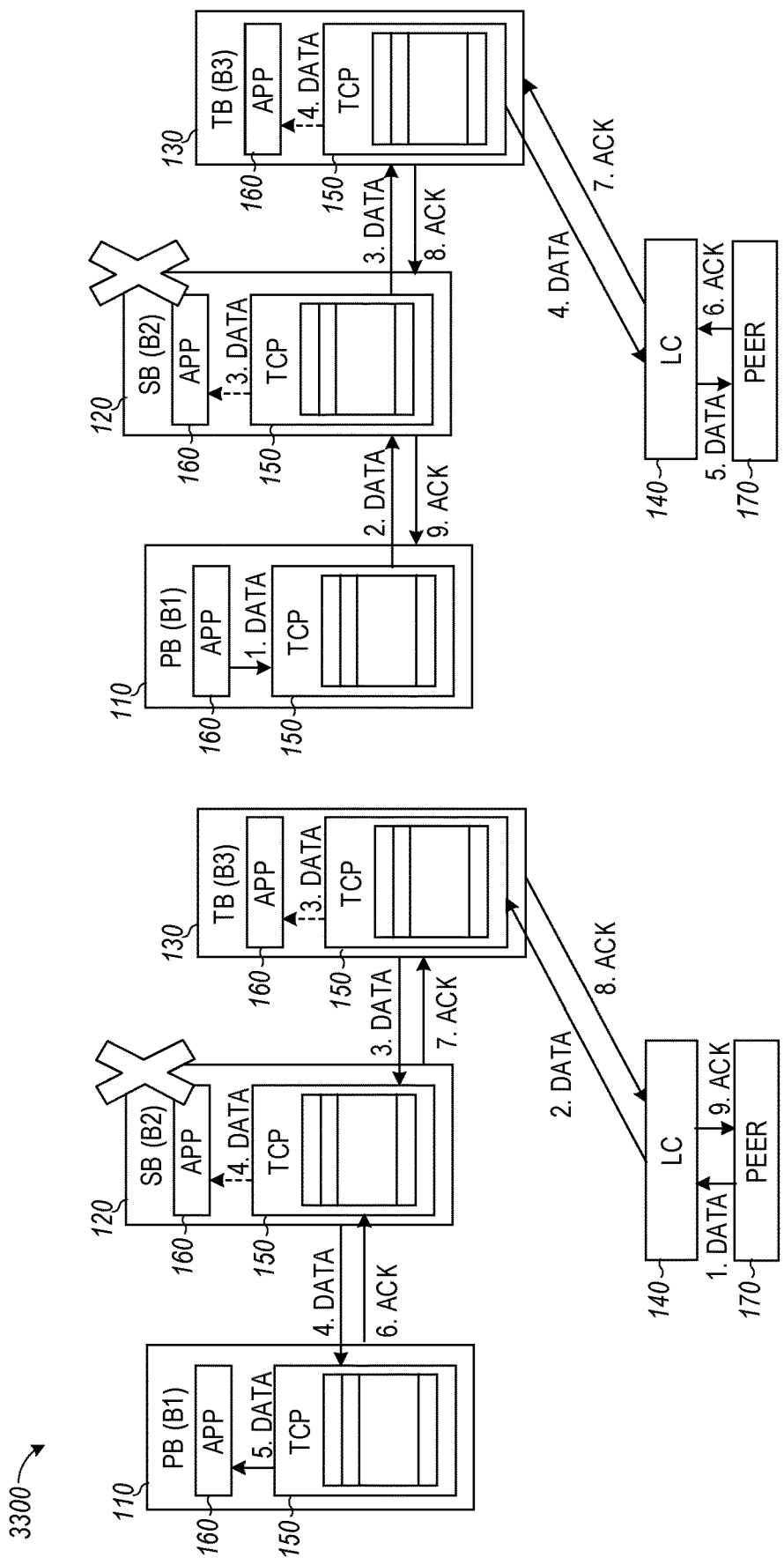
FIG. 33 is a block flow diagram illustrating example board order changes and resulting message flows according to an example embodiment.
Figure 34:
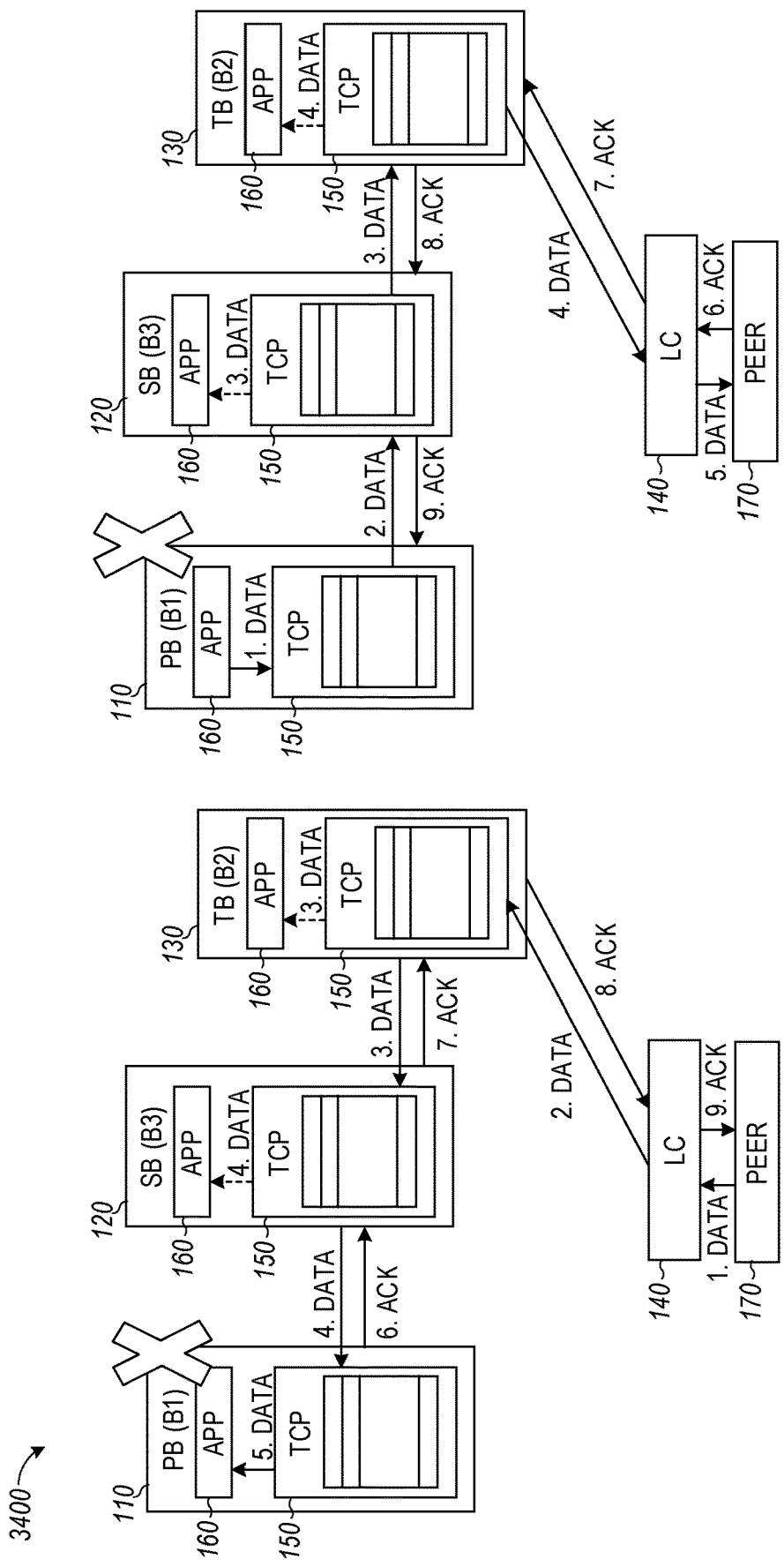
FIG. 34 is a block flow diagram illustrating example board order changes and resulting message flows according to an example embodiment.
Figure 35:
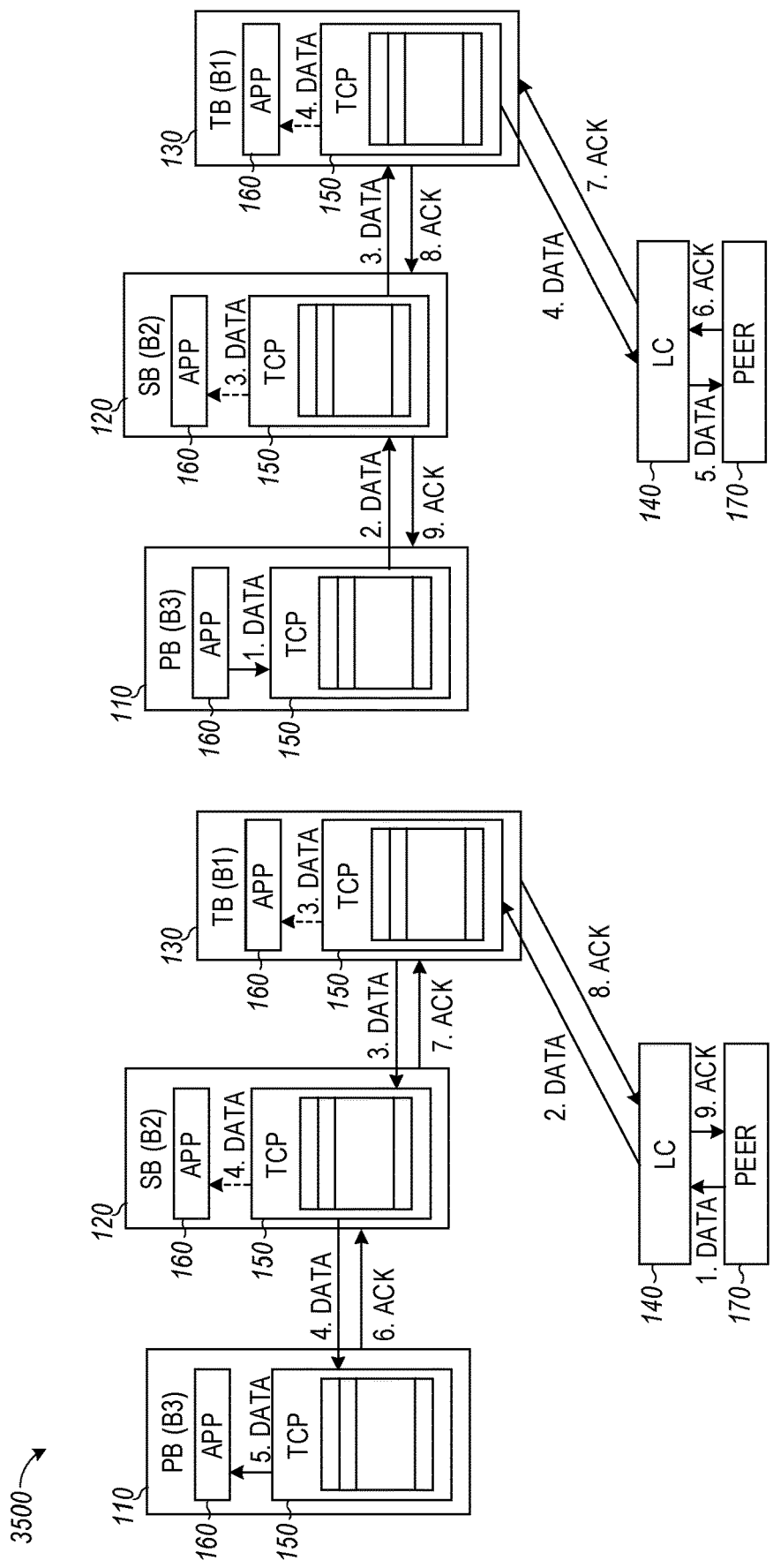
FIG. 35 is a block flow diagram illustrating example board order changes and resulting message flows according to an example embodiment.

FIGS. 33, 34, and 35 are block flow diagrams 3300, 3400, and 3500 illustrating the example changes, including resulting message flows. In FIG. 33 at 3300, a first change is made to change the order PB 110(B1), SB 120(B2), TB 130(B3) to PB 110(B3), SB 120(B2), TB 130(B1). SB 120(B2) is removed and appended after TB 130(B3), resulting in PB 110(B1), SB 120(B3), TB 130(B2). TB 130(B3) becomes SB 120(B3) and SB 120(B2) becomes TB 130(B2).

In FIG. 34 at 3400, PB 110(B1) is removed and appended after TB 130(B2), resulting in PB 110(B3), SB 120(B2), TB 130(B1). SB 120(B3) becomes PB 110(B3), TB 130(B2) becomes SB 120(B2), and PB 110(B1) becomes TB 130 (B1).

FIG. 35 illustrates the new arrangement and sequential message flow resulting from the changes at 3500.

A further way to change the order of the boards is to change the connections among the boards, such as by use of software, and referred to as hot soft changes. To perform such a change, all boards are frozen to hold off all data delivery and the sending of data by apps. The boards are then moved to their expected positions in the sequence by changing the routing of data between the boards. The boards are then unfrozen, such that data transfer can occur.

FIG. 36 illustrates an example array 3600 that is created for possible changes on order of boards, and actions to make changes by way of hot soft changes for three boards PB 110(B1), SB 120(B2) and TB 130(B3). Note that a Freeze action may be performed for all boards before each Move action, and action Unfreeze all boards after the Move are not shown in the array. Every board affected by Move resends data if data has not been acknowledged. Following the Freeze action, actions are performed to change on order of boards according to the array.

Figures 37A, 37B:
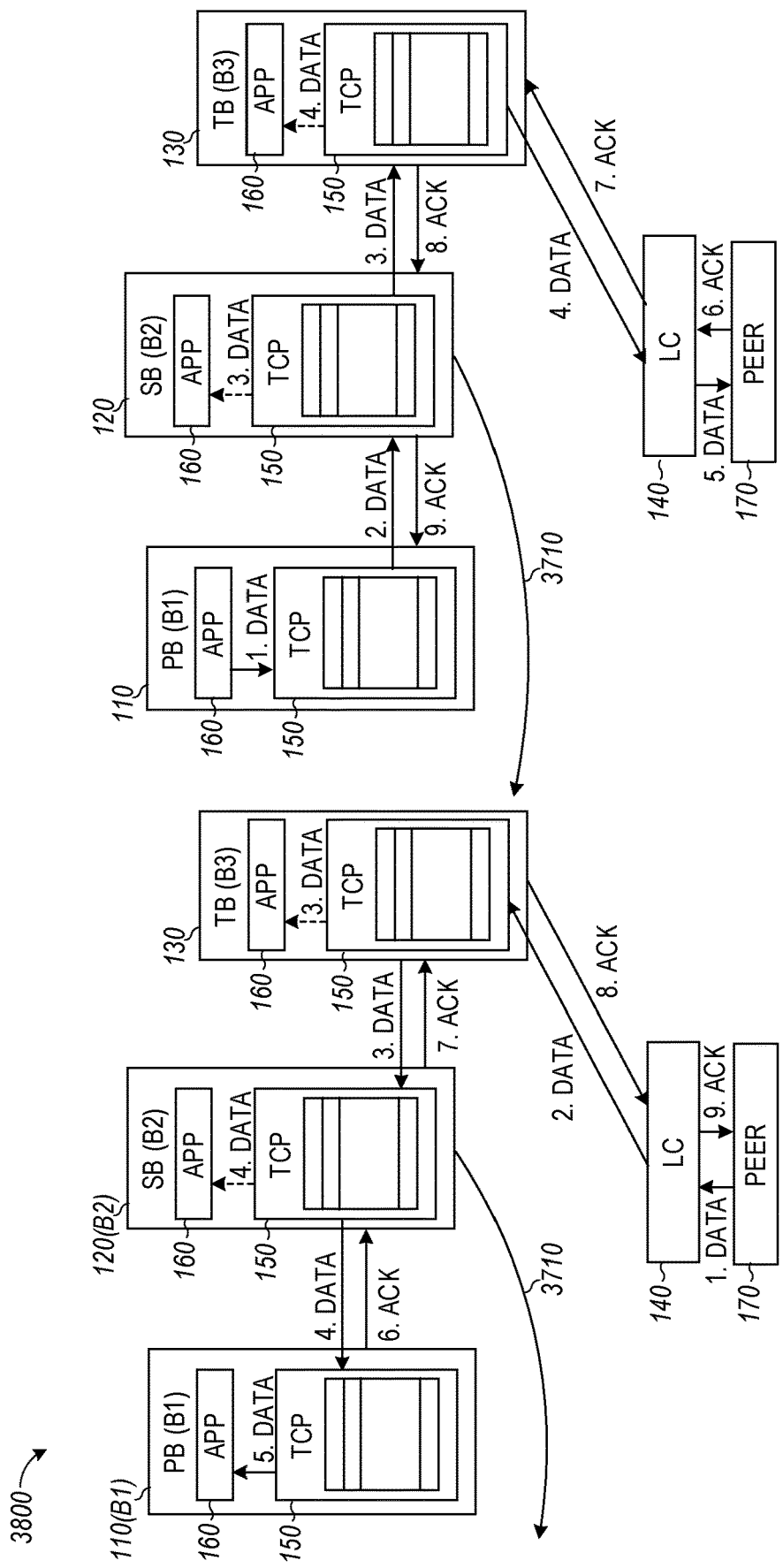
FIG. 37A is a block flow diagram illustrating the hot soft change, including resulting message flows according to an example embodiment.
FIG. 37B is a block flow diagram illustrating the hot soft change, including resulting message flows according to an example embodiment.
Figures 38A, 38B:
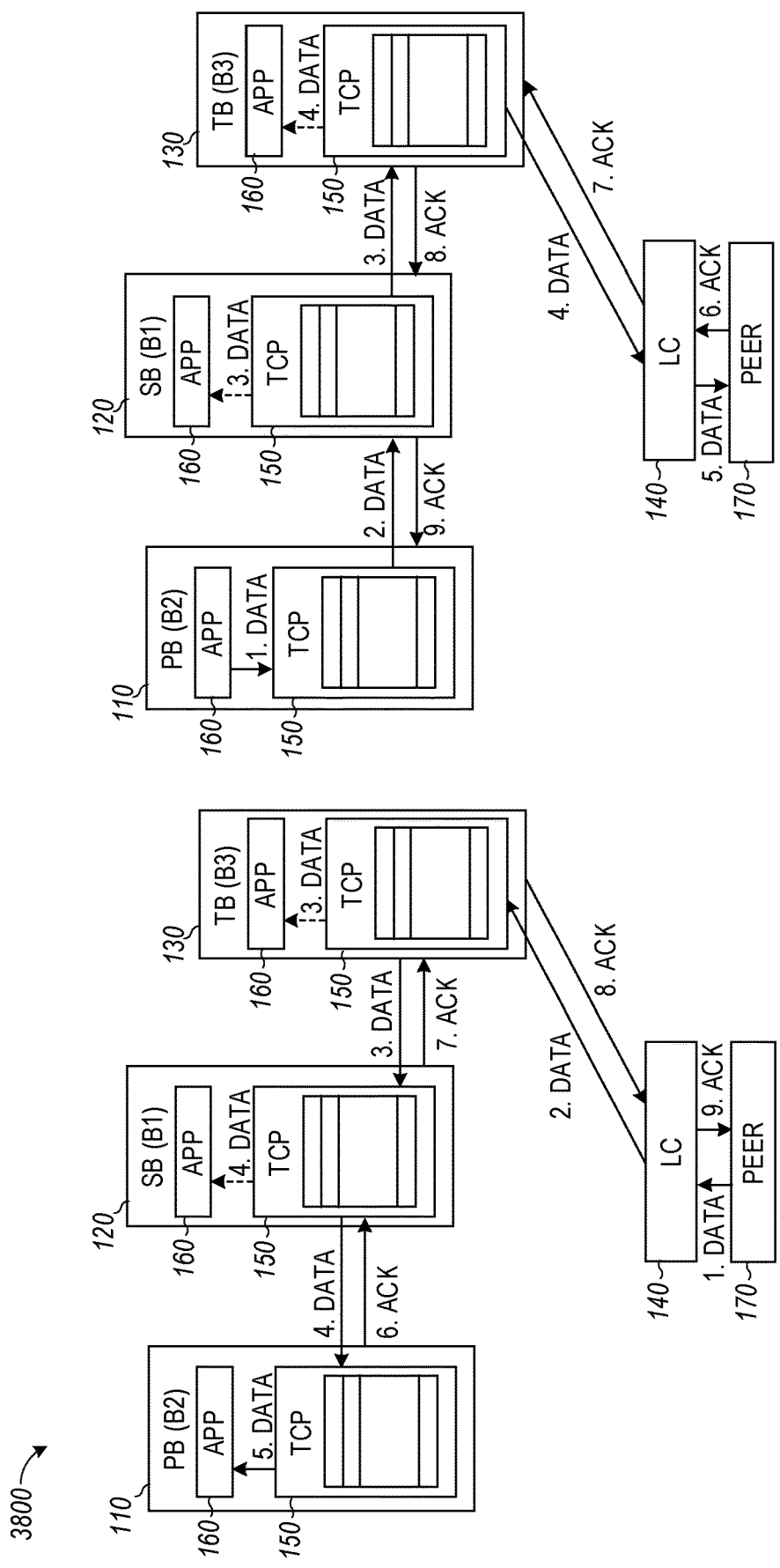
FIG. 38A is a block flow diagram illustrating the hot soft change, including resulting message flows according to an example embodiment.
FIG. 38B is a block flow diagram illustrating the hot soft change, including resulting message flows according to an example embodiment.

FIGS. 37A, 37B, 38A, and 38B are block flow diagrams illustrating the hot soft change, including resulting message flows. In FIG. 37A at 3700, representing incoming data, a first change represented by arrow 3710 is made to change the order PB 110(B1), SB 120(B2), TB 130(B3) to PB 110(B2), SB 120(B1), TB 130(B3). The actions include a Freeze of boards B1, B2 and B3 (states) and Movement of B2 to position before B1, resulting in PB 110(B2), SB 120(B1), TB 130(B3). A further action is then used to unfreeze boards B1, B2 and B3. The same procedure is followed for the same change in FIG. 37B at 3750 represented by arrow 3760 for outgoing data. The resulting new configurations are shown in FIGS. 38A and 38B for incoming and outgoing data respectively.

In FIG. 38A at 3800, for incoming TCP data, TB 130(B3) resends data to SB 120(B1) if data is not Ack'ed, and SB 120(B1) resends data to PB 110(B2) if data has not been acknowledged. For outgoing TCP data, PB 110(B2) resends data to SB 120(B1) if data is not Ack'ed and SB 120(B1) resends data to TB 130(B3) if data has not been acknowledged.

Acknowledgment and Synchronization Methods

Figure 39:
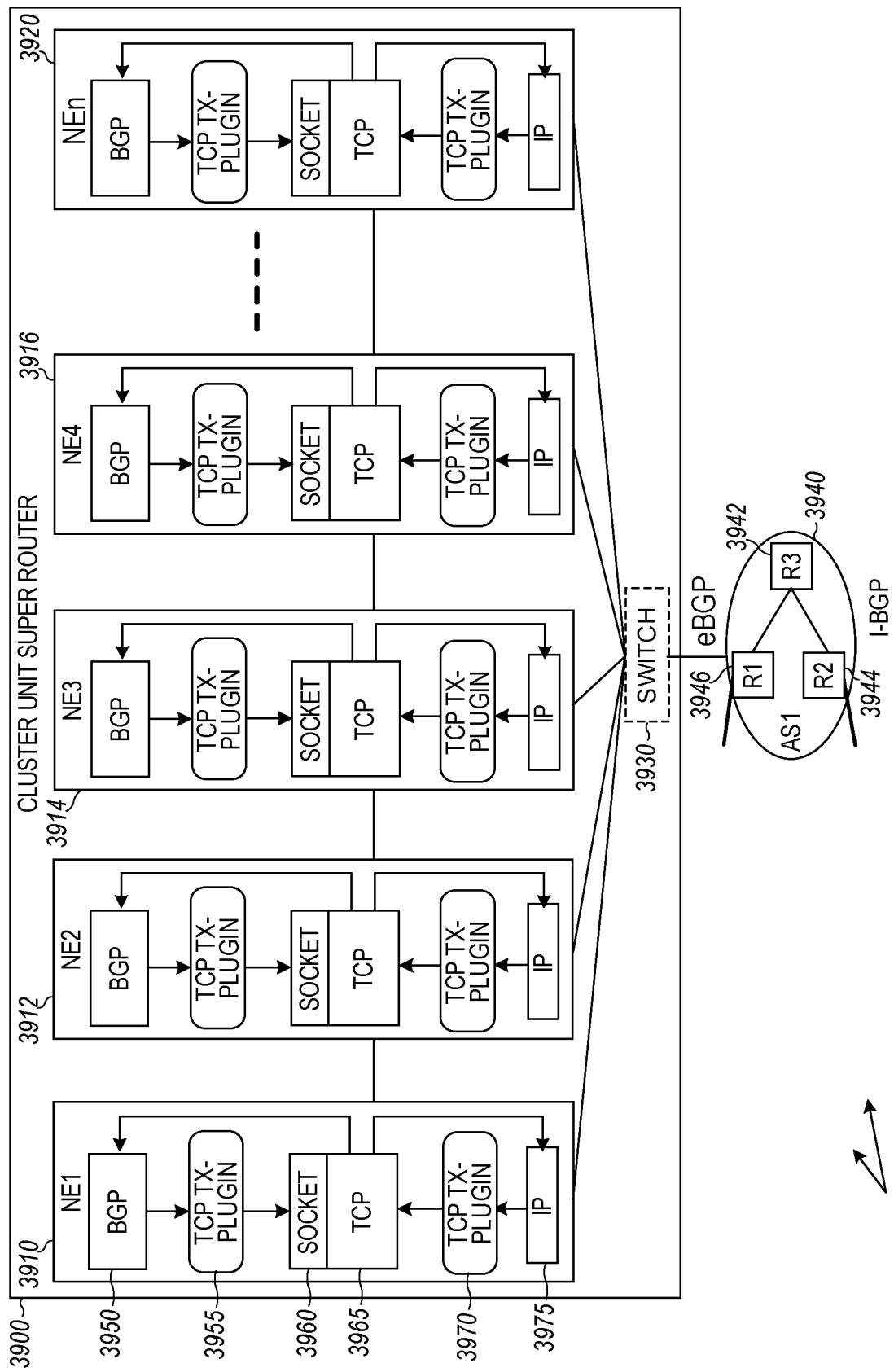
FIG. 39 is a block diagram representation of a router for transmitting and receiving data packets with high availability according to an example embodiment.

FIG. 39 is a block diagram representation of a router 3900 for transmitting and receiving data packets. Router 3900 includes multiple network elements (NEs) at 3910, 3912, 3914, 3916, and 3920 labeled NE1, NE2, NE3, NE4 . . . NEn. Such multiple NEs may be referred to as a cluster of NEs. There may be n NEs in various embodiments, with n greater than 2. The NEs may be boards, nodes, or virtual machine (VM) containers in different embodiments that may operate in an active state or mode and have m backups in the same cluster operating in a standby state or mode, where number of backups is between 1 and n−1. The states of each NE may be synchronized as described below and can support high availability against up to n−1 failures.

The NEs each transmit and receive data via a router or switch 3930 that is serves as a network connection to communicate with an external network 3940 that may include multiple routers indicated at 3942, 3944, and 3946, which may be referred to as peers. Note that the switch 3930 may be wired or wireless, or may be a network connection integrated individually into each NE in further embodiments, such as when NEs are serially connected to each other.

Each network element may include suitable processing and memory resources for executing various applications and communication protocols. An App 3950, such as BGP may communicate via a transmit plugin 3955, such as TCP Tx-Plugin and socket 3960 to a TCP module 3965. TCP module 3965 may be coupled via a receive plugin 3970, such as TCP Rx-Plugin, to an internet protocol connection, IP 3975 for coupling to switch 3930.

Figure 40:
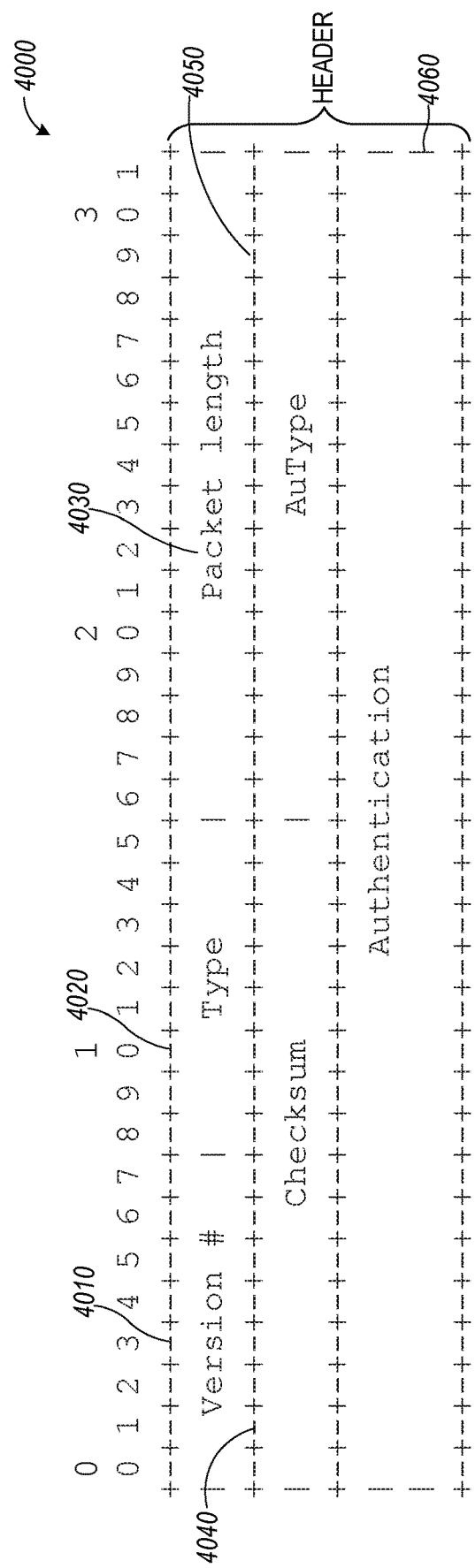
FIG. 40 is a diagram illustrating the format of a data packet header according to an example embodiment.

FIG. 40 is a diagram illustrating the format of an example packet header 4000 for packets that are transmitted and received. In one embodiment, the packet header 4000 includes multiple 32 bit sections shown as rows and including multiple fields. A 32 bit section shown as the first row includes an 8 bit version number 4010 of a multicast protocol, an 8 bit type 4020 indicating a data packet or an acknowledgment packet, and a 16 bit packet length 4030 identifying the size of a packet including the header. A second 32 bit section, illustrated as a second row includes a 16 bit checksum 4040 and a 16 bit AuType 4050. The checksum is a checksum of an entire packet, and the AuType is an authentication type such as clear text password and MD5 (Message Digest type 5). The last 32 bit section is an authentication field 4060 that includes an authentication encryption field to ensure that the packet is authentic. The authentication encryption value in one embodiment identifies the transmitter and receiver of the communication, and is encrypted to ensure the packet cannot be easily tampered with.

Figure 41:
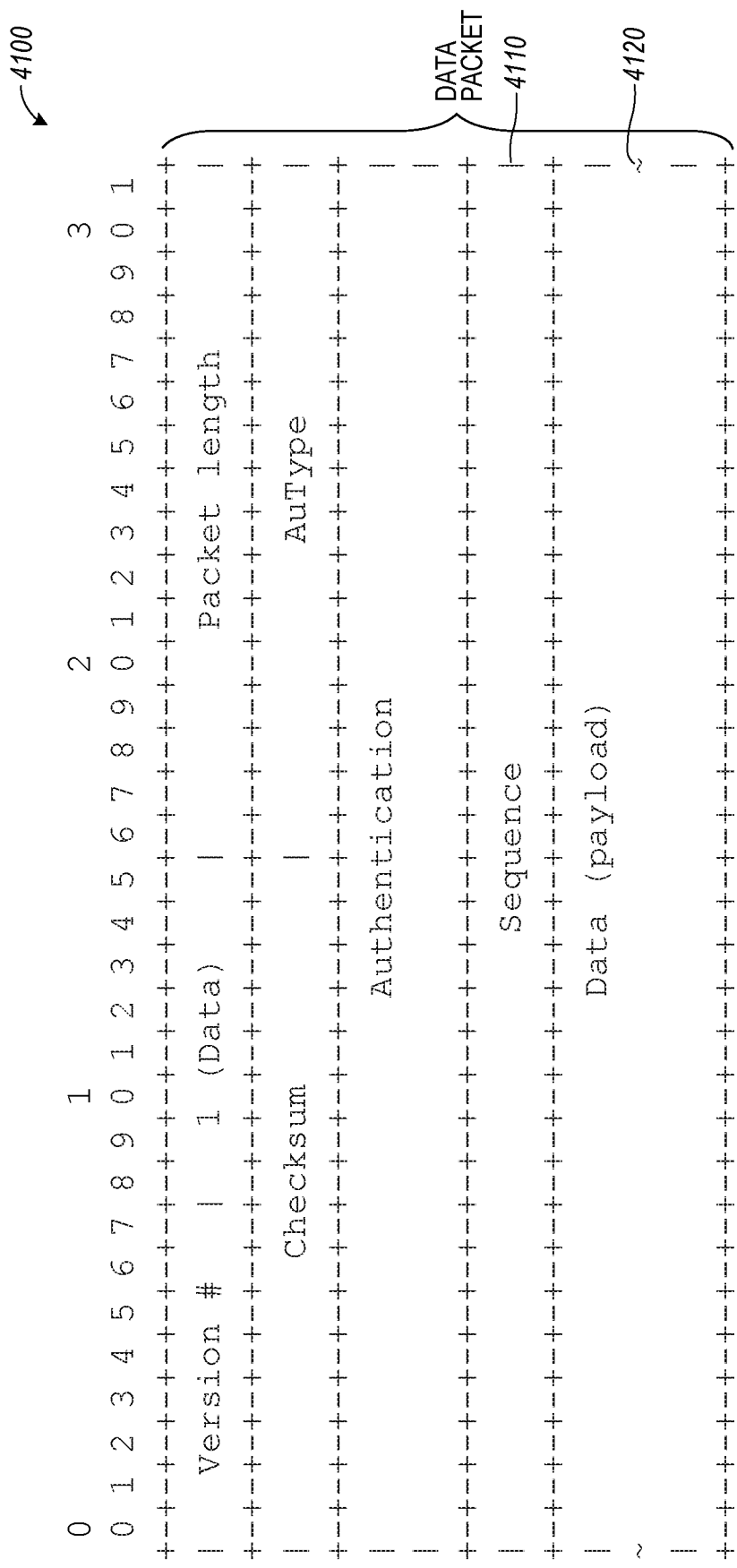
FIG. 41 is a diagram illustrating the format of a data packet according to an example embodiment.

FIG. 41 is a diagram illustrating the format of a data packet 4100. Data packet 4100 includes a similar packet header as packet header 4000 and also includes a data sequence number 4110 and a payload 4120, shown as data field 4120. The sequence number 4110 specifies where in the stream the packet is.

Figure 42:
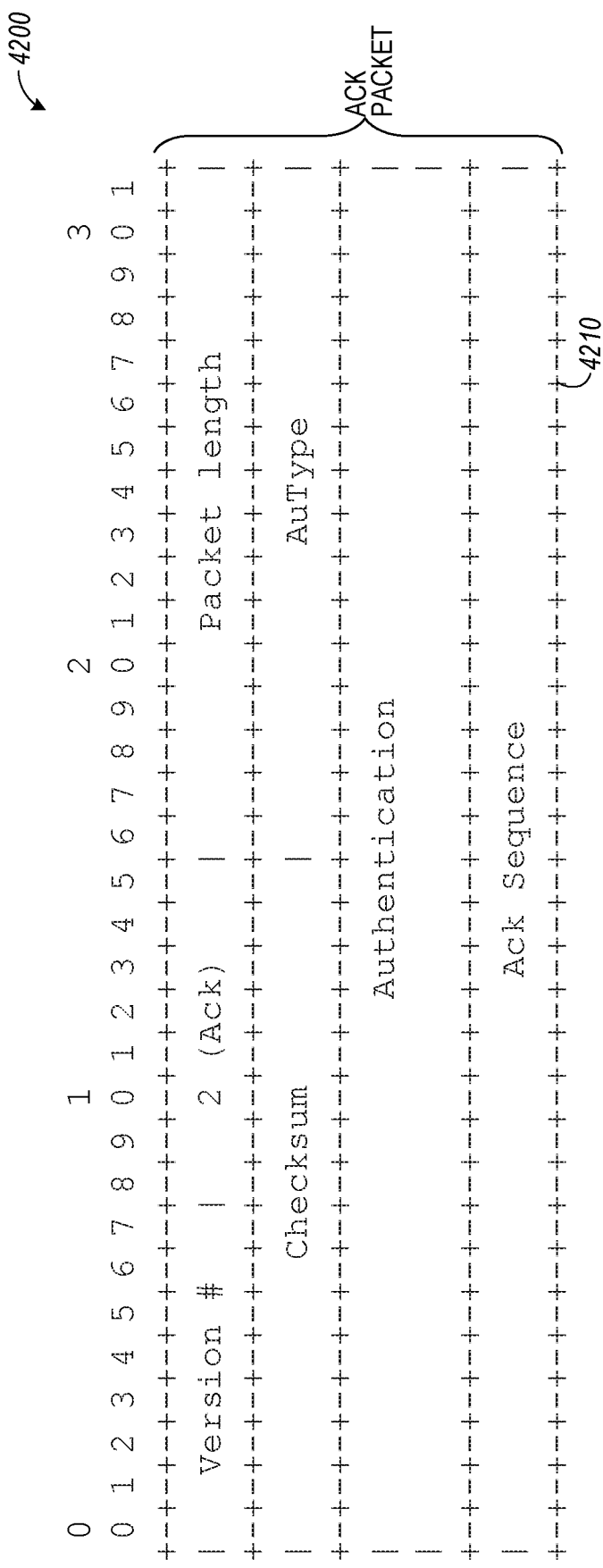
FIG. 42 is a diagram illustrating the format of an acknowledgment packet according to an example embodiment.

FIG. 42 is a diagram illustrating the format of an acknowledgment packet (also referred to as a message) Ack 4200. Ack 420 includes a similar packet header as packet header 4000 and also includes an Ack sequence 4210 that corresponds to sequence number 4110, acknowledging a number of bytes successfully received.

Figure 43:
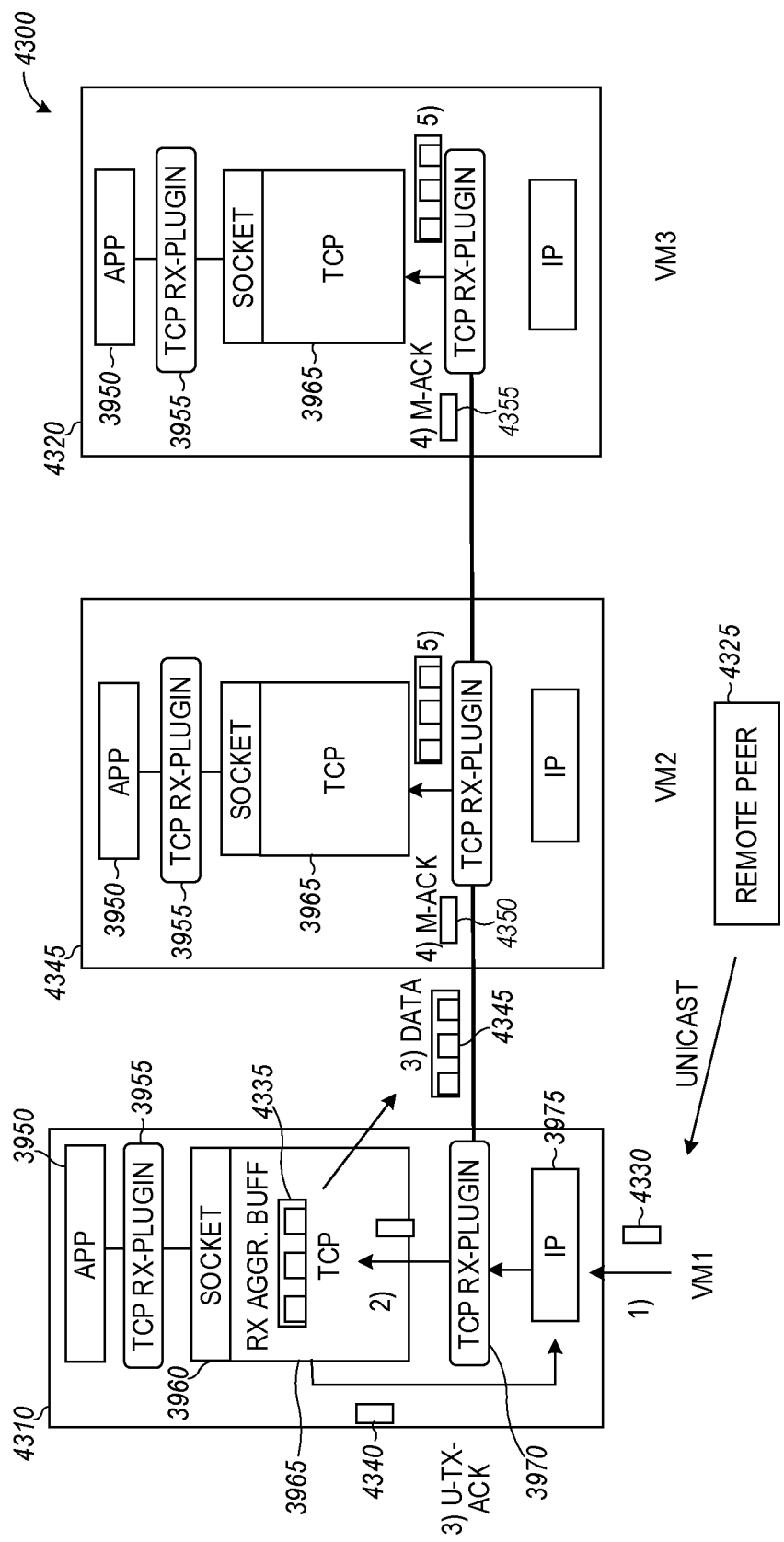
FIG. 43 is a block diagram illustrating an example data flow among multiple network elements according to an example embodiment.

FIG. 43 is a block diagram illustrating an example data flow among multiple network elements indicated generally at 4300. An active NE 4310 and two standby NEs 4315 and 4320 are shown in communication with a peer 4325. Packet flow is shown by numbered arrows in sequence of 1-5. A TCP packet 4330 is shown as being received by NE 4310 unicast from remote peer 4325. The active NE 4310 TCP Rx-plugin 3970 stores the packet into a receive aggregation buffer, Rx Aggr Buff 4335. The data may then be forwarded to an APP on active NE 4310.

A new unicast transmit Ack, u-tx-Ack 4340 may then be transmitted back to remote peer 4325. The u-tx-Ack 4340 may be sent if different from a previous such Ack, and a timeout, window size limit is met, or by receipt of a transmit data packet. Then, the active NE 4310 will multicast the data in the Rx Aggr. buffer 4335 as indicated by data block 4345 to both standby network elements 4315 and 4320. Note that the above qualifications of when to send the u-tx-Ack 4340 allows the aggregation of data packets into a single Ack, allowing faster communications via an Ack-Sync reliable multicast. The standby network elements 4315 and 4320 receive the packet and send multicast acknowledgment (m-Ack) packets at 4350 and 4355 respectively back to active network element 4310. The standby network elements 4315 and 4320 may then forward the packets to their respective TCP 3965 and APP 3950.

Figure 44:
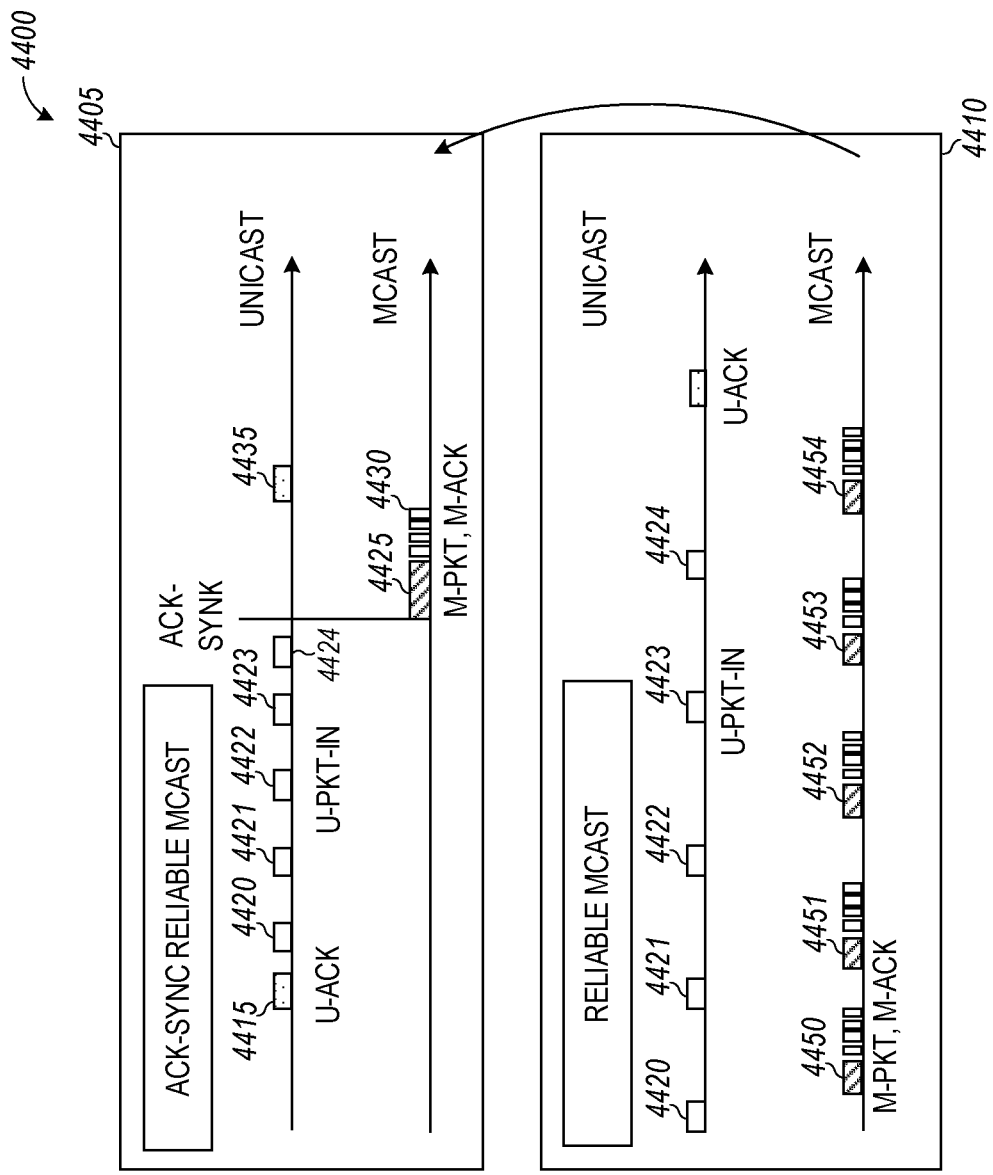
FIG. 44 is a pair of timing diagrams illustrating multiple packet aggregation according to an example embodiment.

FIG. 44 graphically illustrates the use of multiple packet aggregation in two timing diagrams illustrated generally at 4400. Diagram 4405 illustrates aggregation of five data packets using Ack-sync reliable multicast, while diagram 4410 shows the same data packets being received without the use of aggregation. Following a previous u-Ack 4415, five unicast data packets 4420, 4421, 4422, 4423, and 4424 are received from a peer and then multicast as indicated at m-pkt 4425. m-Acks indicated generally at 4430 are then received from two or more standby NEs. A u-Ack 4435 may then be sent to the peer. While five data packets are shown as being aggregated, fewer or more data packets may be aggregated in further embodiments.

Diagram 4410, shows the packets being multicast to the standby NEs following receipt by the active NE. As each packet, u-pkt-in 4420, 4421, 4422, 4423, and 4424 is received from a peer, the packet is multicast to standby NEs as indicated at m-pkt 4450, 4451, 4452, 4453, and 4454. However, for each packet, an m-Ack indicated at 4460, 4461, 4462, 4463, and 4464 respectively is received before the next u-pck-in is received. Responsive to the last m-pkt and m-Ack being received, a u-Ack 4460 may be sent. This sequential progression of multicasting a packet and receiving an Ack for each multicasted packet may take more time. The non aggregation shown in diagram 4410 and also utilizes more bandwidth, as it requires more packets to be sent.

Figure 45:
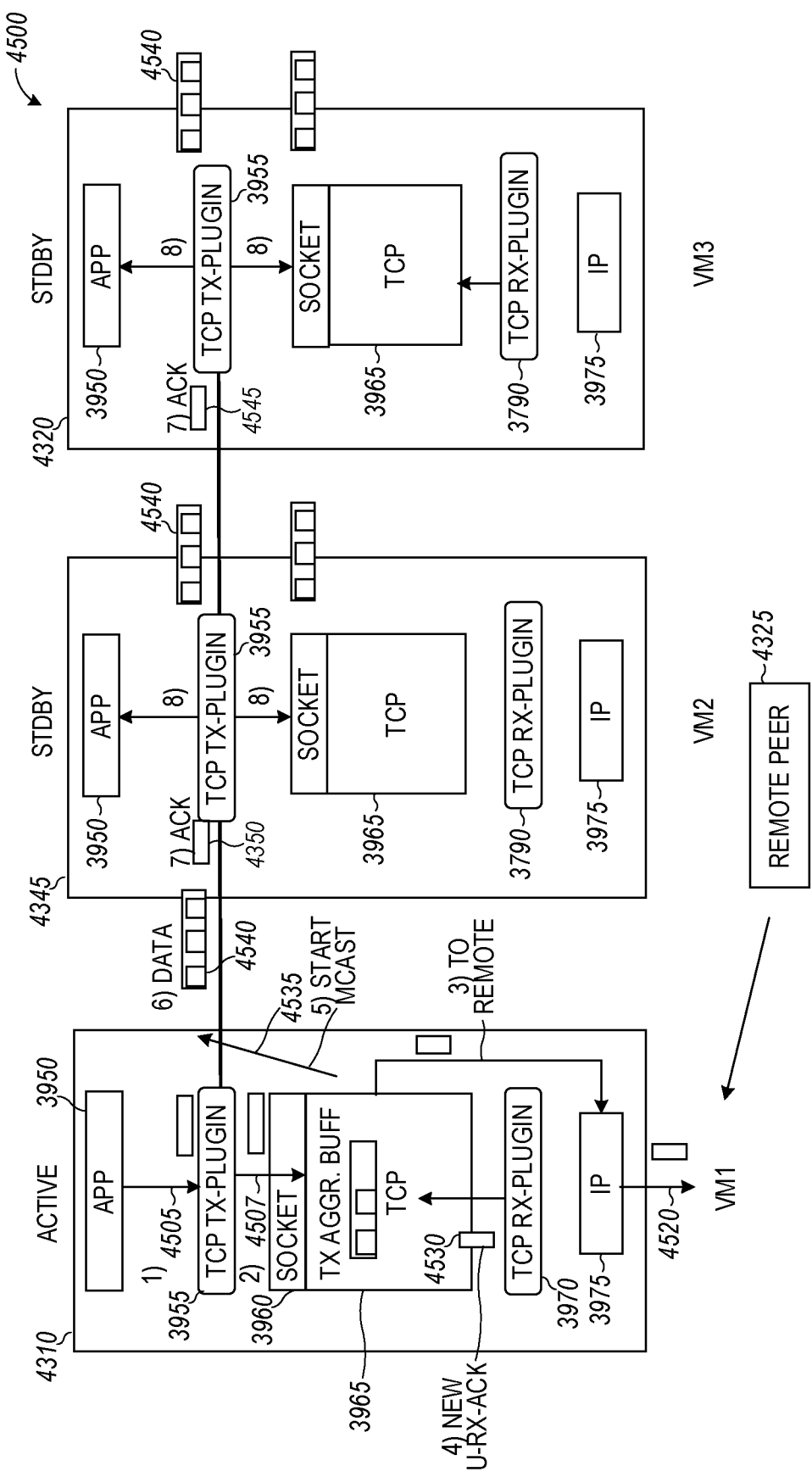
FIG. 45 is a block diagram illustrating an example reliable multicast in the transmit direction by multiple network elements according to an example embodiment.

FIG. 45 is a block diagram illustrating an example reliable multicast in the transmit direction by multiple network elements indicated generally at 4500. The network elements are numbered consistently with the reference numbers used in FIG. 43. APP 3950 in active NE 4310 generates data to be transmitted to remote peer 4325. The data is sent 4505 by APP 3950 to TCP Tx-Plugin 3955, which sends 4507 the data to a Tx Aggr. buffer 4510. A packet is unicast as indicated at 4520 from TCP module 3965 via IP 3975 to the remote peer 4325.

A new u-rx-Ack 4530 is received from the remote peer 4325 that is different than a previous u-rx-Ack. Responsive to such receipt, the Tx Aggr. buffer 4510 is triggered 4535 to multicast one or more transmit packets 4540 that are aggregated therein prior to receipt of the new u-rx-Ack 4530. The packets are transmitted via the TCP tx-plugins 3955.

The standby nodes receive the aggregated data and send the Acks 4545, 4546 back to the active NE 4310. The standby nodes also, via the TCP Tx-Plugins forward the packets to the TCP sockets 3960 which also make the packets available to the APPs 3950 on the standby NEs such that they are synchronized with APP 3950 on active NE 4310.

Figure 46:
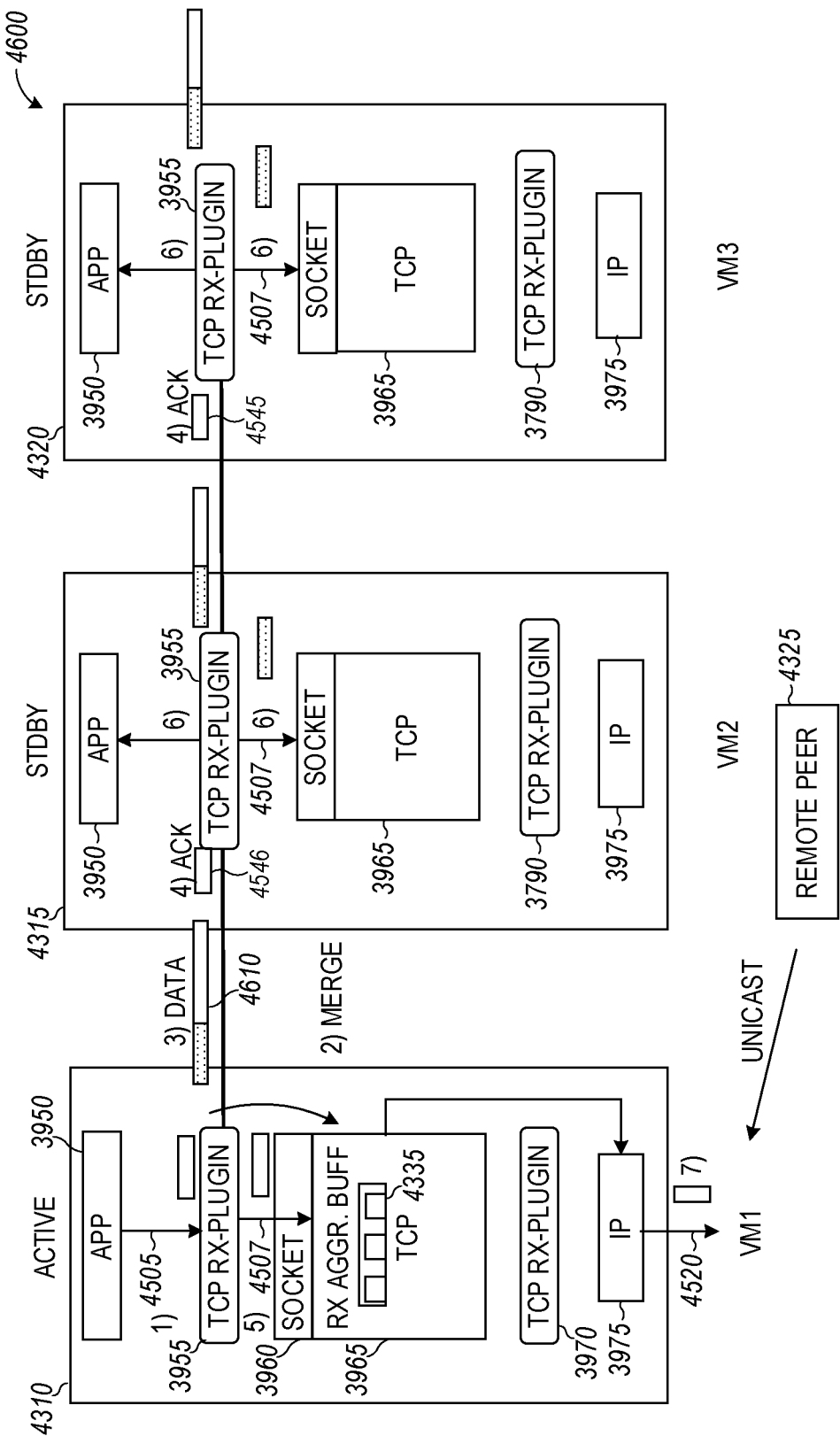
FIG. 46 is a block diagram illustrating transmit and receive merge of communications by multiple network elements according to an example embodiment.

FIG. 46 is a block diagram illustrating transmit and receive merge of communications by multiple network elements indicated generally at 4600. The network elements are numbered consistently with the reference numbers used in FIGS. 43 and 45. In transmit and receive merge, the previous u-tx-Ack can be piggybacked 4605 with packets in the Rx Aggr. buffer 3965 to form data that includes both transmit and receive packets 4610 that is multicast from the active NE 4310 to the standby NEs 4315 and 4320. The merger may be done by including a header in a data packet that contains the latest byte sequence number of the data payload. Each standby NE provides an Ack 4545, 4546. Upon receipt of the Acks, the socket 3960 triggers the transmission of data to the remote peer as indicated at 4520.

Figure 47:
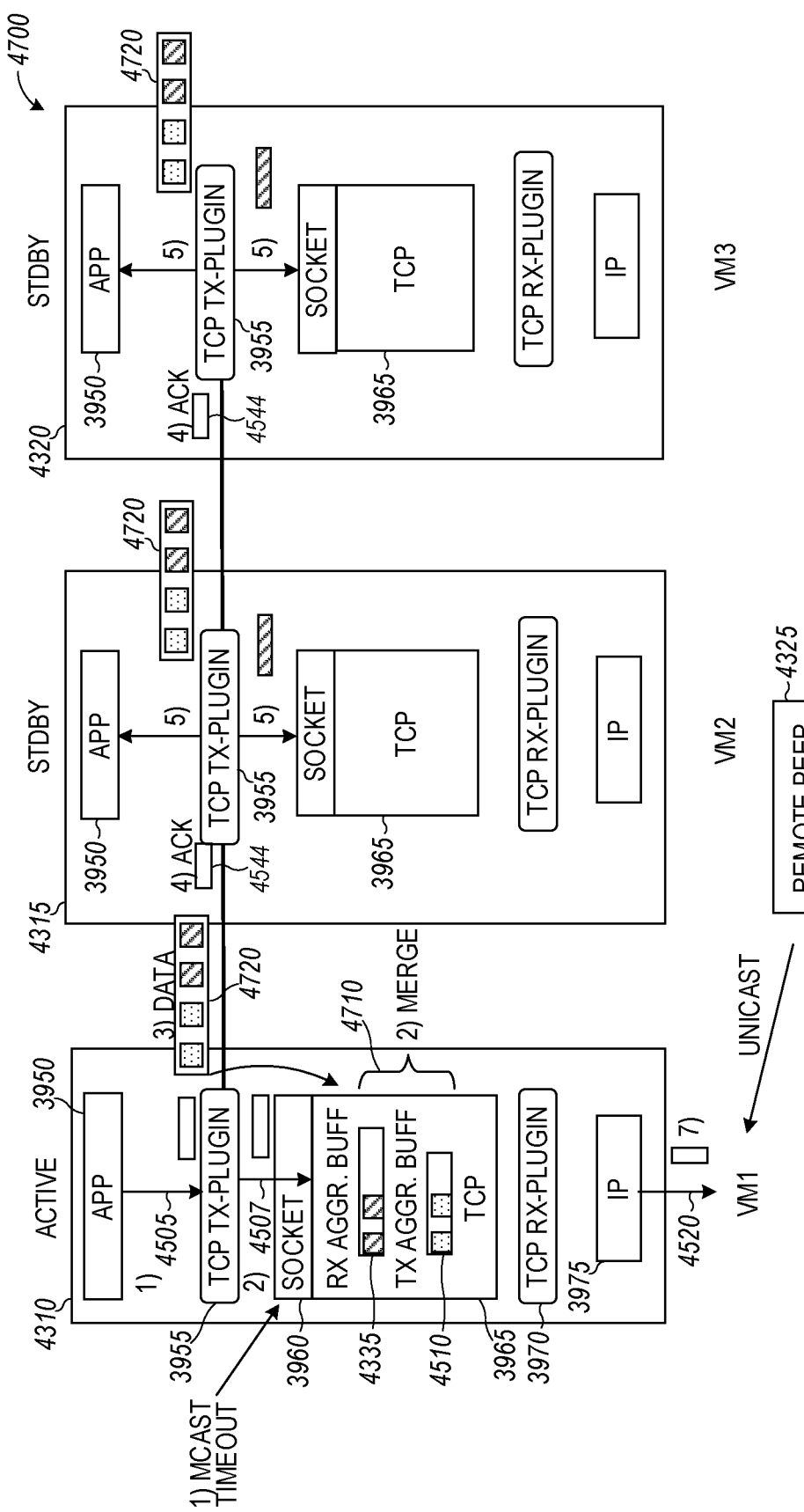
FIG. 47 is a block diagram illustrating transmit and receive merge with timeout for communications by multiple network elements according to an example embodiment.

FIG. 47 is a block diagram illustrating transmit and receive merge with timeout for communications by multiple network elements indicated generally at 4700. The network elements are numbered consistently with the reference numbers used in FIGS. 43, 45 and 46. In this embodiment, data from both the Rx Aggr. buffer 4335 and from the Tx Aggr.

buffer 4510 is merged as indicated at 4710 and multicast to the standby NEs as indicated at 4720. A multicast timeout is used to trigger the merge and start the multicast. The timeout may occur responsive to a set time following receipt of a new u-tx-Ack.

Timing diagram 4405 also illustrates a method of controlling a TCP Ack number (Ack #) to improve multicast performance. A multicast transmission from the active NE 3950 is sent responsive to the TCP module 3965 being ready to send out an Ack. Reducing or delaying the TCP module Ack may improve the performance of Ack-sync reliable multicast. Increasing the Ack timeout and the receive window size will reduce the number of TCP Acks, thereby reducing the time for transmission. In one embodiment, the window size is a number of bytes to be sent or received from or to a buffer storing data.

In TCP, the maximum window size value was originally limited to 65,535 bytes. This is changed with the TCP window scale option, which is an option to increase the receive window size allowed in TCP. By using the window scale option, the receive window size may be increased up to a maximum value of 1,073,725,440 bytes. Some non-limiting examples of window size for Ack-sync reliable multicast may include 65,535 or 17,520.

The receive window (size) is the number of bytes a sender can transmit without receiving an acknowledgment. TCP sets a timeout when it sends data and if data is not acknowledged before timeout expires it retransmits data. The value (or length) of the timer is determined based on the round-trip time (RTT) of a TCP connection. A minimum TCP retransmission timeout (RTO Minimum) is 10 milliseconds. Examples of length of a retransmission timer includes, but is not limited to 3 to 5 seconds.

Figure 48:
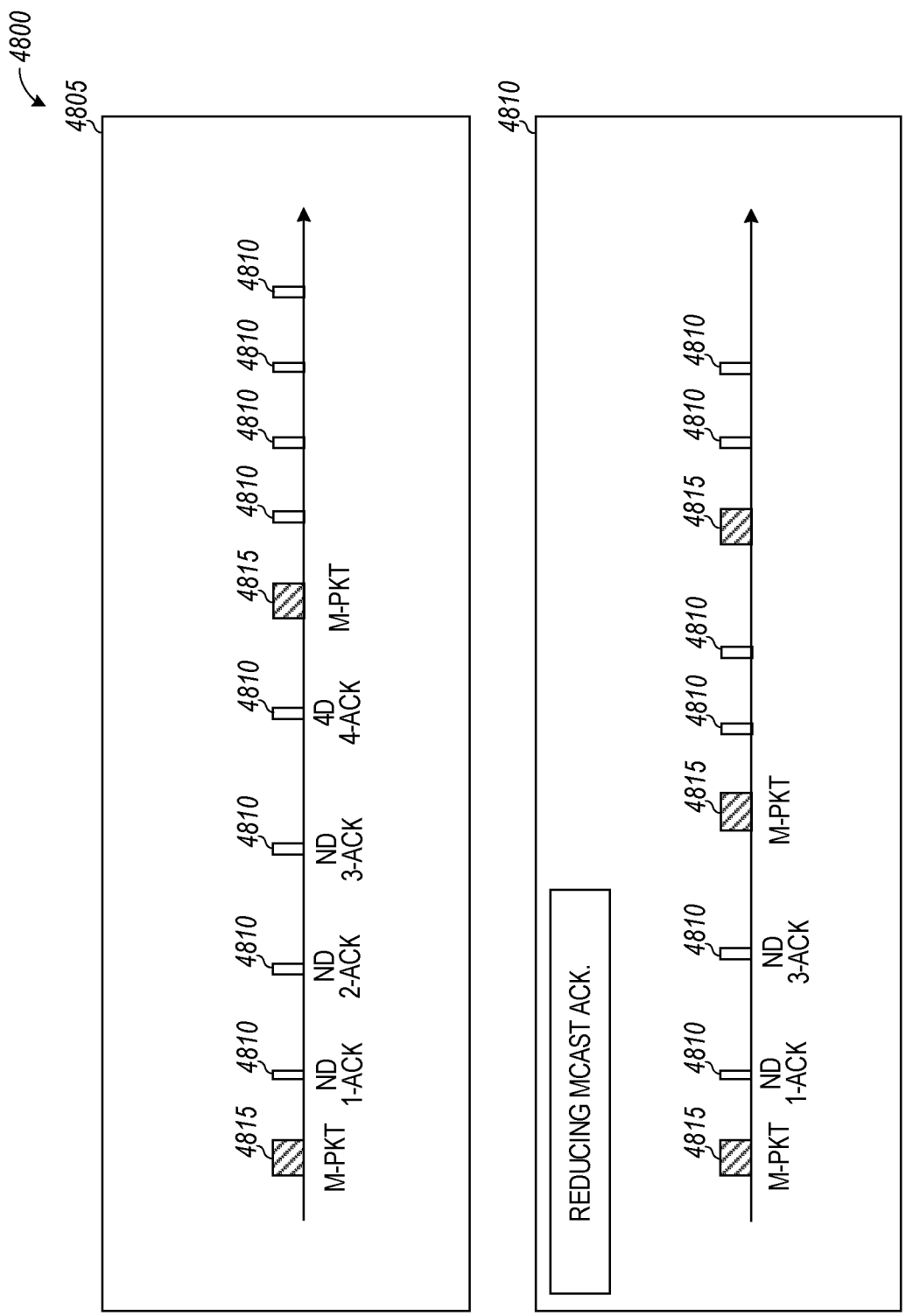
FIG. 48 is a block diagram illustrating a method for reducing multicast Acks to improve multicast performance according to an example embodiment.

FIG. 48 illustrates a method at 4800 for reducing multicast Acks to improve multicast performance. The active NE does not need to wait for all multicast Acks from all the standby NEs. This is illustrated by the difference in two diagrams. Diagram 4805 illustrates waiting for Acks 4810 from all four standby NEs labeled nd1-Ack, nd2-Ack, nd3-Ack, and nd4-Ack, between sending multicast packets 4815. Diagram 4820 illustrates waiting for only some of the Acks prior to sending the next multicast packet 4815. In this case, receipt of two Acks from any two of the standby NEs will trigger sending of the next multicast packet 4815. Acks 4810 are shown as being received from nd1 and nd3 corresponding to the first and third NEs responsive to the first multicast packet 4815. Any two NEs providing Acks 4810 for the next multicast packet may trigger a further multicast packet transmission.

When an active NE failure occurs, an election between which NE should become the new active NE may occur among the standby NEs that have acknowledged all the multicast packets at the time of the failure. The standby NEs may send out their latest Ack number, and the standby NEs having the largest Ack number may be eligible for election as the new active NE. The election may be performed as indicated above, based on performance or other desired methodology.

The use of the various forms of aggregation and reducing Acks as described above can relieve a performance bottleneck referred to as "Ack storming" and improve overall multicast performance by transmitting more data with fewer overall Acks and not having to wait for Acks before sending further packets. While the synchronized state in the standby nodes may be delayed due to aggregation of packets, the state update in the active node is not delayed by the aggregation and the state of the standby nodes is recoverable.

FIGS. 49, 50, 51, and 52 are example block flow diagrams numbered consistently with FIG. 39 and illustrating data and Ack flow between the router 3900 NEs 3910, 3912, 3914, 3916, and 3920 and remote peers 3942, 3944, and 3946.

Figure 49:
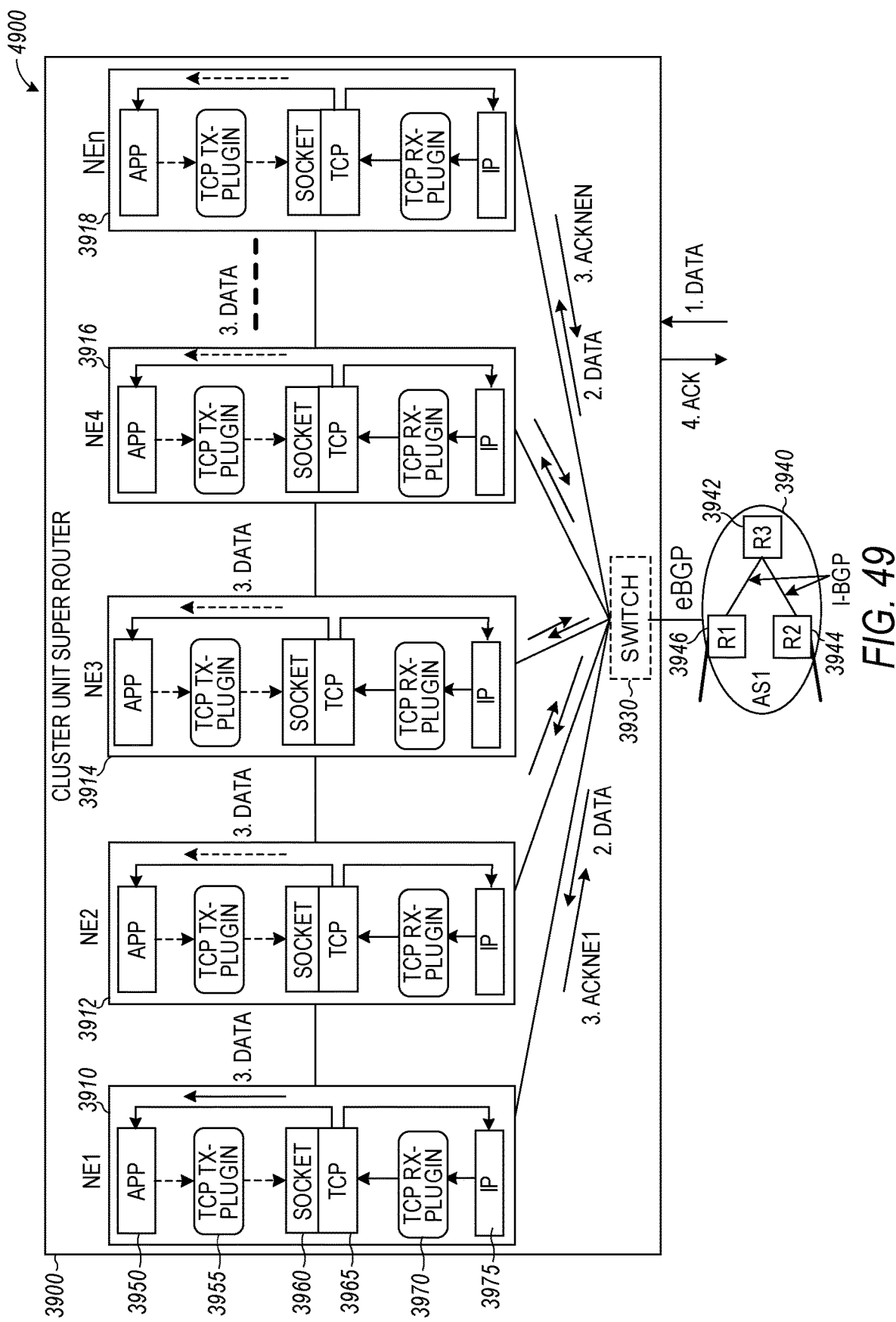
FIG. 49 is a block flow diagram illustrating data and Ack flow between the router and remote peers according to an example embodiment.

FIG. 49 at 4900 illustrates parallel operation of router 3900 for incoming data (1. Data) in a first example embodiment. Incoming TCP data (1. Data) from a remote APP or BGP peer such as 3942 is received at the router switch 3930 and forwarded (2. Data) to the TCP module 3965 on every NE in parallel. The TCP module 3965 on each NE sends the data to its corresponding APP 3950 (3. Data) and to the switch 3930 an Ack (3. AckNE1 . . . AckNEn) responsive to a read request from the APP 3950. The switch then sends an Ack (4. Ack) back to the peer device 3942.

Figure 50:
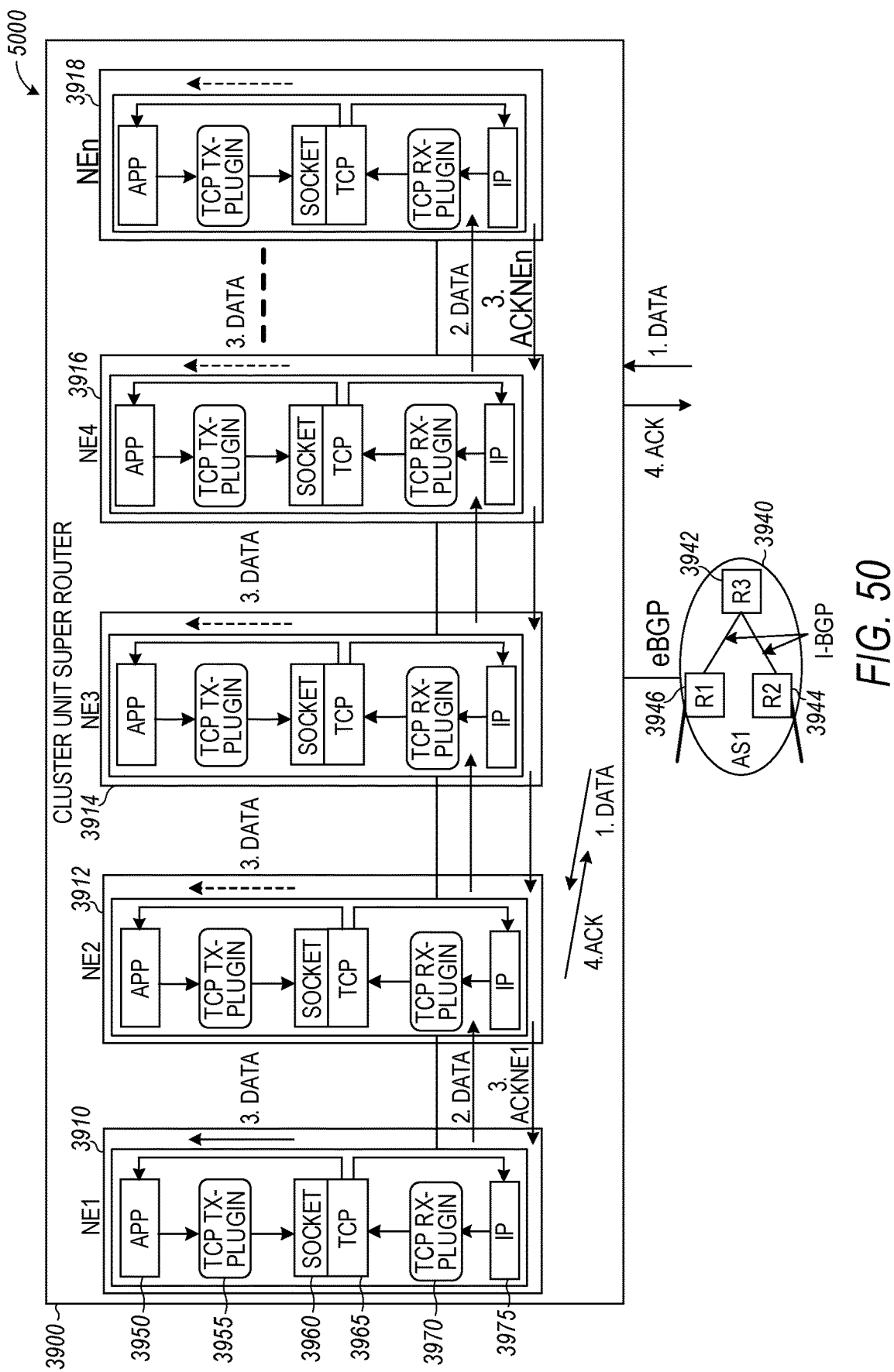
FIG. 50 is a block flow diagram illustrating data and Ack flow between the router and remote peers according to an example embodiment.

FIG. 50 at 5000 illustrates serial or sequential operation of router 3900 for incoming data (1. Data) in a first example embodiment. Incoming TCP data (1. Data) from a remote APP or BGP peer such as 3942 is received at the router 3900 by the first or active node 3910, NE1 via a network connection which may be part of each NE as a wired or wireless connection to the network. The data is then sent to the TCP module 3965 via the TCP Rx Plugin 3970 as indicated by (2. Data). The TCP module on each of the standby NEs, NE2-NEn, send an Ack (3. AckNE1 . . . AckNEn), and to the APPs responsive to a read request from the APPs 3950. The active NE, NE1 then sends an Ack (4. Ack) back to the peer device 3942, using the minimum sequence number among the Acks received from the TCPs on the NEs.

Figure 51:
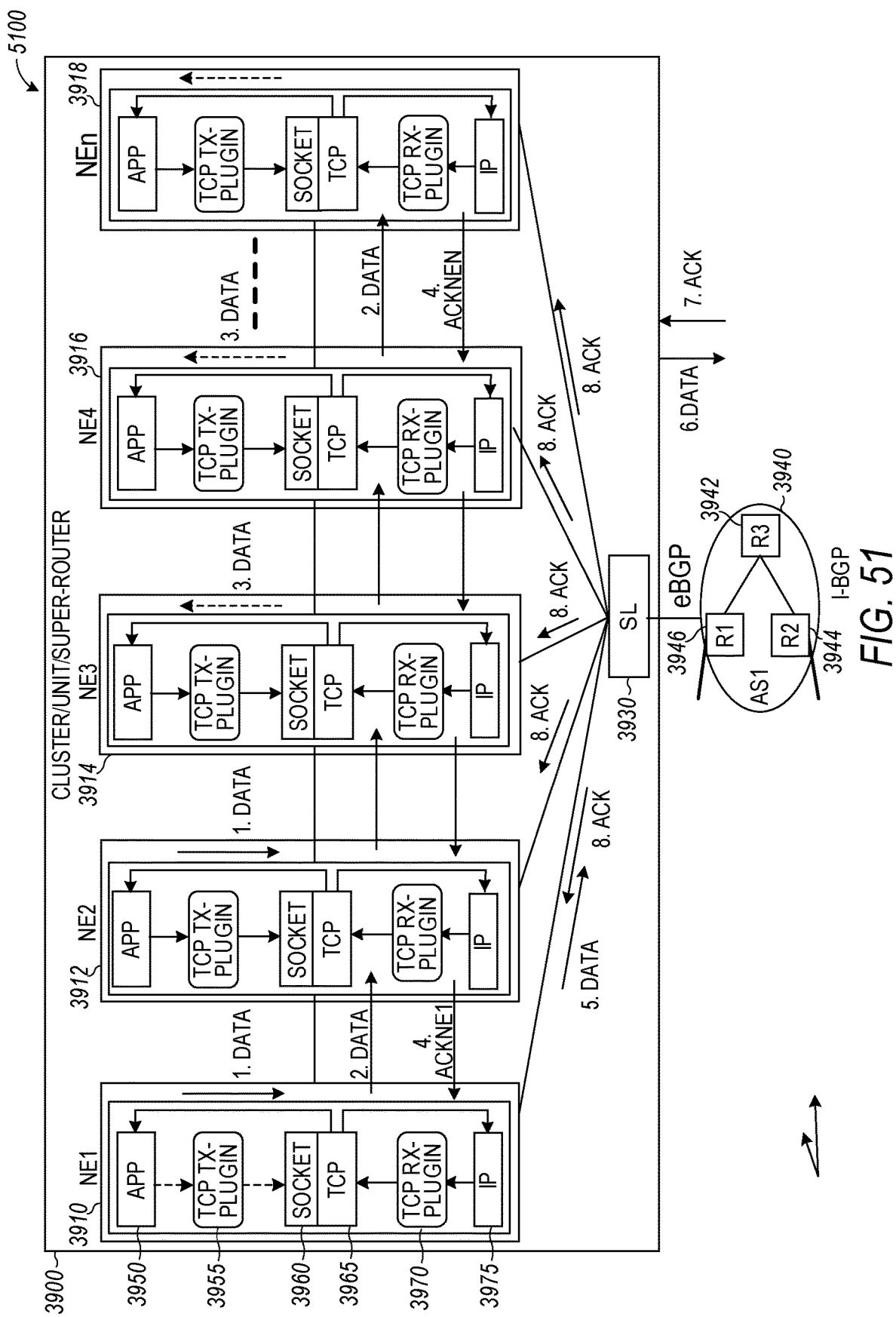
FIG. 51 is a block flow diagram illustrating data and Ack flow between the router and remote peers according to an example embodiment.

FIG. 51 at 5100 illustrates parallel operation of router 3900 for outgoing data (1. Data) generated by APP 3950 in the active NE1 3910. The TCP module 3965 sends the data (2. Data) to the other NEs, NE2-NEn. The APP on each NE reads the data (3. Data). The TCP module 3965 on each of the NEs then sends an Ack (3. AckNE2 . . . AckNEn), to the active NE, NE1. The data is then sent (5. Data) via the active NE, NE1 via the router switch 3930 to the remote peer 3942. An Ack (7. Ack) is sent by the remote peer 3942 and received by the switch 3930, followed by an Ack (8. Ack) sent from the switch 3930 in parallel to each of the ENs coupled to the switch.

Figure 52:
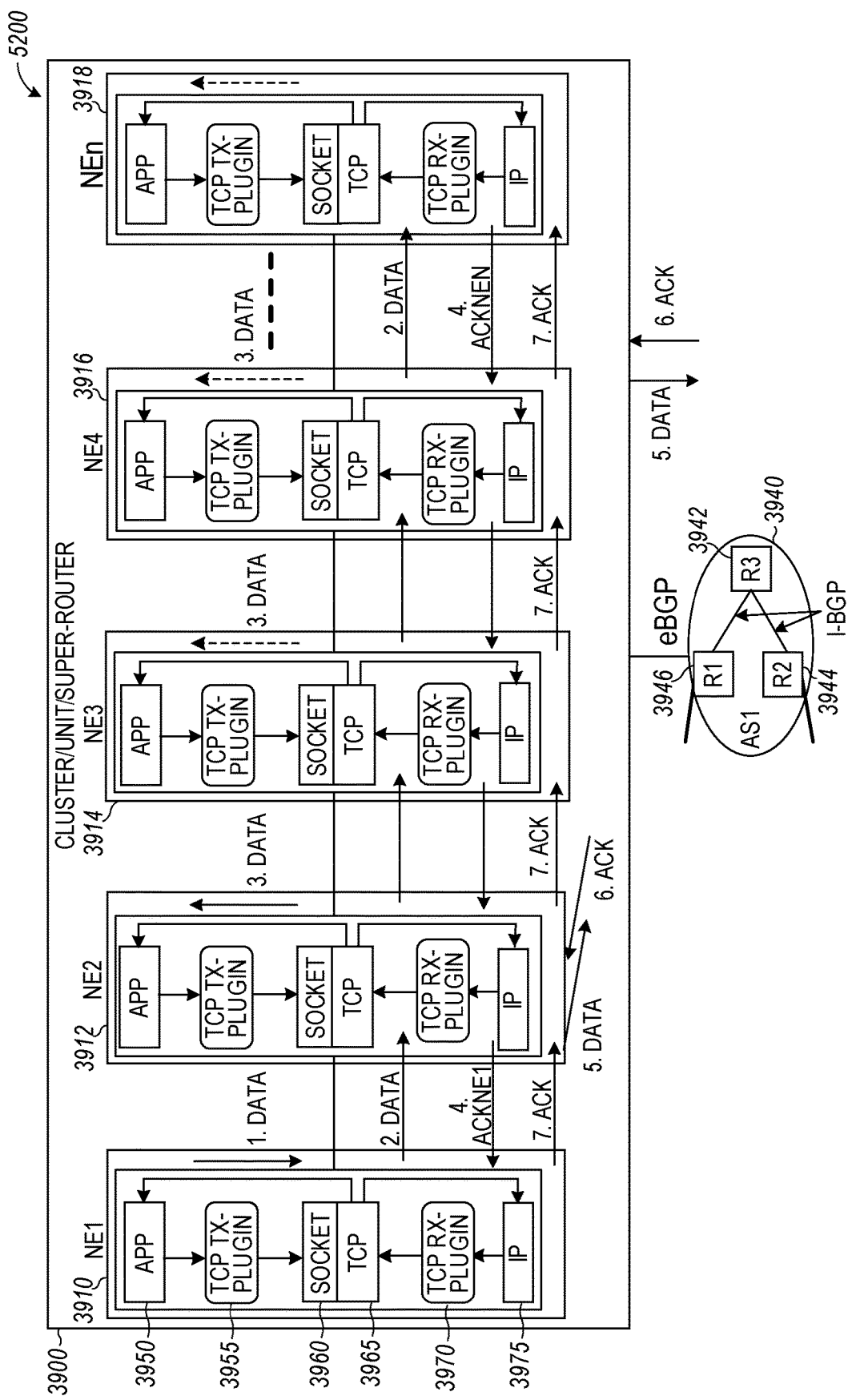
FIG. 52 is a block flow diagram illustrating data and Ack flow between the router and remote peers according to an example embodiment.

FIG. 52 at 5200 illustrates another embodiment of parallel operation of router 3900 for outgoing data (1. Data) generated by APP 3950 in the active NE1 3910. The TCP module 3965 sends the data (2. Data) to the other NEs, NE2-NEn concurrently. The APP on each NE reads the data (3. Data). The TCP module 3965 on each of the NEs then sends an Ack (3. AckNE2 . . . AckNEn), to the active NE, NE1. The data is then sent (5. Data) via the active NE, NE1 by the router 3900 to the remote peer 3942 after receiving the Acks (AckNE2 AckNEn) from the NEs. An Ack (6. Ack) is sent by the remote peer 3942 and received by the active EN1 followed by an Ack (7. Ack) sent from the active EN1 to the other ENs 2-*n* in parallel.

Figure 53:
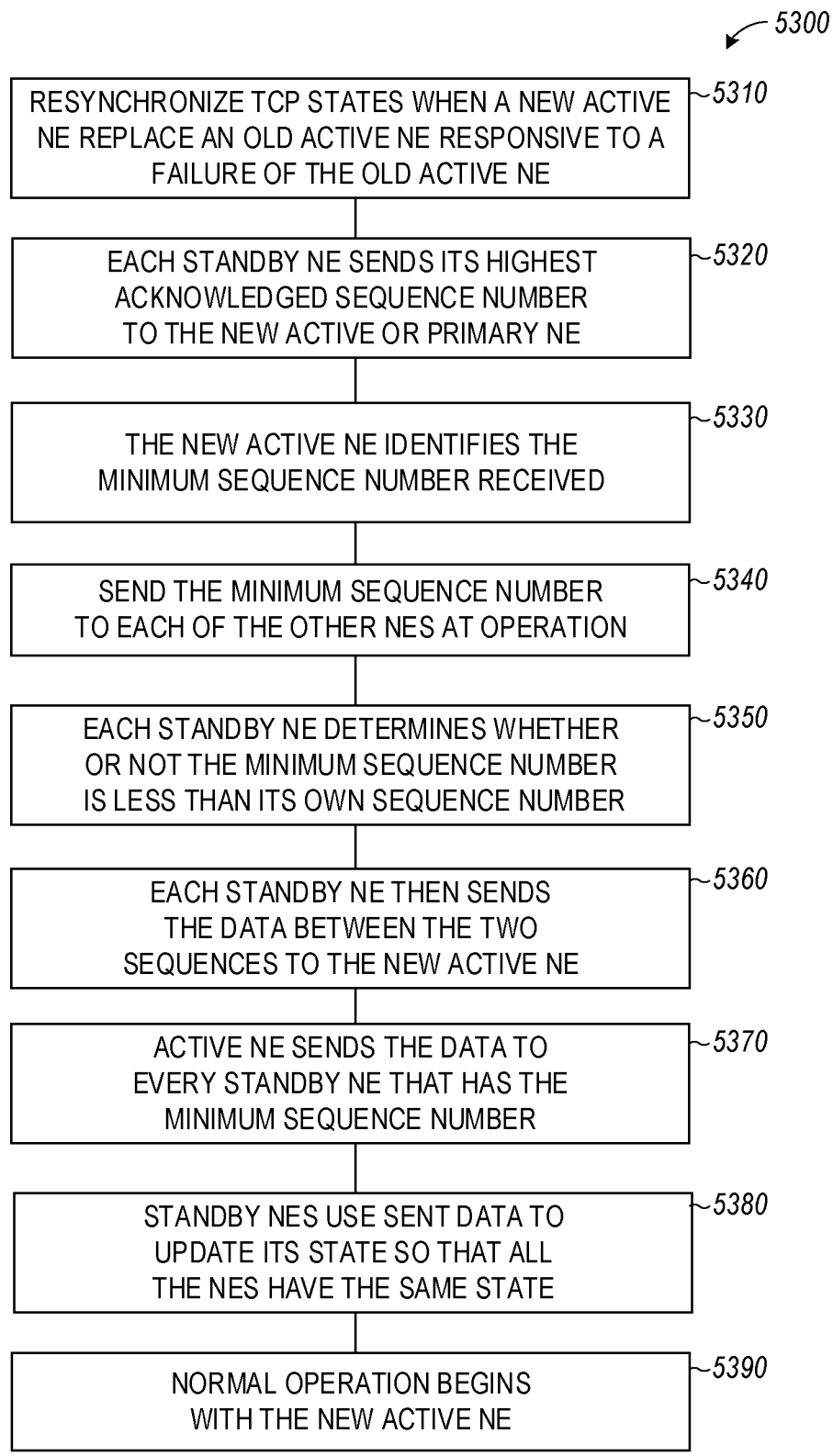
FIG. 53 is a flowchart illustrating an example computer implemented method of synchronizing states in network elements (NEs) for outgoing TCP communications according to an example embodiment.

FIG. 53 is a flowchart illustrating an example computer implemented method 5300 of synchronizing states in NEs for outgoing TCP communications. States for outgoing TCP resynchronize when a new active NE, NE1 replace an old NE1 responsive to a failure of the old NE1 indicated at detection operation 5310. Each of the standby NEs, NE2-NEn sends its sequence number at operation 5320, as obtained from the received packets that have been acknowledged. The new active NE1 then operates at 5330 to identify the minimum sequence number received. This minimum sequence number is sent to each of the other NEs at operation 5340.

Each NE determines at 5350 whether or not the minimum sequence number is less than its own sequence number and then sends the data at 5360 between the two sequences to the new active NE1. After receiving the data, the new NE1 sends the data from the minimum sequence number to the maximum sequence number at operation 5370 to every NE that does not have the maximum sequence number, which data is then used by each NE at operation 5380 to update its state so that all the NEs have the same state. Note that the data also contains the corresponding sequence numbers so each NE will now have the latest data that any of the NEs had, and normal operation begins at 5390 with the new active NE. Even with aggregation of data and the use of reduced Acks, all NEs now have the same state, which is the highest state, of any of the NEs that did not fail. Note that the above process works and ensures reliability of the NEs, even if m devices fail at the same time or over a period of time.

Figure 54:
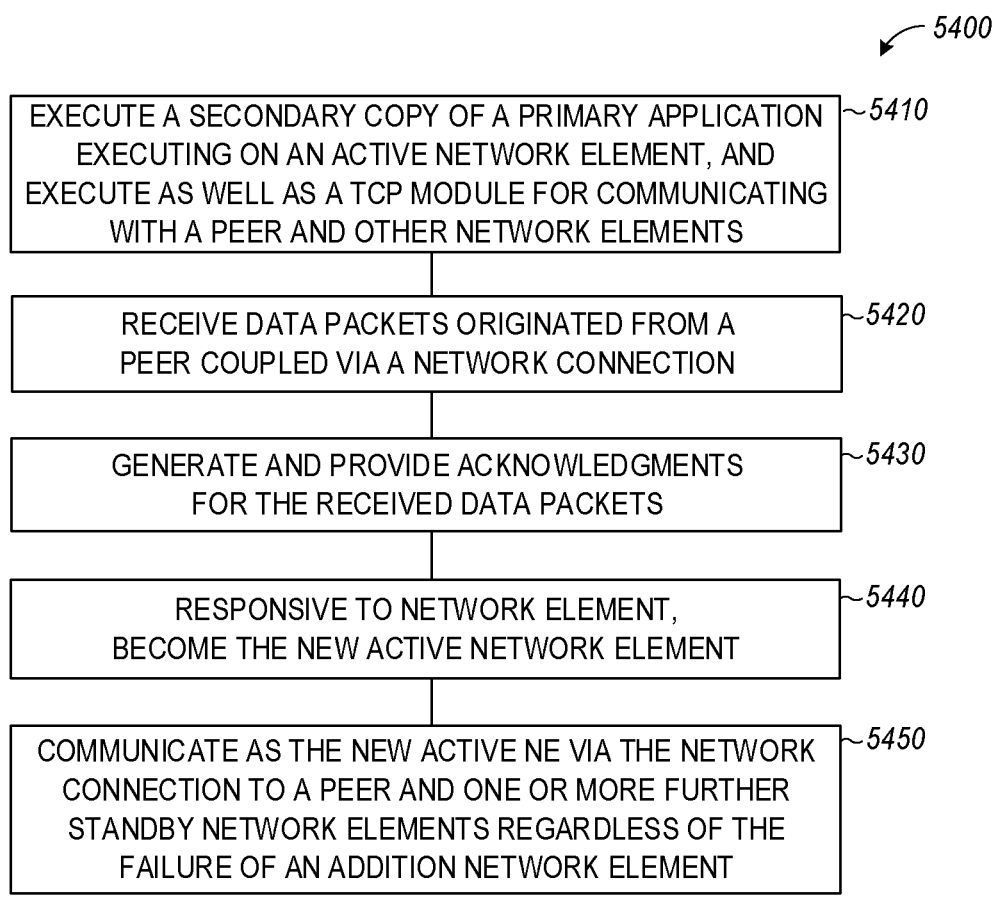
FIG. 54 is a flowchart illustrating an example computer implemented method performable by a standby network element (NE) according to an example embodiment.

FIG. 54 is a flowchart illustrating an example computer implemented method 5400 performable by a standby NE in one example embodiment. The standby NE in one embodiment executes, at operation 5410, a secondary copy of a primary application executing on an active network element, as well as a TCP module for communicating with a peer and other network elements. At operation 5420, data packets may be received that originated from a peer coupled via a network connection. Acknowledgments for the received data packets may be provided at operation 5430 by the standby NE. In the event of a network failure, the standby NE may become a new active network element at 5440. The new active NE may then communicate via the network connection to a peer and one or more further standby network elements regardless of the failure of an addition network element at 5450.

Upon becoming the new active NE, the method 5300 of synchronizing the standby NEs may be performed.

Figure 55:
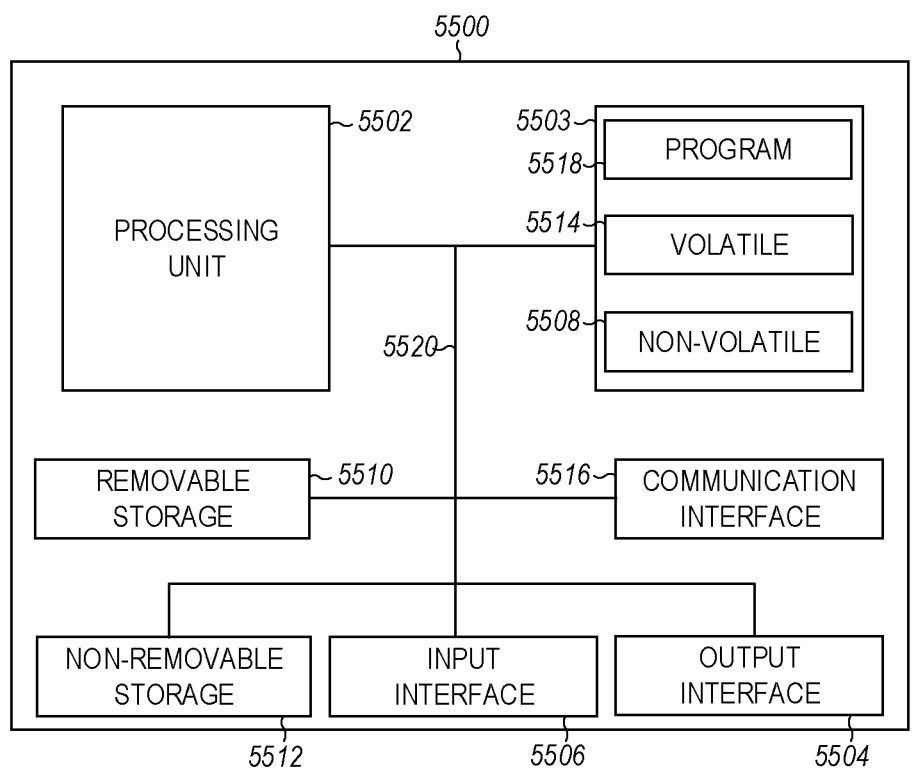
FIG. 55 is a block diagram illustrating circuitry for implementing one or more boards and line cards and for performing methods according to an example embodiment.

FIG. 55 is a block diagram illustrating circuitry for implementing one or more boards and line cards and for performing methods according to example embodiments. All components need not be used in various embodiments.

One example computing device in the form of a computer 5500 may include a processing unit 5502, memory 5503, removable storage 5510, and non-removable storage 5512. Although the example computing device is illustrated and described as computer 5500, the computing device may be in different forms in different embodiments. For example, the computing device may instead be a smartphone, a tablet, smartwatch, or other computing device including the same or similar elements as illustrated and described with regard to FIG. 55. Devices, such as smartphones, tablets, and smartwatches, are generally collectively referred to as mobile devices or user equipment. Further, although the various data storage elements are illustrated as part of the computer 5500, the storage may also or alternatively include cloud-based storage accessible via a network, such as the Internet or server based storage.

Memory 5503 may include volatile memory 5514 and non-volatile memory 5508. Computer 5500 may include—or have access to a computing environment that includes—a variety of computer-readable media, such as volatile memory 5514 and non-volatile memory 5508, removable storage 5510 and non-removable storage 5512. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 5500 may include or have access to a computing environment that includes input 5506, output 5504, and a communication connection 5516. Output 5504 may include a display device, such as a touchscreen, that also may serve as an input device. The input 5506 may include one or more of a touchscreen, touchpad, mouse, keyboard, camera, one or more device-specific buttons, one or more sensors integrated within or coupled via wired or wireless data connections to the computer 5500, and other input devices. The computer may operate in a networked environment using a communication connection to connect to one or more remote computers, such as database servers. The remote computer may include a personal computer (PC), server, router, network PC, a peer 170 device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 5502 of the computer 5500. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage such as a storage area network (SAN) indicated at 5520.

EXAMPLES

Parallel high availability examples include:
1. A system includes a primary board having circuitry for executing a primary application and a TCP module, a secondary board having circuitry for executing a secondary copy of the primary application and a secondary TCP module, a third board having circuitry for executing a third copy of the primary application and a third TCP module, and a line card coupled to all the boards, wherein the primary board, secondary board and third board are coupled in parallel to transfer data and acknowledgments among the primary board, secondary board and third board via the respective TCP modules of the primary board, secondary board and third board, and wherein the boards are reconfigurable to communicate with the line card regardless of the failure of one or two of the boards.
2. The system of example 1 wherein each TCP module includes an input buffer.
3. The system of any of examples 1-2 wherein the circuitry comprises a processor.
4. The system of example 3 wherein each TCP module includes an input buffer and an output buffer.
5. A method includes receiving incoming data from a peer device via a line card in a router, sending the received incoming data to TCP modules in at least three router boards, providing the data to an application duplicated on the at least three router boards, each router board acknowledging receipt of the data via the TCP modules, and acknowledging receipt of the data to the peer device via the line card responsive to all the boards acknowledging receipt of the data.

6. The method of example 5 wherein each router board acknowledges receipt of the data via the TCP modules via the parallel connection to the line card.
7. The method of any of examples 5-6 wherein each router board explicitly acknowledges receipt of the data via the TCP modules via a parallel connection to a primary board, and wherein the primary board acknowledges receipt to the line card.
8. The method of any of examples 5-6 wherein each router board explicitly acknowledges receipt of the data via the TCP modules via a parallel connection to a primary board, requests missing data from the primary board, and wherein the primary board acknowledges receipt to the line card.
9. The method of any of examples 5-6 wherein each router board implicitly acknowledges receipt of the data via the TCP modules via a parallel connection to a primary board by requesting missing data from the primary board, and wherein the primary board acknowledges receipt to the line card when no requests are received after a timer expires.
10. The method of example 5 wherein each router board implicitly acknowledges receipt of the data via the TCP modules via a parallel connection to a primary board by requesting missing data from the primary board, sends a request message for missing data, and wherein the primary board acknowledges receipt to the line card when no requests are received after a timer expires.
11. The method of example 10 wherein a time for the timer is less than the time for a TCP retransmission timer.
12. The method of any of examples 5-11 and further including holding off on delivering data to the application on the primary board until the data is synchronized with a newly added board, sending a sequence number m corresponding to a last byte of the data delivered to the application before holding off, copying the data from the primary board TCP module to the newly added board TCP module and delivering data to the applications on all boards responsive to completion of the copying of the data.
13. A method includes receiving data from an application running on a primary board in a router, the data being received by a TCP module on the primary board the TCP module on the primary board providing the received data in parallel to at least two other boards each having a TCP module and a copy of the application, the TCP module on the primary board providing the received data to a line card coupled in parallel to all the boards, and providing an acknowledgment to each board in parallel from a peer device responsive to successful delivery of the data to the peer device.
14. The method of example 13 wherein the data is provided from the TCP module on the primary board to the other boards without receipt of an explicit acknowledgment.
15. The method of example 13 wherein the other boards provide an explicit acknowledgment for data provided from the primary board and wherein the primary board sends the data to the line card upon receipt of such acknowledgments from each board.
16. The method of example 13 wherein the other boards provide a request message responsive to missing bytes of the data, serving as an implied acknowledgment for data provided from the primary board and wherein the primary board sends the data to the line card upon not receiving a request from any of the boards after a timer expires.
17. The method of any of examples 13-16 and further including the primary board backing up TCP sockets to a new board that has been inserted into a router slot, replicating the TCP socket on the new board, and synchronizing the received data on the TCP module on the new board.
18. The method of example 17 wherein the received data is synchronized on the new board without an explicit acknowledgment.
19. The method of example 17 wherein the received data is synchronized on the new board with an explicit acknowledgment from the new board.
20. The method of example 17 wherein the received data is synchronized on the new board with an implicit acknowledgment.
21. The method of any of examples 13-20 and further including holding off on delivering data to the application on the newly added board until the data is synchronized with the primary board, sending a sequence number n corresponding to a last byte of the data delivered to the application before holding off copying the data from the primary board TCP module to the newly added board TCP module, and delivering data to the applications on all boards responsive to completion of the copying of the data.

Sequential high availability examples include:
1. A system includes a primary board having circuitry for executing a primary application and a TCP module, a secondary board having circuitry for executing a secondary copy of the primary application and a secondary TCP module, a third board having circuitry for executing a third copy of the primary application and a third TCP module, a line card coupled to the third board, wherein the primary board, secondary board and third board are coupled sequentially to transfer data and acknowledgments between them sequentially via their respective TCP modules, and wherein the boards are reconfigurable to communicate with the line card regardless of the failure of one or two of the boards.
2. The system of example 1 wherein the circuitry comprises a processor.
3. The system of example 2 wherein each TCP module includes an input buffer and an output buffer.
4. The system of example 1 wherein the system comprises a switch.
5. A method includes receiving incoming data from a peer device via a line card in a router, sending the received incoming data from the line card via a serial connection to the third board, from the third board to the secondary board, and from the secondary board to the primary board in sequence, wherein TCP modules in the boards receive the incoming data, providing the data to an application duplicated on the at least three boards via the TCP modules on each board each board acknowledging receipt of the data via the TCP modules and serial connection in sequence from the primary board, through the secondary board and the third board to the line card, and acknowledging receipt of the data to the peer device via the line card responsive to all the boards acknowledging receipt of the data.
6. The method of example 5 wherein the primary board sends an acknowledgment after providing the data to the application on the primary board and each succeeding board sends an acknowledgment on the serial connection after receipt of an acknowledgment from a preceding board.

7. The method of any of examples 5-6 and further comprising modifying the serial connection between the remaining boards responsive to a board failing.
8. The method of example 7 and further comprising changing roles of boards that have not failed such that one board operates as the primary board and is the furthest board along the serial connection from the line card.
9. The method of example 8 wherein the serial connection and roles of the boards are changed responsive to two boards failing.
10. The method of example 9 wherein the line card resends data to the board having the role of primary board responsive to data not being acknowledged.
11. The method of any of examples 5-10 and further comprising responsive to a new board being inserted holding off on the line card sending data to a last board, holding off on the last board sending data to the line card, synchronizing states and data structures of an application using TCP on the last board to a corresponding application on the new board, backing up TCP sockets on the new board, synchronizing a state and data structures of the TCP sockets between the last board and the new board, creating a connection between the last board and the new board and between the new board and the line card, and removing the connection between the last board and the line card.
12. The method of example 11 and further including sending a sequence number m corresponding to a last byte of data delivered to the application from the last board to the new board, copying data in the application's TCP input buffer on the last board to a corresponding application on the new board such that a beginning of the data is a boundary of a data stream, and continuing to transfer data via the serial connection to the boards, including the new board.
13. The method of example 12 wherein continuing to transfer data includes sending the incoming TCP data from the peer device from sequence number m+1 from the TCP module on AB to the corresponding application on AB and wherein the application on AB starts to snoop its incoming TCP data from the peer device.
14. A method includes receiving data from an application running on a primary board in a router, the data being received by a TCP module on the primary board, the TCP module on the primary board providing the received data via a serial connection through at least two other boards each having a TCP module and a copy of the application, wherein one of the other boards is a last board, the TCP module on the last board providing the received data to a line card coupled via the serial connection to the last board, and providing an acknowledgment to each board in succession via the serial connection responsive to successful provision of the data by the line card to a peer device.
15. The method of example 14 wherein each TCP module receiving the data from a preceding TCP module updates its application with the received data.
16. The method of example 15 wherein the last board sends an acknowledgment to a preceding board on the serial connection responsive to receiving an acknowledgment from the line card and each succeeding board out to the primary board sends an acknowledgment on the serial connection after receipt of an acknowledgment from a preceding board and removes the data from a TCP buffer.

17. The method of any of examples 14-16 and further comprising modifying the serial connection between the remaining boards responsive to a board failing.
18. The method of example 17 and further comprising changing roles of boards that have not failed such that one board operates as the primary board and is the furthest board along the serial connection from the line card.
19. The method of example 18 wherein the serial connection and roles of the boards are changed responsive to two boards failing.
20. The method of any of examples 14-19 and further including responsive to a new board being inserted, holding off on the line card sending data to a last board, holding off on the last board sending data to the line card, backing up TCP sockets on the new board, synchronizing a state and data structures of the TCP sockets between the last board and the new board, synchronizing states and data structures of an application using TCP on the last board to an corresponding application on the new board, creating a connection between the last board and the new board and between the new board and the line card, and removing the connection between the last board and the line card.
21. The method of example 20 and further comprising sending a sequence number n corresponding to a last byte of data delivered to the application from the last board to the new board.
22. A method includes coupling a primary board having circuitry for executing a primary application and a TCP module, a secondary board having circuitry for executing a secondary copy of the primary application and a secondary TCP module, a third board having circuitry for executing a third copy of the primary application and a third TCP module, and a line card in series to transfer data and acknowledgments between them sequentially via their respective TCP modules, and wherein the boards are reconfigurable to communicate with the line card regardless of the failure of one or two of the boards, and changing a sequence of the boards such that roles of the board change corresponding to a new sequence, wherein the serial connection is reconfigured to match the new sequence.
23. The method of example 22 wherein the sequence of boards is changed by bringing down and bringing up boards.
24. The method of example 23 wherein the sequence of boards is changed by use of software to change the order of serial connections.
25. The method of example 24 and further comprising freezing the boards prior to changing the order of serial connection and unfreezing the boards after changing the order of serial connections.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A system comprising:
a first network element (NE) having circuitry for executing computer instructions that comprise a first copy of a primary application and having a first transmission control protocol (TCP) module;
a second NE having circuitry for executing computer instructions that comprise a second copy of the primary application and having a second TCP module; and
a third NE having circuitry for executing computer instructions that comprise a third copy of the primary application and having a third TCP module;
where the first NE acts as an active NE, the second NE and the third NE act as standby NEs of the first NE;
where the first NE is communicably coupled to the second NE and the third NE, and where the first TCP module, the second TCP module and the third TCP module synchronize packet traffic with one another to provide, via a line card that couples the first NE, the second NE, and the third NE to a network, an ordered error-checked delivery of a stream of bytes between the primary application and an application on a peer device coupled to the network and where sequence numbers for most recent acknowledged data packets by each of the NEs are used to synchronize data packets in remaining NEs in response to a failure of any one of the first NE, the second NE, and the third NE;
where the first NE is configured to aggregate multiple data packets and multicast such aggregated multiple data packets to the second NE and the third NE; and
where the second NE and the third NE are configured to receive multiple data packets directly from the first NE to synchronize the second NE and the third NE, and to provide a single aggregated acknowledgment having a sequence number corresponding to the sequence number of a last data packet received.

2. The system of claim 1, where the first TCP module includes a receive buffer and a transmit buffer.

3. The system of claim 2, where the first TCP module is configured to encapsulate data and acknowledgments into packets that include a field identifying the packet as a data packet or an acknowledgment packet and a field providing a sequence number.

4. The system of claim 3, where the sequence number of a data packet identifies a last byte of data transferred in the data packet or acknowledged as received in an acknowledgment packet.

5. The system of claim 1 wherein the multicast of aggregated multiple data packets comprises multicasting received data packets responsive to a trigger event.

6. The system of claim 5, where the trigger event comprises one or more of a timeout, a window size being reached, and a transmit data packet being received from the first copy of the primary application.

7. The system of claim 4 wherein the first NE is configured to receive acknowledgments from the second NE and the third NE of a first multicast of aggregated data packets and responsive to receiving a set number acknowledgments from less than all of the standby network elements, transmit a next multicast of aggregated data packets.

8. The system of claim 2 wherein the receive buffer of the first TCP module is configured to store aggregated multiple data packets received from a peer and the transmit buffer is configured to store aggregated multiple data packets generated by the first copy of the primary application to be transmitted.

9. A system comprising:
a first network element (NE) having circuitry for executing computer instructions that comprise a first copy of a primary application and having a first transmission control protocol (TCP) module;
a second NE having circuitry for executing computer instructions that comprise a second copy of the primary application and having a second TCP module; and
a third NE having circuitry for executing computer instructions that comprise a third copy of the primary application and having a third TCP module;
where the first NE acts as an active NE, the second NE and the third NE act as standby NEs of the first NE;
where the first NE is communicably coupled to the second NE and the third NE, and where the first TCP module, the second TCP module and the third TCP module synchronize packet traffic with one another to provide, via a line card that couples the first NE, the second NE, and the third NE to a network, an ordered error-checked delivery of a stream of bytes between the primary application and an application on a peer device coupled to the network and where sequence numbers for most recent acknowledged data packets by each of the NEs are used to synchronize data packets in remaining NEs in response to a failure of any one of the first NE, the second NE, and the third NE;
where the second NE becomes a new active NE in response to failure of the first NE, and where the new active NE is configured to:
receive a sequence number for each one of most recent acknowledged data packets from the third NE;
send a minimum sequence number among the received sequence numbers to the third NE;
receive data corresponding to sequence numbers between the minimum sequence number and the sequence number from the third NE; and
send the received data to the third NE.

10. The system of claim 9, where the second NE as the new active NE operates to communicate data between the second copy of the application and the peer device.

11. A computer implemented method comprising:
receiving incoming data packets from a peer at a first transmission protocol (TCP) module in a first network element (NE), a second TCP module in a second NE and a third TCP module in a third NE via a line card, where the first NE acts as an active NE and the second NE and the third NE act as standby NE, the first NE is computably coupled to the second NE and the third NE, where the first TCP module, the second TCP module and the third TCP module synchronize data packet traffic with one another; and
providing data packets to a first copy of an application on the first NE, a second copy of the application on the second NE and a third copy of the application on the third NE, where the second NE becomes a new active NE in response to failure of the first NE, and where the new active NE is configured to:
receive a sequence number for each one of most recent acknowledged data packets from the third NE;
send a minimum sequence number among the received sequence numbers to the third NE;
receive data corresponding to sequence numbers between the minimum sequence number and the sequence number from the third NE; and
send the received data to the third NE.

12. The computer implemented method of claim 11, where each of the first NE, the second NE and the third NE acknowledges receipt of the data packets via the TCP modules via a parallel connection.

13. The computer implemented method of claim 11, where the second NE explicitly acknowledges receipt of the data packets via the second TCP module via a parallel connection to the first NE, and where the first NE acknowledges receipt to a peer.

14. The computer implemented method of claim 11, where the second NE implicitly acknowledges receipt of the data packets via the second TCP module via a parallel connection to the first NE by requesting missing data from the first NE, and where the active NE acknowledges receipt to the line card when no requests are received after a timer expires.

15. A non-transitory memory comprising instructions for performing a method comprising:
   receiving incoming data packets from a peer via a line card at a first transmission protocol (TCP) module in a first network element (NE), a second TCP module in a second NE and a third TCP module in a third NE, where the first NE acts as an active NE and the second NE and the third NE act as standby NE, the first NE is computably coupled to the second NE and the third NE, where the first TCP module, the second TCP module and the third TCP module synchronize data packet traffic with one another; and
   providing data to a first copy of an application on the first NE, a second copy of the application on the second NE and a third copy of the application on the third NE, and where sequence numbers for most recent acknowledged data packets by each of the NEs are used to synchronize data packets between remaining NEs in response to a failure of any one of the first NE, the second NE, and the third NE;
   where the first NE is configured to aggregate multiple data packets and multicast such aggregated multiple data packets to the second NE and the third NE; and
   where the second NE and the third NE are configured to receive multiple data packets directly from the first NE to synchronize the second NE and the third NE, and to provide a single aggregated acknowledgment having a sequence number corresponding to the sequence number of a last data packet received.

16. The non-transitory memory of claim 15, where each of the first NE, the second NE and the third NE acknowledges receipt of the data via the TCP modules via a parallel connection.

17. The non-transitory memory of claim 15, where the second NE explicitly acknowledges receipt of the data via the second TCP module via a parallel connection to the first NE, and where the first NE acknowledges receipt to a peer.

18. The non-transitory memory of claim 15, where the second NE implicitly acknowledges receipt of the data via the second TCP module via a parallel connection to the first NE by requesting missing data from the first NE, and where the active NE acknowledges receipt to the line card when no requests are received after a timer expires.

* * * * *